(12) United States Patent
Kim et al.

(10) Patent No.: US 12,323,975 B2
(45) Date of Patent: Jun. 3, 2025

(54) METHOD FOR TRANSMITTING/RECEIVING DOWNLINK DATA IN WIRELESS COMMUNICATION SYSTEM BASED ON A TIME DOMAIN RESOURCE THAT IS BASED ON ONE OR MORE SLOTS, AND DEVICE THEREFOR

(71) Applicant: LG ELECTRONICS INC., Seoul (KR)

(72) Inventors: Kyuseok Kim, Seoul (KR); Hyungtae Kim, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 316 days.

(21) Appl. No.: 17/635,327

(22) PCT Filed: Aug. 14, 2020

(86) PCT No.: PCT/KR2020/010914
§ 371 (c)(1),
(2) Date: Feb. 14, 2022

(87) PCT Pub. No.: WO2021/029748
PCT Pub. Date: Feb. 18, 2021

(65) Prior Publication Data
US 2022/0338222 A1    Oct. 20, 2022

Related U.S. Application Data

(60) Provisional application No. 62/886,932, filed on Aug. 14, 2019, provisional application No. 62/891,230, (Continued)

(30) Foreign Application Priority Data

Aug. 14, 2019  (KR) ........................ 10-2019-0099946
Aug. 30, 2019  (KR) ........................ 10-2019-0107786
(Continued)

(51) Int. Cl.
*H04W 72/0446*    (2023.01)
*H04L 1/1607*    (2023.01)
(Continued)

(52) U.S. Cl.
CPC ....... *H04W 72/1273* (2013.01); *H04L 1/1642* (2013.01); *H04W 72/0446* (2013.01); *H04W 72/23* (2023.01)

(58) Field of Classification Search
CPC ......... H04W 72/1273; H04W 72/0446; H04W 72/23; H04W 72/0453; H04W 72/1263;
(Continued)

(56) References Cited

U.S. PATENT DOCUMENTS 11,523,419 B2 * 12/2022 Takeda ................. H04L 1/0009
2019/0246395 A1    8/2019 Huang et al.
(Continued)

OTHER PUBLICATIONS

PCT International Application No. PCT/KR2020/010914, International Search Report dated Nov. 20, 2020, 5 pages.
(Continued)

*Primary Examiner* — Redentor Pasia
*Assistant Examiner* — Lalita W Pace
(74) *Attorney, Agent, or Firm* — LEE, HONG, DEGERMAN, KANG & WAIMEY

(57) ABSTRACT

Disclosed in the present invention are a method for transmitting/receiving downlink data in a wireless communication system, and a device therefor. Specifically, a method of receiving downlink data by user equipment (UE) in a
(Continued)

wireless communication system comprises the steps of: receiving configuration information; receiving downlink control information (DCI), the DCI comprising a transmission configuration indication (TCI) field, and multiple TCI states being indicated on the basis of the TCI field; and receiving multiple transmission occasions of an identical transport block on the basis of the DCI. The multiple transmission occasions are received through a time-domain resource on the basis of time division multiplexing (TDM), and the number of the multiple transmission occasions is determined on the basis of the number of the multiple TCI states.

15 Claims, 13 Drawing Sheets

Related U.S. Application Data filed on Aug. 23, 2019, provisional application No. 62/896,009, filed on Sep. 5, 2019.

(30) Foreign Application Priority Data

| Oct. 3, 2019 | (KR) | ........................ 10-2019-0122722 |
| Oct. 14, 2019 | (KR) | ........................ 10-2019-0127361 |
| Nov. 8, 2019 | (KR) | ........................ 10-2019-0143020 |

(51) Int. Cl.
*H04W 72/1273* (2023.01)
*H04W 72/23* (2023.01)

(58) Field of Classification Search
CPC ...... H04W 72/53; H04L 1/1642; H04L 1/189; H04L 1/1896; H04L 1/08; H04L 2001/0093; H04L 1/00; H04L 5/00; H04L 1/0002; H04L 5/005; H04L 5/0053; H04L 5/0094; H04B 7/024; H04B 7/0408; H04B 7/06; H04B 7/0697

See application file for complete search history.

(56) References Cited

U.S. PATENT DOCUMENTS

| 2019/0297640 | A1* | 9/2019 | Liou ........................ H04L 5/001 |
| 2020/0267748 | A1* | 8/2020 | Khoshnevisan ...... H04L 1/0023 |
| 2020/0367208 | A1* | 11/2020 | Khoshnevisan ...... H04L 5/0048 |
| 2022/0052819 | A1* | 2/2022 | Hang .................... H04L 5/0023 |
| 2022/0095345 | A1* | 3/2022 | Chen ........................ H04L 1/08 |
| 2022/0104237 | A1* | 3/2022 | Muruganathan ...... H04W 72/51 |
| 2022/0124768 | A1* | 4/2022 | Frenne ................ H04L 1/1819 |
| 2022/0256566 | A1* | 8/2022 | Gao ........................ H04L 1/08 |
| 2022/0345245 | A1* | 10/2022 | Yuan .................... H04L 5/0023 |
| 2024/0260037 | A1* | 8/2024 | Muruganathan .. H04W 72/0446 |

OTHER PUBLICATIONS

Huawei et al., "Summary of AI: 7.2.8.2 Enhancements on Multi-TRP/Panel Transmission of Offline Discussion," R1-1907706, 3GPP TSG RAN WG1 Meeting #97, May 2019, 66 pages.

3rd Generation Partnership Project, "Technical Specification Group Radio Access Network; NR; Physical layer procedures for data (Release 15)," 3GPP TS 38.214 V15.6.0, Jun. 2019, 105 pages.

Huawei et al., "Enhancements on Multi-TRP/Panel Transmission," R1-1906029, 3GPP TSG RAN WG1 #97, May 2019, 17 pages.

3rd Generation Partnership Project, "Technical Specification Group Radio Access Network; NR; Physical layer procedures for control (Release 15)," 3GPP TS 38.213 V15.6.0, Jun. 2019, 107 pages.

* cited by examiner

[FIG. 1]
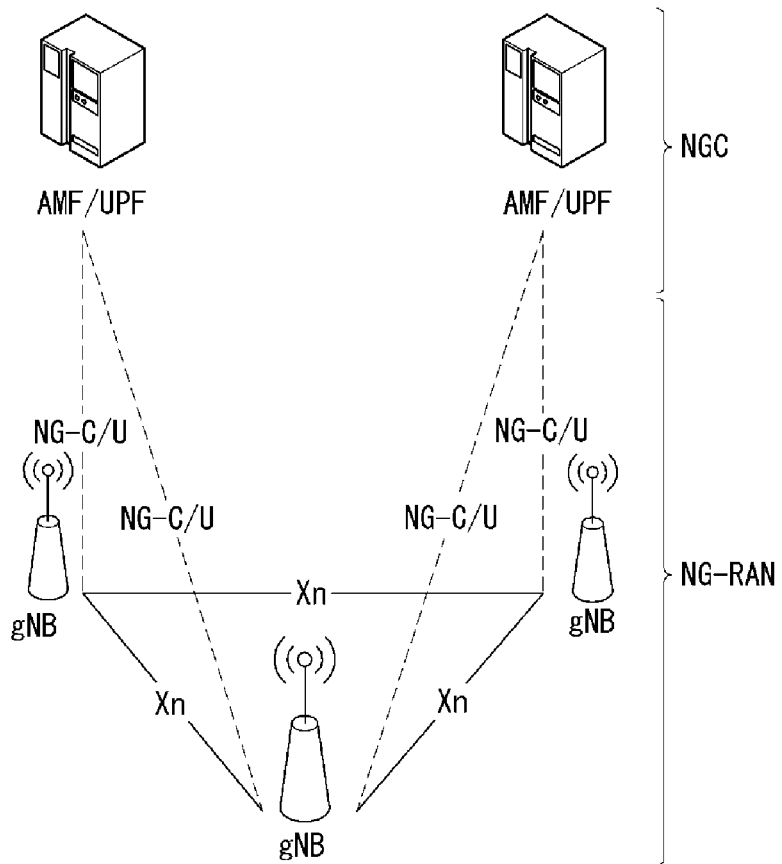
[FIG. 2]
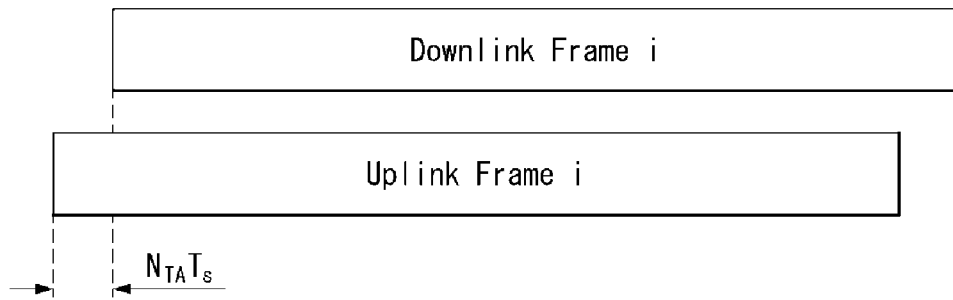

[FIG. 3]
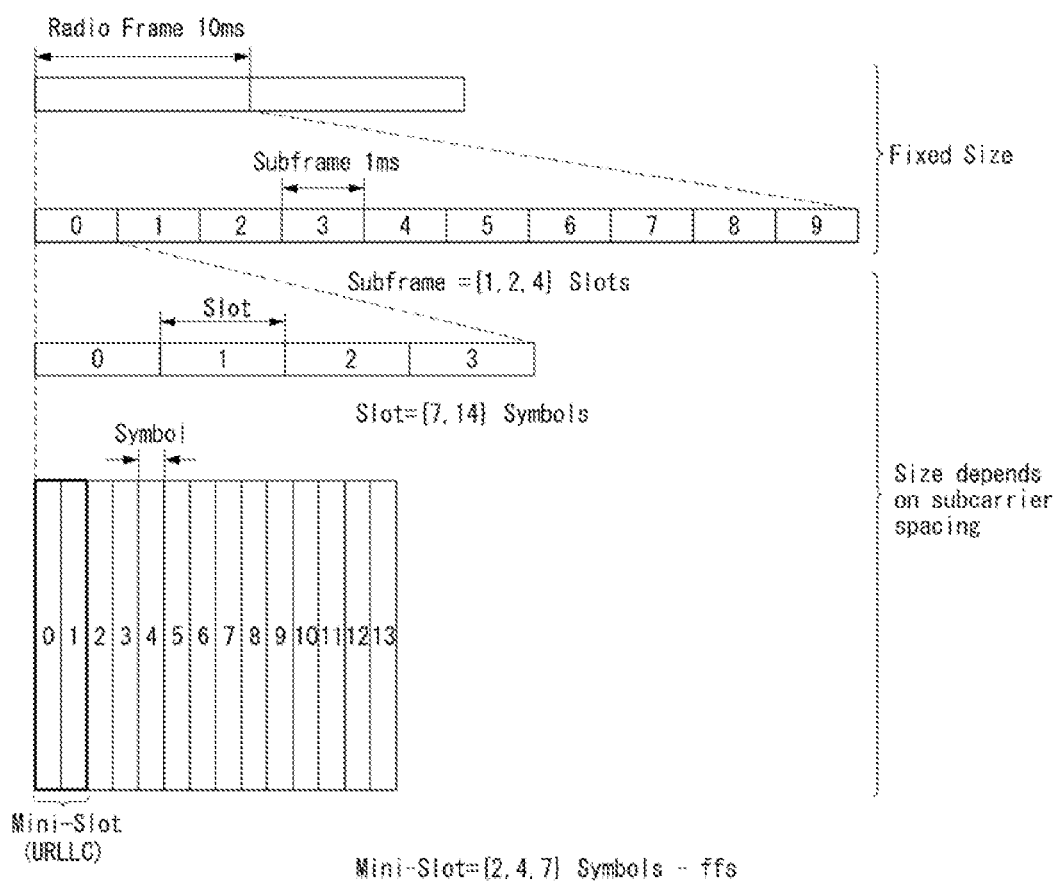

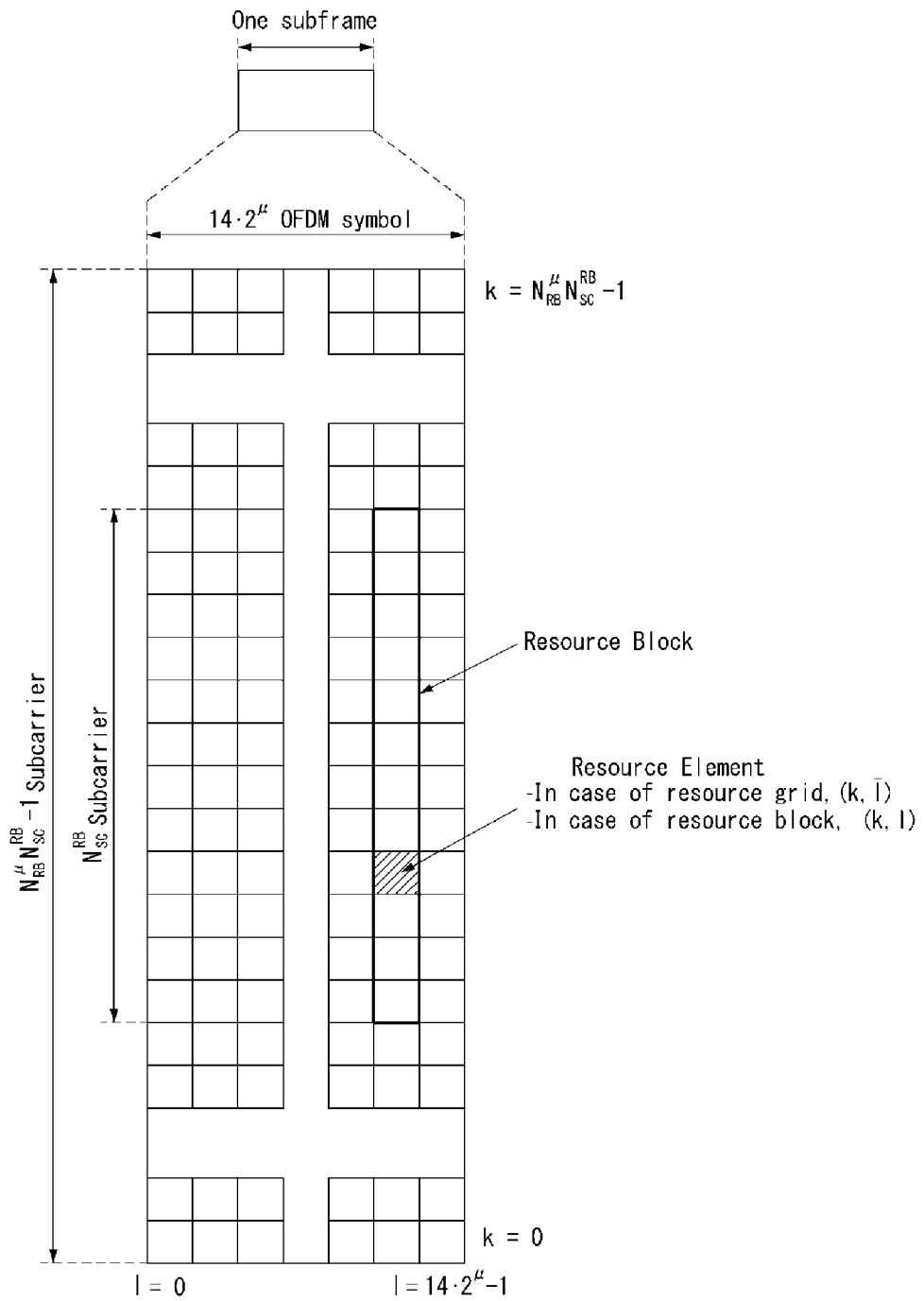
[FIG. 4]

[FIG. 5]
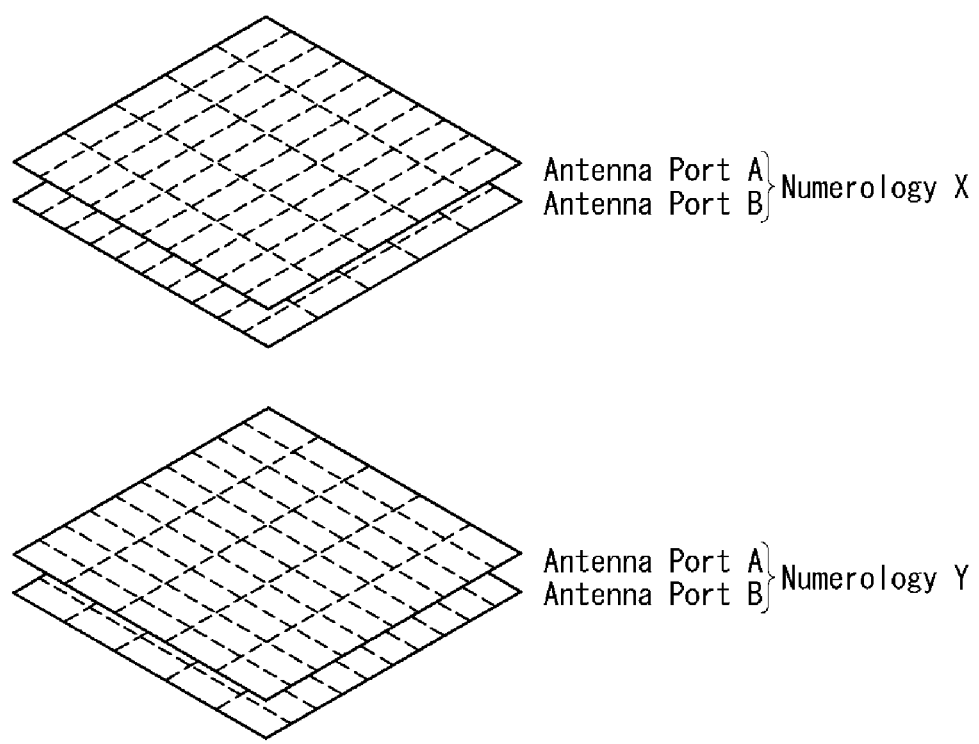

[FIG. 6]
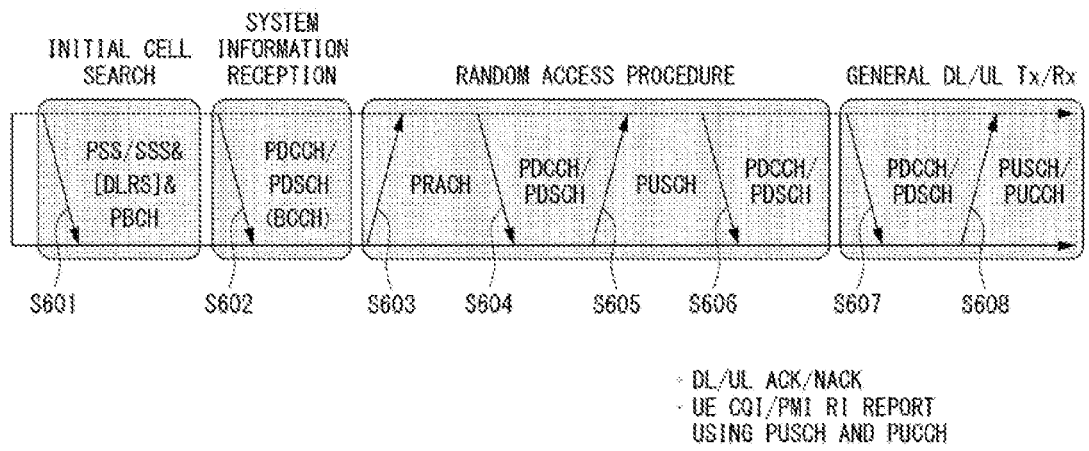
[FIG. 7]
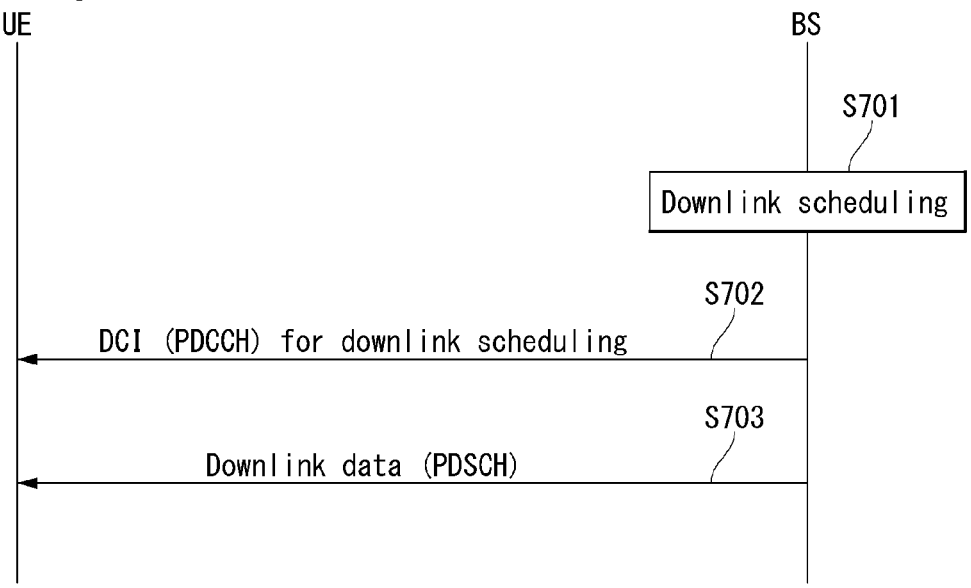

[FIG. 8]
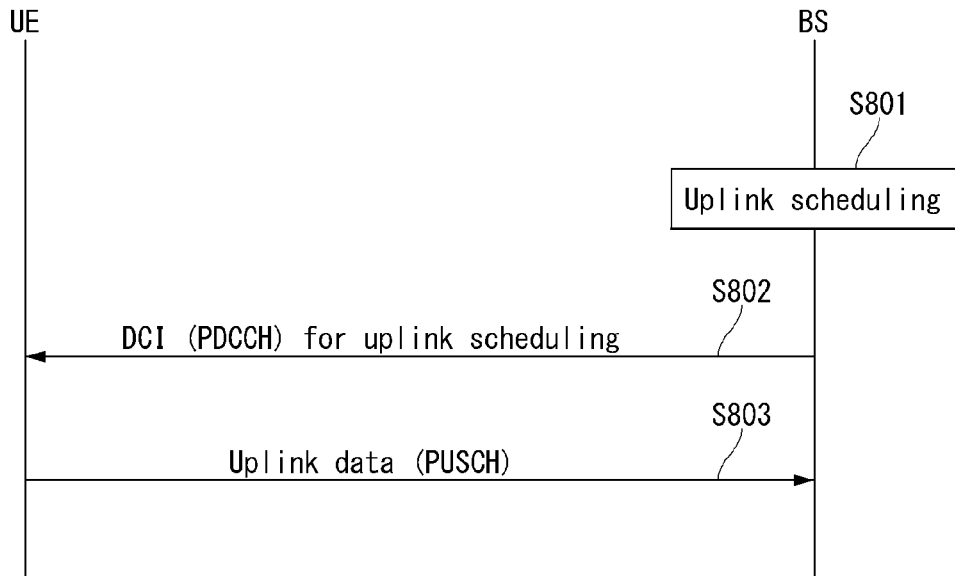
[FIG. 9]
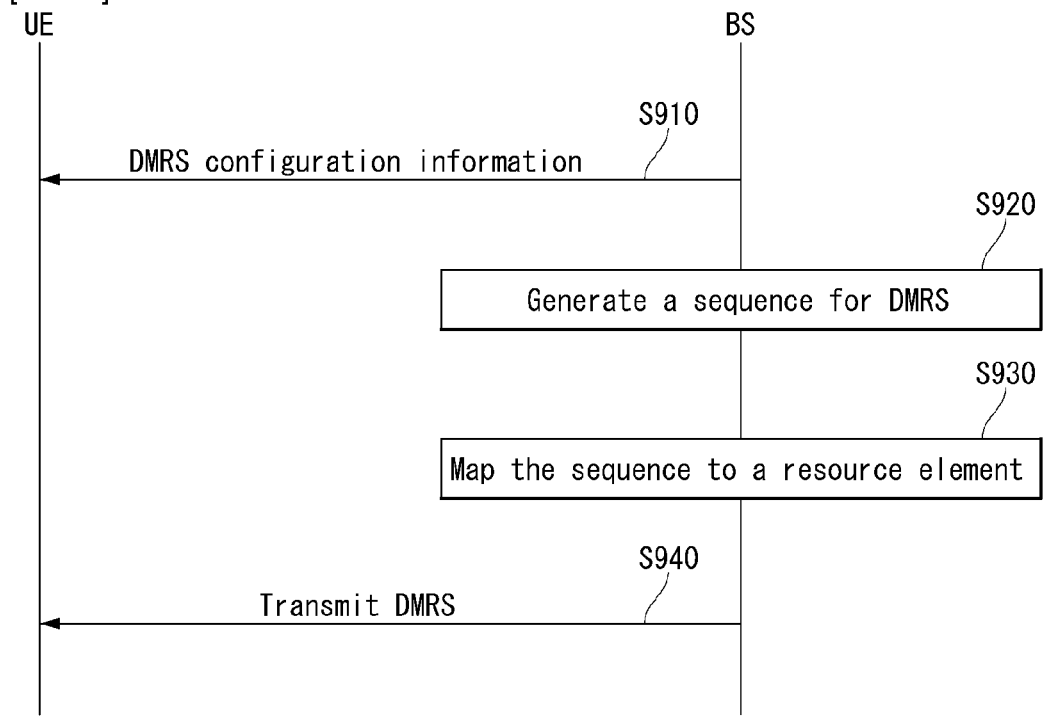

[FIG. 10]
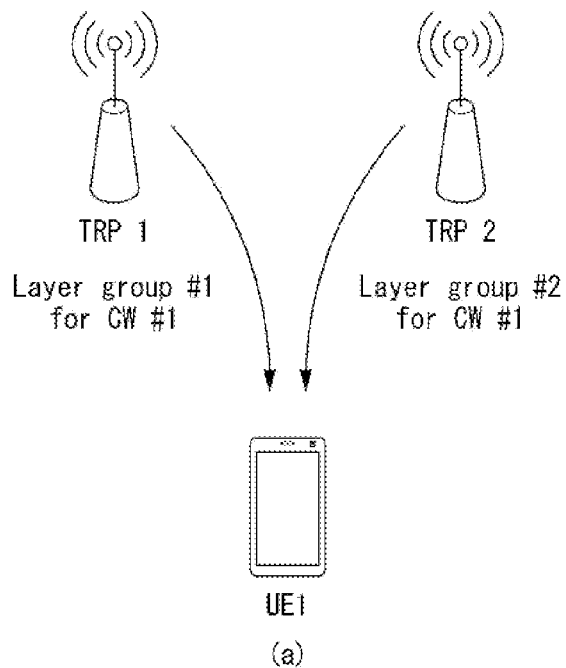
(a)
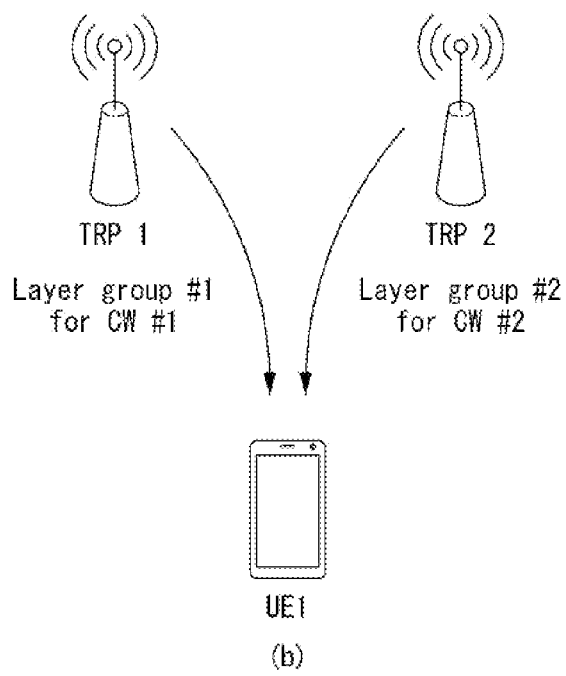
(b)

[FIG. 11]
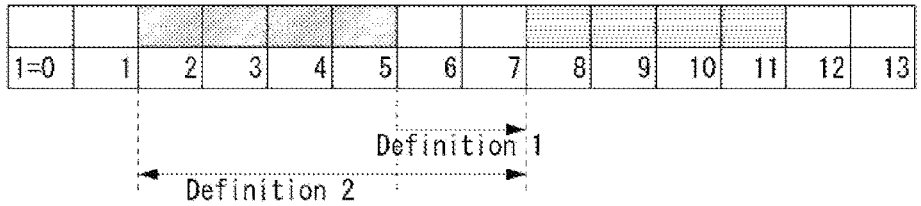
[FIG. 12]
[FIG. 13]
[FIG. 14]
[FIG. 15]
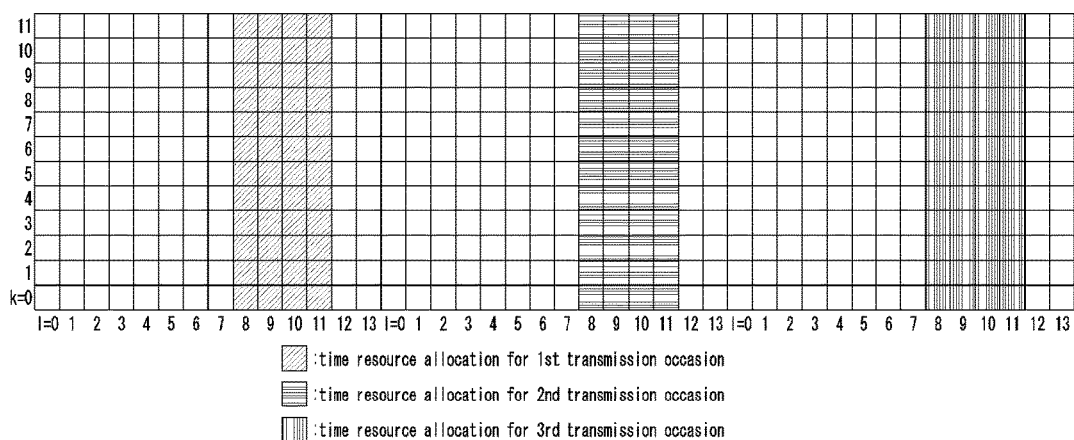

[FIG. 16]
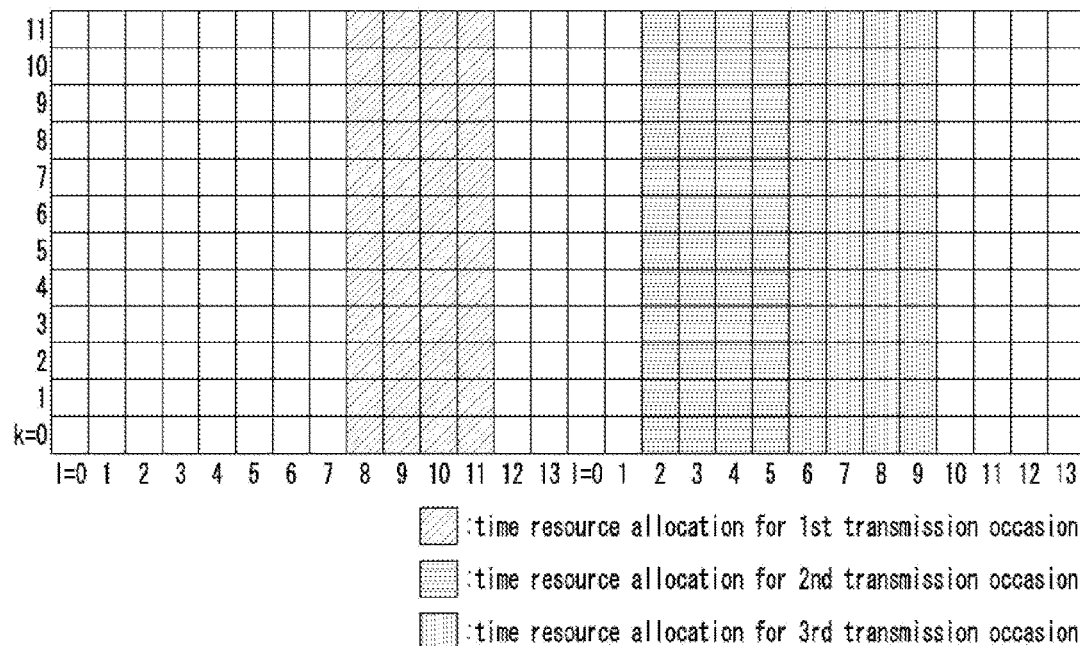
[FIG. 17]
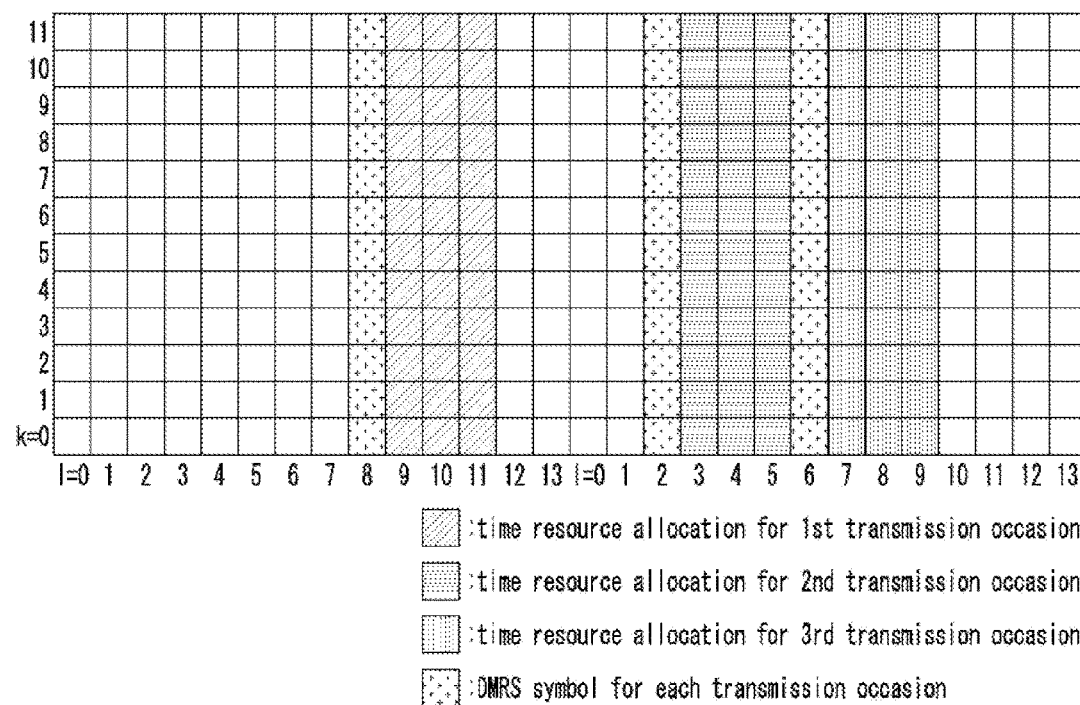

[FIG. 18]
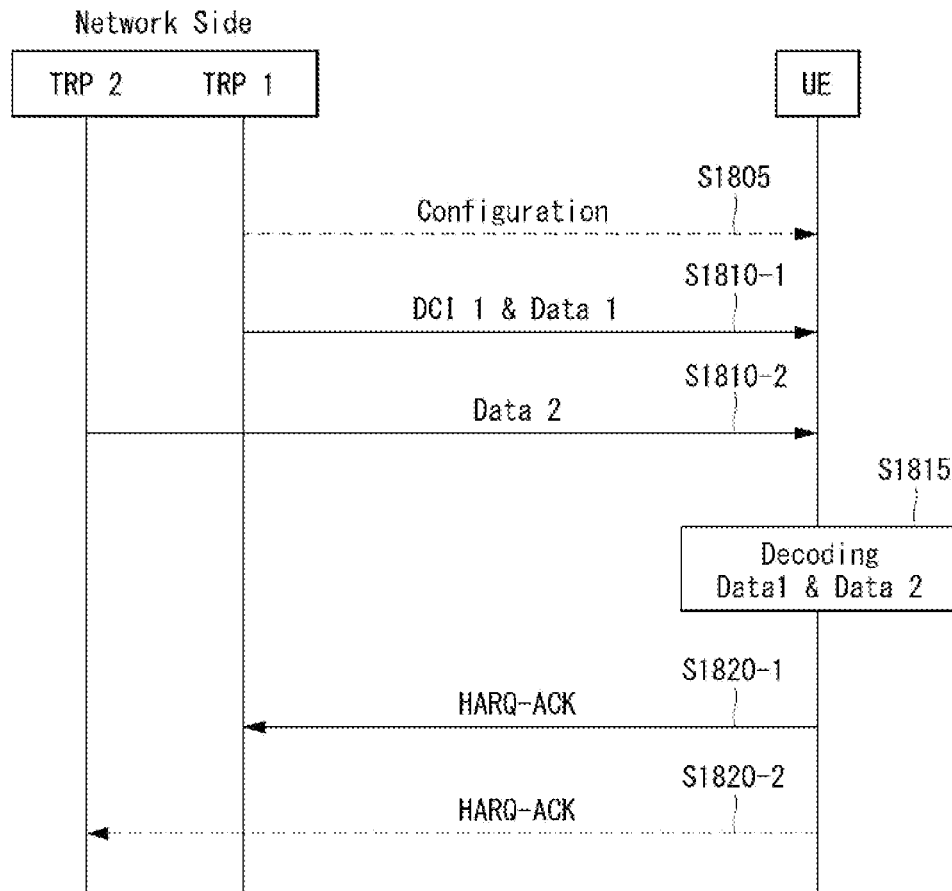
[FIG. 19]
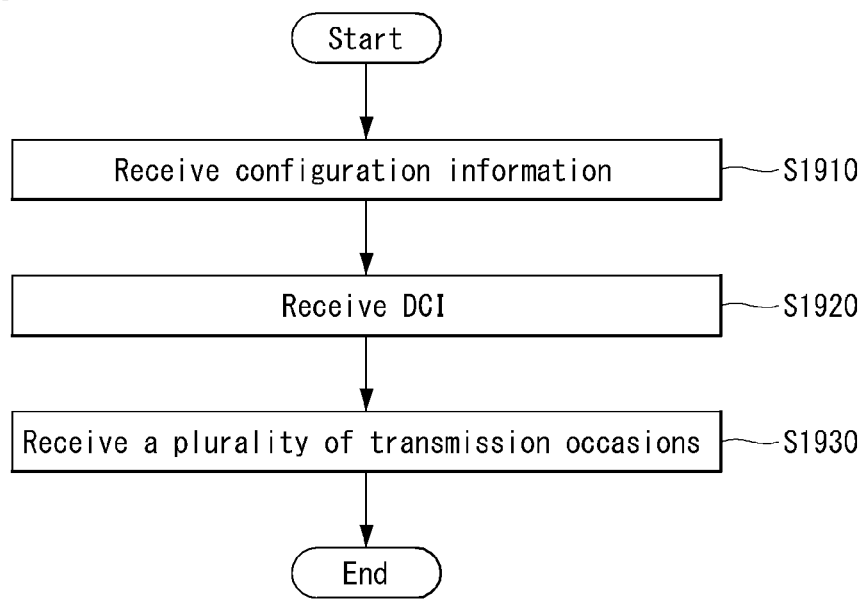

[FIG. 20]
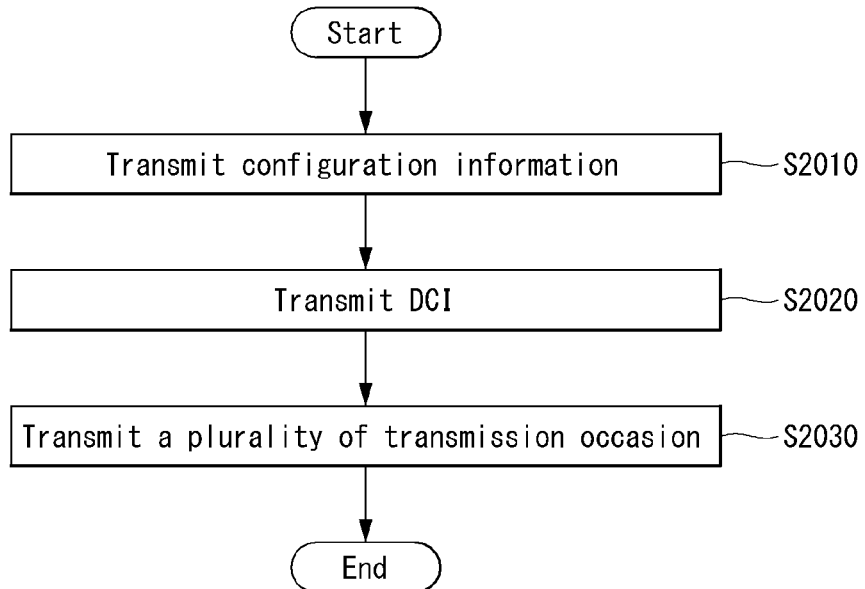
[FIG. 21]
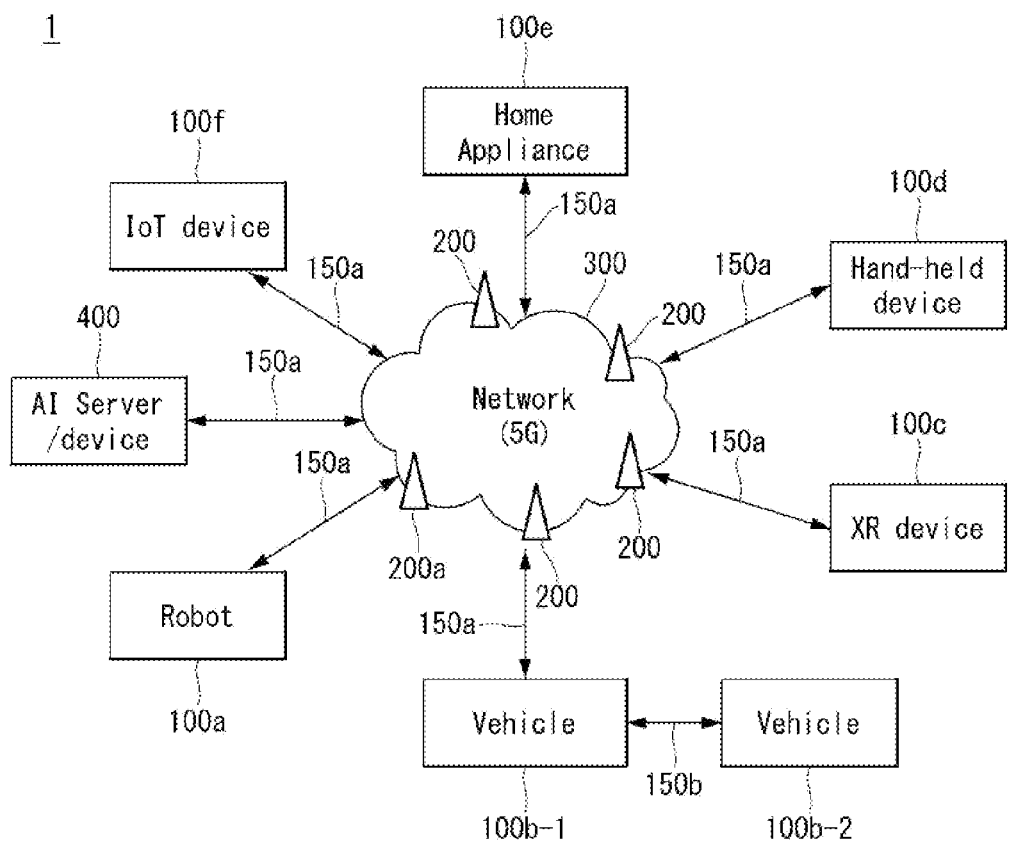

[FIG. 22]
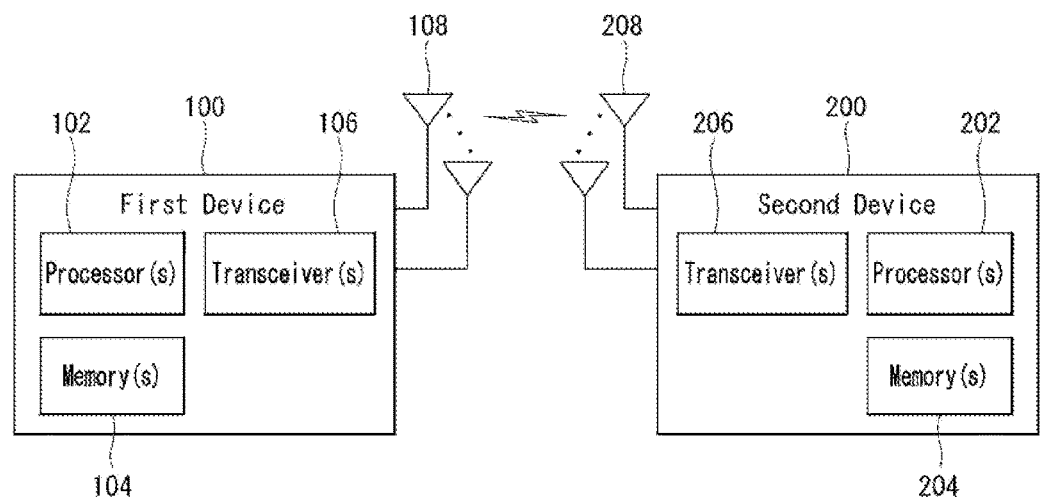
[FIG. 23]
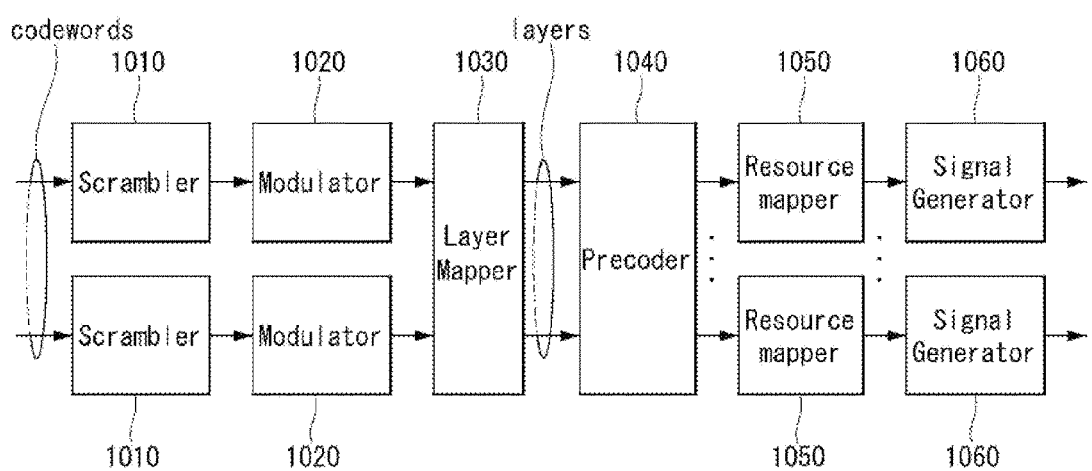

[FIG. 24]
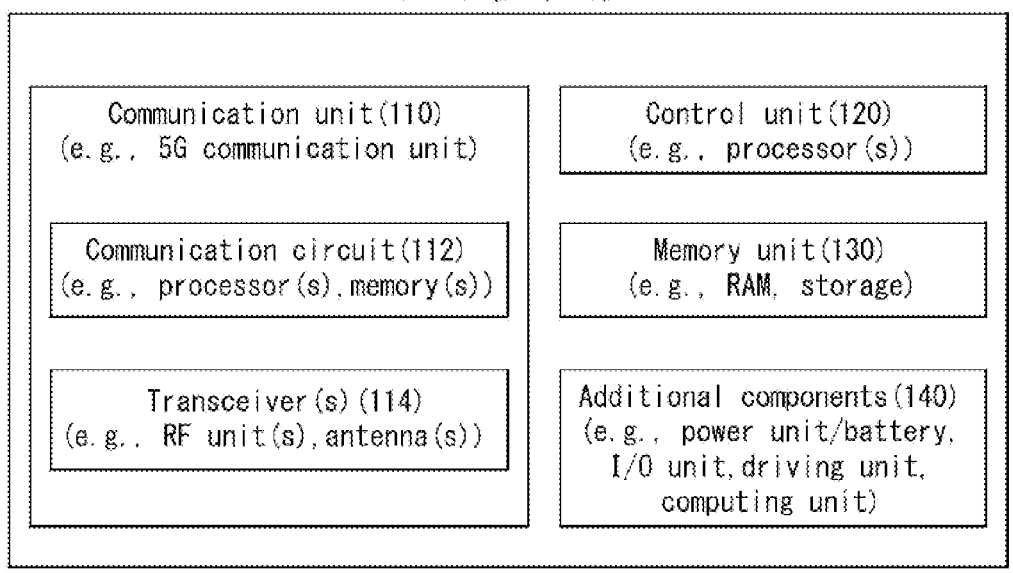
[FIG. 25]
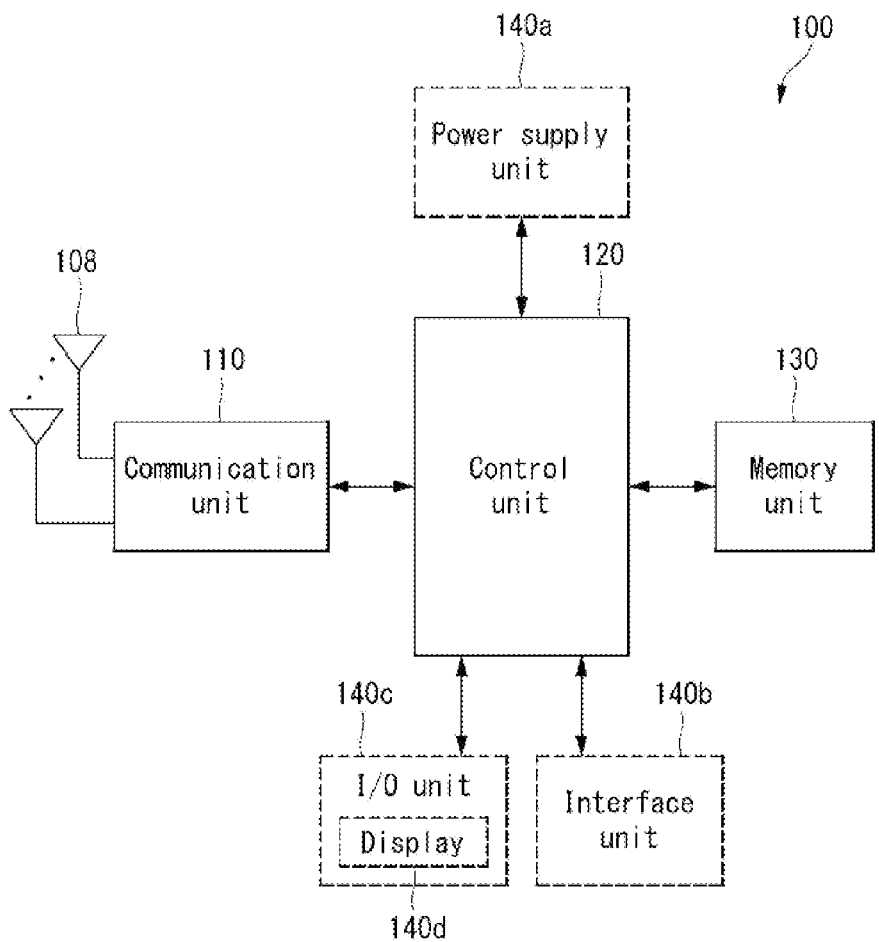

METHOD FOR TRANSMITTING/RECEIVING DOWNLINK DATA IN WIRELESS COMMUNICATION SYSTEM BASED ON A TIME DOMAIN RESOURCE THAT IS BASED ON ONE OR MORE SLOTS, AND DEVICE THEREFOR

CROSS-REFERENCE TO RELATED APPLICATIONS

This application is the National Stage filing under 35 U.S.C. 371 of International Application No. PCT/KR2020/010914, filed on Aug. 14, 2020, which claims the benefit of earlier filing date and right of priority to Korean Patent Application Nos. 10-2019-0099946 filed on Aug. 14, 2019, 10-2019-0107786 filed on Aug. 30, 2019, 10-2019-0122722 filed on Oct. 3, 2019, 10-2019-0127361 filed on Oct. 14, 2019, and 10-2019-0143020 filed on Nov. 8, 2019, and also claims the benefit of U.S. Provisional Application Nos. 62/886,932 filed on Aug. 14, 2019, 62/891,230 filed on Aug. 23, 2019, and 62/896,009 filed on Sep. 5, 2019, the contents of all of which are hereby incorporated by reference herein in their entirety.

TECHNICAL FIELD

The present disclosure relates to a wireless communication system and, more particularly, to a method of transmitting and receiving downlink data based on multiple Transmission Reception Points (TRPs) and a device supporting the method.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure proposes a method of receiving, by a UE supported by multiple transmission reception points (TRPs), downlink data in a wireless communication system.

Specifically, the present disclosure proposes a method of configuring a scheme (e.g., eMBB operation or URLLC operation) in which multiple TRPs perform cooperative transmission.

Further, the present disclosure proposes a method of configuring a specific scheme among various schemes related to a URLLC M-TRP operation.

Further, the present disclosure proposes a method of configuring the number of times at which transmission occasions corresponding to the same transport block are repeatedly transmitted by considering a TDM based URLLC M-TRP operation.

Further, the present disclosure proposes a method of configuring a resource of a time domain in which transmission occasions corresponding to the same transport block are repeatedly transmitted by considering the TDM based URLLC M-TRP operation.

Further, the present disclosure proposes a method of configuring a field (e.g., TCI field) of DCI by considering an M-TRP operation.

Technical problems to be solved by the present disclosure are not limited by the above-mentioned technical problems, and other technical problems which are not mentioned above can be clearly understood from the following description by those skilled in the art to which the present disclosure pertains.

Technical Solution

In the present disclosure, a method of receiving downlink data by a user equipment (UE) in a wireless communication system, the method comprising: receiving configuration information; receiving downlink control information (DCI), wherein the DCI includes a transmission configuration indication (TCI) field, and wherein a plurality of TCI states are indicated based on the TCI field; and receiving a plurality of transmission occasions of an identical transport block based on the DCI, wherein the plurality of transmission occasions are received in a time domain resource based on time division multiplexing (TDM), and wherein a number of the plurality of transmission occasions is determined based on a number of the plurality of TCI states.

Furthermore, in the present disclosure, wherein a first TCI state corresponds to a first transmission occasion, and wherein a second TCI state corresponds to a second transmission occasion.

Furthermore, in the present disclosure, wherein each of transmission occasion consists of 2, 4 or 7 ODFM symbols.

Furthermore, in the present disclosure, wherein the first transmission occasion and the second transmission occasion are received in one slot.

Furthermore, in the present disclosure, wherein the DCI further includes a RV field, and wherein a RV value of a first transmission occasion and a RV value of a second transmission occasion are differently configured based on the RV field.

Furthermore, in the present disclosure, wherein the configuration information includes information on the number of the plurality of transmission occasions.

Furthermore, in the present disclosure, wherein each transmission occasion is TDMed as a slot unit.

Furthermore, in the present disclosure, wherein candidate values for the number of the plurality of transmission occasions are indicated based on the configuration information, and wherein one value is determined based on the DCI among the candidate values.

Furthermore, in the present disclosure, wherein the DCI further includes a time domain resource assignment field, and wherein a first time domain resource of the first transmission occasion is indicated based on the time domain resource assignment field, among the plurality of transmission occasions.

Furthermore, in the present disclosure, wherein a size of a second time domain resource of the second transmission occasion is same with a size of the first time domain resource.

Furthermore, in the present disclosure, wherein the first time domain resource and the second time domain resource contiguously locate.

Furthermore, in the present disclosure, wherein the second time domain resource locates apart from the first time domain resource as much as a specific symbol number.

Furthermore, in the present disclosure, wherein the specific symbol number is received through a higher layer signaling.

Furthermore, in the present disclosure, wherein the configuration information further includes information on a transmission scheme for the downlink data.

Furthermore, in the present disclosure, a user equipment (UE) receiving downlink data in a wireless communication system, the UE comprising: one or more transceivers; one or more processors; and one or more memories for storing instructions for operations executed by the one or more processors and coupled to the one or more processors; wherein the operations comprising: receiving configuration information; receiving downlink control information (DCI), wherein the DCI includes a transmission configuration indication (TCI) field, and wherein a plurality of TCI states are indicated based on the TCI field; and receiving a plurality of transmission occasions of an identical transport block based on the DCI, wherein the plurality of transmission occasions are received in a time domain resource based on time division multiplexing (TDM), and wherein a number of the plurality of transmission occasions is determined based on a number of the plurality of TCI states.

Furthermore, in the present disclosure, a method of transmitting downlink data by a base station in a wireless communication system, the method comprising: transmitting, to a user equipment (UE), configuration information; transmitting, to the UE, downlink control information (DCI), wherein the DCI includes a transmission configuration indication (TCI) field, and wherein a plurality of TCI states are indicated based on the TCI field; and transmitting, to the UE, a plurality of transmission occasions of an identical transport block based on the DCI, wherein the plurality of transmission occasions are received in a time domain resource based on time division multiplexing (TDM), and wherein a number of the plurality of transmission occasions is determined based on a number of the plurality of TCI states.

Furthermore, in the present disclosure, a base station for transmitting downlink data in a wireless communication system, the base station comprising: one or more transceivers; one or more processors; and one or more memories for storing instructions for operations executed by the one or more processors and coupled to the one or more processors; wherein the operations comprising: transmitting, to a user equipment (UE), configuration information; transmitting, to the UE, downlink control information (DCI), wherein the DCI includes a transmission configuration indication (TCI) field, and wherein a plurality of TCI states are indicated based on the TCI field; and transmitting, to the UE, a plurality of transmission occasions of an identical transport block based on the DCI, wherein the plurality of transmission occasions are received in a time domain resource based on time division multiplexing (TDM), and wherein a number of the plurality of transmission occasions is determined based on a number of the plurality of TCI states.

Furthermore, in the present disclosure, an apparatus comprising one or more memories and one or more processors operatively coupled to the one or more memories, the apparatus comprising: wherein the one or more processors control the apparatus to: receive configuration information; receive downlink control information (DCI), wherein the DCI includes a transmission configuration indication (TCI) field, and wherein a plurality of TCI states are indicated based on the TCI field; and receive a plurality of transmission occasions of an identical transport block based on the DCI, wherein the plurality of transmission occasions are received in a time domain resource based on time division multiplexing (TDM), and wherein a number of the plurality of transmission occasions is determined based on a number of the plurality of TCI states.

Furthermore, in the present disclosure, one or more non-transitory computer-readable media storing one or more instructions, the one or more instructions executable by one or more processors comprising: an instruction instructs a user equipment (UE) to: receive configuration information; receive downlink control information (DCI), wherein the DCI includes a transmission configuration indication (TCI) field, and wherein a plurality of TCI states are indicated based on the TCI field; and receive a plurality of transmission occasions of an identical transport block based on the DCI, wherein the plurality of transmission occasions are received in a time domain resource based on time division multiplexing (TDM), and wherein a number of the plurality of transmission occasions is determined based on a number of the plurality of TCI states.

Advantageous Effect

According to an embodiment of the present disclosure, an operation scheme of multiple TRPs can be configured to a UE and the UE can perform an operation corresponding thereto.

Further, according to an embodiment of the present disclosure, the number (the number of repetition times of transmission occasions) of transmission occasions corresponding to the same transport block in TDM based M-TRP URLLC transmission can be configured.

Further, according to an embodiment of the present disclosure, a shifting symbol and/or RV values can be configured for each transmission occasion.

Further, according to an embodiment of the present disclosure, a resource region can be determined in which the transmission occasions corresponding to the same transport block are received in the TDM based M-TRP URLLC transmission.

Further, according to an embodiment of the present disclosure, a conventional DCI field can be configured or interpreted to suit an M-TRP operation.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission used in a 3GPP system.

FIG. 7 is a diagram illustration an example of downlink transmission/reception operation.

FIG. 8 illustrates an example of uplink transmission/reception operation.

FIG. 9 is a flowchart illustrating an example of DL DMRS procedure.

FIG. 10 illustrates a transmission and reception method of reliability improvement supported by multiple TRPs, and the following two methods may be considered.

FIG. 11 illustrates an example of a configuration of a shifting symbol between transmission occasions.

FIG. 12 illustrates an example of a transmission occasion repeatedly transmitted in one slot.

FIG. 13 illustrates an example of resource allocation for repeated transmission in a time domain proposed in the present disclosure.

FIG. 14 illustrates an example of slot unit repeated transmission based on a transmission occasion structure defined in a first slot in order to prevent repeated transmission by exceeding one slot.

FIG. 15 illustrates an example of resource allocation to a transmission occasion exceeding a slot boundary according to a method proposed in the present disclosure.

FIG. 16 illustrates an example of a time domain resource allocation method when a transmission occasion exceeding a slot boundary occurs to which the method proposed in the present disclosure may be applied.

FIG. 17 illustrates an example of application of a DMRS pattern to repeatedly transmitted transmission occasions.

FIG. 18 illustrates an example of a signaling procedure of performing data transmission and reception between a network side and a UE in a situation of multiple TPs to which a method and/or embodiments proposed in the present disclosure may be applied.

FIG. 19 illustrates an example of an operation flowchart of a UE performing data transmission and reception to which a method and/or an embodiment proposed in the present disclosure may be applied.

FIG. 20 illustrates an example of an operation flowchart of a BS performing data transmission and reception to which a method and/or an embodiment proposed in the present disclosure may be applied.

FIG. 21 illustrates a communication system (1) applied to the present disclosure.

FIG. 22 illustrates a wireless device which may be applied to the present disclosure.

FIG. 23 illustrates a signal processing circuit for a transmit signal.

FIG. 24 illustrates another example of a wireless device applied to the present disclosure.

FIG. 25 illustrates a hand-held device applied to the present disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE
- 36.211: Physical channels and modulation
- 36.212: Multiplexing and channel coding
- 36.213: Physical layer procedures
- 36.300: Overall description
- 36.331: Radio Resource Control (RRC)

3GPP NR
- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New RAT (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher there than, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology $\mu$, slots are numbered in increasing order of $n_s^\mu \in \{0, \ldots, N_{subframe}^{slots, \mu}-1\}$ within a subframe and are numbered in increasing order of $n_{s,f}^\mu \in \{0, \ldots, N_{frame}^{slots, \mu}-1\}$ frame within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame, \mu}$ of slots per radio frame, and the number $N_{slot}^{subframe, \mu}$ of slots per subframe in a normal CP. Table 4 represents the number of OFDM symbols per slot, the number of slots per radio frame, and the number of slots per subframe in an extended CP.

TABLE 3

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of $\mu=2$, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of $14 \cdot 2\mu$ OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max, \mu}$ denotes a maximum transmission bandwidth and may change not only between numerologies but also between uplink and downlink.

In this case, as illustrated in FIG. 5, one resource grid may be configured per numerology $\mu$ and antenna port p.

FIG. 5 illustrates examples of a resource grid per antenna port and numerology to which a method proposed in the present disclosure is applicable.

Each element of the resource grid for the numerology $\mu$ and the antenna port p is called a resource element and is uniquely identified by an index pair (k,l̄) where k=0, ..., $N_{RB}^{\mu} N_{sc}^{RB}-1$ is an index on a frequency domain, and l̄=0, ..., $2^{\mu} N_{symb}^{(\mu)}-1$ refers to a location of a symbol in a subframe. The index pair (k,l̄) is used to refer to a resource element in a slot, where l=0, ..., $N_{symb}^{\mu}-1$.

The resource element (k,l̄) for the numerology μ and the antenna port p corresponds to a complex value $a_{k,l̄}^{(p,\mu)}$. When there is no risk for confusion or when a specific antenna port or numerology is not specified, the indexes p and μ may be dropped, and as a result, the complex value may be $a_{k,l̄}^{(p)}$ or $a_{k,l̄}$.

Further, a physical resource block is defined as $N_{sc}^{RB}=12$ consecutive subcarriers in the frequency domain.

Point A serves as a common reference point of a resource block grid and may be obtained as follows.
- offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;
- absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Bandwidth Part (BWP)

The NR system may support up to 400 MHz per component carrier (CC). If a UE which operates in wideband CC operates while continuously turning on RF for all CCs, UE battery consumption may increase. Alternatively, when several use cases (e.g., eMBB, URLLC, Mmtc, V2X, etc.) which operate in one wideband CC are considered, different numerologies (e.g., sub-carrier spacing) may be supported for each frequency band in the corresponding CC. Alternatively, a capability for the maximum bandwidth may vary for each UE. By considering this, the BS may instruct the UE to operate only in a partial bandwidth rather than the entire bandwidth of the wideband CC and the corresponding partial bandwidth is defined as the bandwidth part (BWP) for convenience. The BWP may be constituted by consecutive resource blocks (RBs) on the frequency axis and may correspond to one numerology (e.g., sub-carrier spacing, CP length, slot/mini-slot duration).

Meanwhile, the BS may configure multiple BWPs even in one CC configured to the UE. As one example, a BWP occupying a relatively small frequency domain may be configured in a PDCCH monitoring slot and a PDSCH indicated in PDCCH may be scheduled onto a BWP larger therethan. Alternatively, when UEs are concentrated on a specific BWP, some UEs may be configured to other BWPs for load balancing. Alternatively, a partial spectrum of the entire bandwidth may be excluded and both BWPs may be configured even in the same slot by considering frequency domain inter-cell interference cancellation between neighboring cells. In other words, the BS may configure at least one DL/UL BWP to the UE associated with the wideband CC and activate at least one DL/UL BWP (by L1 signaling or MAC CE or RRC signaling) among configured DL/UL BWP(s) at a specific time and switching may be indicated to another configured DL/UL BWP (by L1 signaling or MAC CE or RRC signaling) or when a timer value is expired based on a timer, the timer value may be switched to the DL/UL BWP. In this case, the activated DL/UL BWP is defined as an active DL/UL BWP. However, in a situation in which the UE is in an initial access process or before RRC connection is set up, the UE may not receive a configuration for the DL/UL BWP and in such a situation, the DL/UL BWP assumed by the UE is defined as an initial active DL/UL BWP.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

For example, in an NR system, DCI format 0_0 and DCI format 0_1 may be used for scheduling PUSCH in one cell, and DCI format 1_0 and DCI format 1_1 may be used for scheduling PDSCH in one cell. Information included in DCI format 0_0 is CRC-scrambled and transmitted by C-RNTI, CS-RNTI, or MCS-C-RNTI. In addition, DCI format 0_1 is used for reserving the PUSCH in one cell. Information included in DCI format 0_1 is CRC-scrambled and transmitted by C-RNTI, CS-RNTI, SP-CSI-RNTI, or MCS-C-RNTI. DCI format 1_0 is used for scheduling of the PDSCH in one DL cell. Information included in DCI format 1_0 is CRC-scrambled and transmitted by C-RNTI, CS-RNTI, or MCS-C-RNTI. DCI format 1_1 is used for scheduling of the PDSCH in one cell. Information included in DCI format 1_1 is CRC-scrambled and transmitted by C-RNTI, CS-RNTI, or MCS-C-RNTI. DCI format 2_1 is used to inform PRB(s) and OFDM symbol(s) of which the UE may assume not intending transmission. Information included in DCI format 2_1 such as preemption indication 1, preemption indication 2, . . . , preemption indication N, and the like is CRC-scrambled and transmitted by INT-RNTI.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

DL and UL Transmission/Reception Operation
Downlink Transmission/Reception Operation FIG. 7 is a diagram illustration an example of downlink transmission/reception operation.

Referring to FIG. 7, a BS schedules downlink transmission such as a frequency/time resource, a transport layer, a downlink precoder, MCS, and the like (step S701). In particular, the BS may determine a beam for PDSCH transmission to a UE through the above-described beam management operations. The UE receives Downlink Control Information (DCI) for downlink scheduling (i.e., including scheduling information of the PDSCH) on the PDCCH from the BS (step S702). DCI format 1_0 or 1_1 may be used for the downlink scheduling and in particular, DCI format 1_1 includes the following information: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization, MCS (modulation and coding scheme), New data indicator, redundancy version, HARQ process number, downlink assignment index etc In the case of 2-codeword transmission (e.g., maxNrofCodeWordsScheduledByDCI=2), an MCS/NI/RV field may be configured for each of TB 1 and TB 2.

Particularly, according to each state indicated in an antenna port(s) field/index, the number of DMRS ports may be scheduled and in addition, Single-user (SU)/Multi-user (MU) transmission scheduling is also available. Specifically, based on 'dmrs-Type' and 'maxLength', tables/rules for interpretation of antenna port(s) field values may be defined, respectively. Number of DMRS CDM group without data/DMRS port(s)/Number of front-load symbols corresponding to one CW/two CW may be determined according to the antenna port(s) field value. Furthermore, a TCI field is configured by 3 bits and a maximum of 8 TCI states are indicated according to a TCI field value to dynamically the QCL for the DMRS. The UE receives downlink data from the BS on the PDSCH (step S703). When the UE detects a PDCCH including DCI format 1_0 or 1_1, the UE decodes the PDSCH according to the indication by the corresponding DCI.

Here, when the UE receives a PDSCH scheduled by DCI format 1_1, a DMRS configuration type may be configured by higher layer parameter 'dmrs-Type' in the UE, and the DMRS type is used for receiving the PDSCH. Furthermore, in the UE, the maximum number of front-loaded DMRA symbols for the PDSCH may be configured by higher layer parameter 'maxLength'.

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not associated with PDSCH transmission to another UE.

When the UE receives the PDSCH, a precoding granularity P' may be assumed as a consecutive resource block in the frequency domain. Here, P' may correspond to one value of {2, 4, and wideband}. When P' is determined as wideband, the UE does not predict that the PDSCH is scheduled to non-contiguous PRBs, and the UE may assume that the same precoding is applied to the allocated resource. On the contrary, when P' is determined as any one of {2 and 4}, a Precoding Resource Block Group (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE first reads a 5-bit MCD field in the DCI and determines the modulation order and the target code rate. In addition, the UE reads a redundancy version field in the DCI and determines a redundancy version. Furthermore, the UE determines the transport block size by using the number of layers before rate matching and the total number of allocated PRBs.

A transport block may be constructed with one or more code block groups (CBGs), and one CBG may be constructed with one or more code blocks (CBs). Furthermore, in an NR system, data transmission/reception in a CB/CBG unit as well as data transmission/reception in a transport block unit but also may be available. Accordingly, the UE may receive information on CB/CBG from the BS through DCI (e.g., DCI format 0_1, DCI format 1_1, etc.). In addition, the UE may receive information on a data transmission unit (e.g., TB/CB/CBG) from the BS.

Meanwhile, mapping a codeword, a layer, and an antenna port for the PDSCH is as follows. Modulated symbols $d^{(q)}(0), \ldots, d^{(q)}(M_{symb-1}^{(q)})$ of a complex value for a codeword (CW) q are mapped to layers $x(i)=[x^{(0)}(i) \ldots x^{(v-1)}(i)]^T$ and $i=0, 1, \ldots, M_{symb}^{layer}-1$, symb and the layers x(i) are mapped to antenna ports according to Equation 3. Here, v represents the number of layers, and $M_{symb}^{layer}$ represents the number of modulated symbols per layer.

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix} \text{ where } i = 0,$$

$$1, \ldots M_{symb}^{ap} - 1, M_{symb}^{ap} = M_{symb}^{layer}$$

[Equation 3]

A set $\{p_0, \ldots, p_{v-1}\}$ of the antenna ports may be determined according to a procedure of [4, TS 38.212]. That is, the antenna ports may be sequentially mapped to the layers in the order of DMRS ports indicated to the UE through DMRS table.

Uplink Transmission/Reception Operation

FIG. 8 illustrates an example of uplink transmission/reception operation.

Referring to FIG. 8, a BS schedules uplink transmission such as the frequency/time resource, the transport layer, an uplink precoder, the MCS, and the like (step S801). In particular, the BS may determine a beam for PUSCH transmission of the UE through the above-described operations. A UE receives DCI for downlink scheduling (i.e., including scheduling information of the PUSCH) on the PDCCH (step S802). DCI format 0_0 or 0_1 may be used for the uplink scheduling and in particular, DCI format 0_1 includes the following information: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

Particularly, SRS resources configured in an SRS resource set associated with higher layer parameter 'usage' may be indicated by an SRS resource indicator field. Further, 'spatialRelationInfo' may be configured for each SRS resource and a value of 'spatialRelationInfo' may be one of {CRI, SSB, and SRI}.

Furthermore, the UE transmits the uplink data to the BS on the PUSCH (step S803). When the UE detects a PDCCH including DCI format 0_0 or 0_1, the UE transmits the corresponding PUSCH according to the indication by the corresponding DCI. Two transmission schemes including a codebook based transmission and a non-codebook based transmission are supported for PUSCH transmission.

In the case of the codebook based transmission, when higher layer parameter txConfig' is set to 'codebook', the UE is configured to the codebook based transmission. On the contrary, when higher layer parameter txConfig' is set to 'nonCodebook', the UE is configured to the non-codebook based transmission. When higher layer parameter 'txConfig' is not configured, the UE does not predict that the PUSCH is scheduled by DCI format 0_1. When the PUSCH is scheduled by DCI format 0_0, the PUSCH transmission is based on a single antenna port. In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter 'nrofSRS-Ports'. When the UE is set to higher layer parameter 'txConfig' set to 'codebook', at least one SRS resource is configured in the UE. An SRI indicated in slot n is associated with most recent transmission of the SRS resource identified by the SRI and here, the SRS resource precedes PDCCH (i.e., slot n) carrying the SRI.

In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter 'srs-ResourceIndicator'. The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter 'usage' set to 'non-Codebook'. The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

DMRS (Demodulation Reference Signal)

A DMRS related operation for PDSCH reception is described.

When a UE receives a PDSCH scheduled by DCI format 1_0 or receives a PDSCH before configuring an arbitrary dedicated higher layer among dmrs-AdditionalPosition, maxLength and dmrs-Type parameters, the UE assumes that a PDSCH is not existed in an arbitrary symbol that carries a DM-RS excluding a PDSCH having an allocation duration of two symbols having PDSCH mapping type B, a single symbol front-loaded DM-RS of configuration type 1 is transmitted on DM-RS port 1000, and all of remaining orthogonal antenna ports are not related to transmission of PDSCH to another UE.

Additionally, for a PDSCH having mapping type A, the UE assumes that dmrs-AdditionalPosition='pos2' and a maximum of two additional single-symbol DM-RSs are existed in a slot depending on a PDSCH duration. With respect to a PDSCH having an allocation duration of 7 symbols for a normal CP or 6 symbols for an extended CP having mapping type B, when front-loaded DM-RS symbols are located at the $1^{st}$ and $2^{nd}$ symbols of PDSCH allocation duration, respectively, the UE assumes that an additional single symbol DM-RS is existed in the $5^{th}$ or $6^{th}$ symbol. Otherwise, the UE assumes that an additional DM-RS symbol is not existed. In addition, with respect to a PDSCH having an allocation duration of 4 symbols having mapping type B, the UE assumes that no more additional DM-RS symbol is not existed, with respect to a PDSCH having an allocation duration of 2 symbols having mapping type B, the UE assumes that an additional DM-RS symbol is not existed, and the UE assumes that a PDSCH is existed in a symbol that carries a DM-RS.

FIG. 9 is a flowchart illustrating an example of DL DMRS procedure.

A BS transmits DMRS configuration information to a UE (step S910).

The DMRS configuration information may refer to a DMRS-DownlinkConfig information element (IE). The DMRS-DownlinkConfig IE may include a dmrs-Type parameter, a dmrs-AdditionalPosition parameter, a max-Length parameter, and a phaseTrackingRS parameter.

The 'dmrs-Type' parameter is a parameter for selecting a DMRS configuration type to be used for DL. In NR, the DMRS may be divided into two configuration types: (1) DMRS configuration type 1 and (2) DMRS configuration type 2. DMRS configuration type 1 has a higher RS density in the frequency domain, and DMRS configuration type 2 has more DMRS antenna ports.

The 'dmrs-AdditionalPosition' parameter is a parameter indicating the position of an additional DMRS on DL. In the case that the corresponding parameter is not existed, the UE applies pos2 value. For the DMRS, a first position of front-loaded DMRS is determined according to PDSCH mapping type (type A or type B), and an additional DMRS may be set to support the UE of high speed. The front-loaded DMRS is indicated by RRC signaling and DCI (downlink control information).

The 'maxLength' parameter is a parameter indicating the maximum number of OFDM symbols for a DL front-loaded DMRS. The phaseTrackingRS parameter is a parameter for configuring a DL PTRS. In the case that the parameter is not existed or terminated, the UE assumes that there is no DL PTRS.

The BS generates a sequence used for DMRS (step S920).

The sequence for DMRS is generated according to Equation 4 below.

$$r(n) = \frac{1}{\sqrt{2}}(1 - 2 \cdot c(2n)) + j\frac{1}{\sqrt{2}}(1 - 2 \cdot c(2n+1)) \quad \text{[Equation 4]}$$

The pseudo-random sequence c(i) is defined in 3gpp TS 38.211 5.2.1. That is, c(i) may be a gold sequence of length-31 using two m-sequences. A pseudo-random sequence generator is initialized by Equation 5 below.

$$c_{init} = \left(2^{17}\left(N_{symb}^{slot}n_{s,f}^{\mu} + l + 1\right)\left(2N_{ID}^{nSCID} + 1\right) + 2N_{ID}^{nSCID} + n_{SCID}\right) \bmod 2^{31} \quad \text{[Equation 5]}$$

Here, l is the number of OFDM symbol in a slot, and $n_{s,f}^{\mu}$ is a slot number in a frame.

Furthermore, if $N_{ID}^0$, $N_{ID}^1 \in \{0, 1, \ldots, 65535\}$ is provided, and in the case that a PDSCH is scheduled by a PDCCH using DCI format 1_1 with CRC scrambled by C-RNTI, MCS-C-RNTI, or CS-RNTI, $N_{ID}^0$, $N_{ID}^1 \in \{0, 1, \ldots, 65535\}$ is given by higher-layer parameter scramblingID0 and scramblingID1 in DMRS-DownlinkConfig IE, respectively.

If $N_{ID}^0 \in \{0, 1, \ldots, 65535\}$ is provided, and in the case that a PDSCH is scheduled by a PDCCH using DCI format 1_0 with CRC scrambled by C-RNTI, MCS-C-RNTI, or CS-RNTI, $N_{ID}^0 \in \{0, 1, \ldots, 65535\}$ is given by higher-layer parameter scramblingID0 in DMRS-DownlinkConfig IE.

$N_{ID}^{nSCID} = N_{ID}^{cell}$, otherwise, and in the case that DCI format 1_1 is used, quantity $n_{SCID} \in \{0, 1\}$ is given by a DMRS sequence initialization field in DCI which is associated with PDSCH transmission.

The BS maps the generated sequence to a resource element (step S930). Here, the resource element may include at least one of a time, a frequency, an antenna port, or code.

Position 10 and reference point 1 of the first DMRS symbol may be determined according to the mapping type. In Mapping type A, the DMRS position is fixed to the third (pos 2) or the fourth (pos 3), and the start symbol of the PDSCH may be 0 to 3. The PDSCH length may be 3 to 14 in the case of a normal CP and 3 to 12 in the case of an extended CP. The DMRS symbol may start from the second or third symbol regardless of the start and length of the PDSCH, which means that it cannot be applied when the start symbol of the PDSCH is greater than 3. Mapping type A is used for slot-based scheduling. Meanwhile, in Mapping type B, the DMRS location is fixed to the first symbol of the allocated PDSCH. The PDSCH start symbol may be 0 to 12 in the case of a normal CP and 0 to 10 in the case of an extended CP. The PDSCH length may be 2, 4, or 7 symbols in the case of a normal CP, and may be 2, 4, or 6 symbols in the case of an extended CP. The DMRS symbol may start from the first PDSCH symbol regardless of the PDSCH start. Mapping type B may be used for mini-slot-based scheduling.

The BS transmits the DMRS to the UE on the resource element (step S940). The UE receives a PDSCH using the received DMRS.

UE DM-RS Transmission Procedure

The DMRS-related operation for receiving a PUSCH will be described. As described above, UL means signal transmission (or communication) from a UE to a BS. The UL DMRS-related operation is similar to the DL DMRS-related operation described above, and names of DL-related parameters may be replaced with the names of UL-related parameters.

In other words, DMRS-DownlinkConfig IE may be replaced with DMRS-UplinkConfig IE, PDSCH mapping type may be replaced with PUSCH mapping type, and PDSCH may be replaced with PUSCH. And, in the DL DMRS-related operation, the BS may be replaced with the UE, and the UE may be replaced with the BS. UL DMRS sequence generation may be defined differently according to whether the transform precoding is enabled.

In what follows, the UE DM-RS transmission procedure will be described in more detail.

If transmitted PUSCH is not scheduled by DCI format 0_1 with CRC scrambled by C-RNTI, CS-RNTI, or MCS-C-RNTI and does not correspond to a configured grant, the UE uses single symbol front-loaded DM-RS of configuration type 1 on DM-RS port 0, and the remaining REs not used for DM-RS in the symbols are not used for any PUSCH transmission except for PUSCH with allocation duration of 2 or fewer OFDM symbols with disabled transform precoding. Additional DM-RS may be transmitted according to the scheduling type and the PUSCH duration, considering whether frequency hopping is enabled.

If frequency hopping is disabled, the UE assumes that dmrs-AdditionalPosition='pos2' and up to two additional DM-RSs may be transmitted according to PUSCH duration. If frequency hopping is enabled, the UE assumes that dmrs-AdditoinalPosition is 'pos1', and up to one additional DM-RS may be transmitted according to PUSCH duration.

If transmitted PUSCH is scheduled by activation DCI format 0_0 with CRC scrambled by CS-RNTI, the UE uses single symbol front-loaded DM-RS of configuration type provided by higher layer parameter dmrs-Type in configuredGrantConfig on DM-RS port 0, the remaining REs not used for DM-RS in the symbols are not used for any PUSCH transmission except for PUSCH with allocation duration of 2 or fewer OFDM symbols with disabled transform precoding, and additional DM-RS with dmrs-AdditionalPosition may be transmitted from configuredGrantConfig according to the scheduling type and the PUSCH duration, considering whether frequency hopping is enabled.

When transmitted PUSCH is scheduled by DCI format 0_1 with CRC scrambled by C-RNTI, CS-RNTI, or MCS-RNTI or corresponds to a configured grant, the UE may be configured with higher layer parameter dmrs-Type in DMRS-UplinkConfig, and the configured DM-RS configuration type is used for transmitting PUSCH, and the UE may be configured with the maximum number of front-loaded DM-RS symbols for PUSCH by higher layer parameter maxLength in DMRS-UplinkConfig.

If a UE transmitting PUSCH is configured with the higher layer parameter phaseTrackingRS in DMRS-UplinkConfig, the UE may assume that the following configurations are not occurring simultaneously for the transmitted PUSCH.

Any DM-RS ports among 4-7 or 6-11 for DM-RS configuration type 1 and type 2 are scheduled respectively for the UE, and PT-RS is transmitted from the UE.

For PUSCH scheduled by DCI format 0_1, the UE assumes that the DM-RS CDM groups are not used for data transmission by activation DCI format 0_1 with CRC scrambled by CS-RNTI or configured grant type 1 configuration.

QCL (Quasi-Co Location)

The antenna port is defined so that a channel in which the symbol on the antenna port is transported may be inferred from a channel in which different symbols on the same antenna port are transported. When a property of a channel in which a symbol on one antenna port is transported may be interred from a channel in which symbols on different antenna ports are transported, two antenna ports may have a quasi co-located or quasi co-location (QC/QCL) relationship.

Here, the channel property includes at least one of a delay spread, a Doppler spread, a frequency/Doppler shift, average received power, received timing/average delay, and a spatial Rx parameter. Here, the spatial Rx parameter means a spatial (receive) channel property parameter such as angle of arrival.

The US may be configured as a list of up to M TCI-State configurations in higher layer parameter PDSCH-Config in order to decode the PDSCH according to detected PDCCH having an intended DCI for the corresponding UE and a given serving cell. The M depends on a UE capability.

Each TCI-State includes a parameter for configuring a quasi co-location relationship between one or two DL reference signals and a DM-RS port of the PDSCH.

The quasi co-location relationship is configured as higher layer parameter qcl-Type1 for a first DL RS and qcl-Type2 (when configured) for a second DL RS. Two DL RSs are not the same as each other in terms of QCL type regardless of whether two DL RS are DL RSs having the same reference or DL RSs having different references.

A quasi co-location type corresponding to each DL RS may be given by higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is specific NZP CSI-RS, corresponding NZP CSI-RS antenna ports may be indicated/configured to be QCL with specific TRS from the viewpoint of QCL-Type A and specific SSB from the viewpoint of QCL-Type D. The UE that receives the indication/configuration may receive the corresponding NZP CSI-RS by using a Doppler delay value measured in QCL-TypeA TRS and apply an Rx beam used for receiving QCL-TypeD SSB to reception of the corresponding NZP CSI-RS.

The UE may receive an activation command by MAC CE signaling which is used for mapping TCI states up to 8 to a codepoint DCI field 'Transmission Configuration Indication'.

The standard contents related to the above-described QCL may be as shown in Table 5 below (e.g. 3gpp TS 38.214. section 5.1.5. refer).

[Table 5]

TABLE 5

When the HARQ-ACK corresponding, to the PDSCH carrying the activation command is transmitted in slot n, the indicated mapping between TCI states and codepoints of the DCI field 'Transmission Configuration Indication' should be applied starting from slot $n + 3N_{slot}^{subframe,\mu}+1$. After a UE recieves an initial higher layer configuration of TCI states and before reception of the activation command, the UE may assume that the DM-RS ports of PDSCH of a serving cell are quasi co-located with the SS/PBCH block determined in the initial access procedure with respect to 'QCL-TypeA', and when applicable, also with respect to'QCL-TypeD'.

If a UE is configured with the higher layer parameter tci-PresentInDCI that is set as 'enabled' for the CORESET scheduling the PDSCH, the UE assumes that the TCI field is present in the DCI format 1_1 of the PDCCH transmitted on the CORESET. If tci-PresentInDCI is not configured for the CORESET scheduling the PDSCH or the PDSCH is scheduled by a DCI format 1_0, and the time offset between the reception of the DL DCI and the corresponding PDSCH is equal to or greater than a threshold timeDurationForQCL, where the threshold is based on reported UE capability [13, TS 38.306], for determining PDSCH antenna port quasi co-location, the UE assumes that the TCI state or the QCL assumption for the PDSCH is identical to the TCI state or QCL assumption whichever is applied for the CORESET used for the PDCCH transmission.

If the tci-PresentInDCI is set as 'enabled', the TCI field in DCI in the scheduling component carrier points to the activated TCI states in the scheduled component carrier or DL BWP and when the PDSCH is seheduled by DCI format 1_1, the UE shall use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold is based on reported UE capability [13, TS 38.306]. When the UE is configured with a single slot PDSCH, the indicated TCI state should be based on the activated TCI states in the slot with the scheduled PDSCH. When the UE is configured with a multi-slot TABLE 5-continued PDSCH, the indicated TCI state should be based on the activated TCI states in the first slot with the scheduled PDSCH, and UE shall expect the activated TCI states are the same across the slots with the scheduled PDSCH. When the UE is configured with CORESET associated with a search space set for cross-carrier scheduling, the UE expects tci-PresentInDci is set as 'enabled' for the CORESET, and if one or more of the TCI states configured for the serving cell scheduled by the search space set contains 'QCL-TypeD', the UE exports, the time offset between the reception of the dectected PDCCH in the search space set and the corresponding PDSCH is larger than or equal to the threshold timeDurationForQCL.

For both the cases when tci-PresentInDCI is set to 'enabled' and tci-PresentInDCI is not configured in RRC connected mode, if the offest between the reception of the DL DCI and the corresponding PDSCH is less than the threshold timeDurationForQCL, the UE may assume that the DM-RS ports of PDSCH of a serving cell are quasi co-located with teh RS(s) with respect to the QCL parameter(s) used for PDCCH quasi co-location indication of the CORESET associated with a monitored search space with the lowest CORESET-ID in the latest slot in which one or more CORESETs within the active BWP or the serving cell are monitored by the UE. In this case, if the 'QCL-TypeD' of the PDSCH DM-RS is different from that of the PDCCH DM-RS with which they overlap in at least one symbol, the UE is expected to prioritize the reception of PDCCH asociated with that CORESET. This also applies to the intra-band CA case (when PDSCH and the CORESET are in different component carriers). If none of configured TCI contains 'QCL-TypeD', the UE shall obtain the other QCL assumptions from the indicated TCI states for its scheduled PDSCH irrespective of the time offset between the reception of the DL DCI and the corresponding PDSCH.

With respect to a beam indication, the UE may be configured by RRC with a list for a maximum of M candidate Transmission Configuration Indication (TCI) states for the purpose of at least QCL (Quasi Co-location) indication. Here, M may be 64.

Each TCI state may be set to one RS set. Each ID of the DL RSs for a spatial QCL purpose (QCL type D) in at least RS set may be referred to one of DL RS types such as SSB, P-CSI RS, SP-CSI RS, A-CSI RS, and the like. The initialization/update of the ID of the DL RS(s) in the RS set used for at least a spatial QCL purpose may be performed through at least explicit signaling.

TCI-State IE is associated with quasi co-location (QCL) type that corresponds to one or two DL reference signal (RS). TCI-State IE may include a parameter such as bwp-Id/referencesignal/QCL type, and the like.

The bwp-Id parameter indicates a DL BWP on which the RS is located, the cell parameter indicates a carrier on which the RS is located, and the referencesignal parameter indicates a reference antenna port(s) that becomes a source of quasi co-location for the corresponding target antenna port(s) or a reference signal including the reference antenna port(s). The target antenna port(s) may be CSI-RS, PDCCH DMRS, or PDSCH DMRS. In one example, in order to indicate QCL reference RS information for NZP CSI-RS, the NZP CSI-RS resource configuration information may indicate the corresponding TCI state ID. In another example, in order to indicate QCL reference information for PDCCH DMRS antenna port(s), each CORESET configuration may indicate the TCI state ID. In still another example, in order to indicate QCL reference information for PDSCH DMRS antenna port(s), TCI state ID may be indicated through DCI.

The descriptions (e.g., 3GPP system, frame structure, DL and UL transmission/reception operation, etc.) described above may be applied/used in combination with the method and/or embodiments proposed in the present disclosure or supplemented to clarify the technical feature of the methods proposed in the present disclosure. In the present disclosure, the sign "/" may mean that all or some of the contents distinguished by "/" are included.

Multi-TRP (Transmission/Reception Point)

According to the Coordinated Multi Point (COMP) technique, multiple BSs exchange (e.g., using X2 interface) or utilize channel information (e.g., RI/CQI/PMI/LI, etc.) feedbacked from UEs and perform cooperative transmission with UEs, and thereby controlling interference efficiently. The CoMP technique may be distinguished into Joint transmission (JT), Coordinated scheduling (CS), Coordinated beamforming (CB), DPS (dynamic point selection), DPB (dynamic point blacking), and the like according to the scheme to be used.

NCJT (Non-coherent joint transmission) may mean cooperative transmission not considering interference (i.e., without interference). For example, the NCJT may be a technique for a BS(s) to transmit data using the same time resource and frequency resource to a single UE through multiple TRPs. According to the technique, the multiple TRPs of the BS(s) may be configured to transmit data to the UE using different DMRS (demodulation reference signal) ports with each other through different layers. In other words, the NCJT may correspond to a transmission technique in which transmission of MIMO layer(s) is performed from two or more TRPs without adaptive precoding among TRPs.

The NCJT may be classified into fully overlapped NCJT scheme in which time resources and frequency resources used by each BS (or TRP) for transmission are fully overlapped and partially overlapped NCJT in which time resources and/or frequency resources used by each BS (or TRP) for transmission are partially overlapped. This is just for the convenience of description in the present disclosure, and the terms described above may be substituted by different term having the same technical meaning in the embodiments and methods to be described below. For example, in the case of the partially overlapped NCJT, in a part of time resources and/or frequency resources, all of data of a first BS (e.g., TRP 1) and data of a second BS (e.g., TRP 2) may be transmitted, and in the remaining time resources and/or frequency resources, data of either one of the first BS or the second BS may be transmitted.

The TRP forwards data scheduling information to the UE that receives NCJT using DCI (Downlink Control Information). In the aspect of DCI (Downlink Control Information) transmission, M-TRP (multiple TRP) transmission scheme may be classified into i) M-DCI (multiple DCI) based M-TRP transmission scheme in which each TRP transmits different DCI and ii) S-DCI (single DCI) based M-TRP transmission scheme in which a single TRP transmits DCI.

First, the single DCI based M-TRP transmission scheme is described. In the single DCI based M-TRP transmission scheme in which a representative TRP forwards scheduling information for data transmitted by the representative TRP itself and data transmitted by another TRP with single DCI, the MTRP performs cooperative transmission together with a common PDSCH, and each TRP participating in the cooperative transmission divides the corresponding PDSCH spatially with different layers (i.e., different DMRS ports) and transmits the divided PDSCH. In other words, the MTRP transmits a single PDSCH, but each TRP transmits a part of layer of multiple layers configuring a single PDSCH. For example, in the case that 4-layer data is transmitted, TRP 1 transmits 2 layers, and TRP 2 transmits the remaining 2 layers to the UE.

In this case, the scheduling information for the PDSCH is indicated to the UE through single DCI, and the DCI indicates that a certain QCL RS and QCL type information is used by a DMRS port (this is different from the previous scheme: QCL RS and TYPE to be commonly applied to all DMRS ports are indicated in DCI). That is, M TCI states are indicated through the TCI field in DCI (M=2, for 2 TRP cooperative transmission), and the QCL RS and type are identified by using different M TCI states for each of M DMRS port groups. Furthermore, DMRS port information may be indicated by using a new DMRS table.

In one example, for S-DCI, since all types of scheduling information for data transmitted by the MTRP is forwarded through single DCI, the S-DCI may be used in an ideal BH (ideal BackHaul) environment in which dynamic cooperation is possible between two TRPs.

Second, multiple-DCI based MTRP scheme is described. The MTRP transmits different DCI and a PDSCH (a UE receives N DCI and N PDSCHs from N TRPs), and the PDSCHs are transmitted in (partially or wholly) overlapping on a frequency-time resource. The PDSCH may be scrambling through different scrambling ID, and the DCI may be transmitted through Coreset belonging to different Coreset group groups (the Coreset group is identified by an index defined in Coreset configuration, e.g., when index=0 is configured for Coresets 1 and 2, and index=1 is configured for Coresets 3 and 4, Coresets 1 and 2 belong to Coreset group 0, and Coresets 3 and 4 belong to Coreset group. Further, in the case that an index is not defined in a Coreset, it is interpreted that index=0). In the case that a plurality of scrambling IDs is configured in one serving cell or two or more Coreset groups are configured, the UE may receive data in the multiple-DCI based MTRP operation.

In one example, whether the single-DCI based MTRP scheme or the multiple-DCI based MTRP scheme is applied may be indicated through separate signaling to the UE. For example, in the case that a plurality CRS patterns is indicated to the UE for MTRP operation for a single serving cell, PDSCH rate matching for CRS may be changed depending on whether the single-DCI based MTRP scheme or the multiple-DCI based MTRP scheme is applied.

The BS described in the present disclosure may collectively mean an object that performs data transmission/reception with the UE. For example, the BS described in the present disclosure may include one or more TPs (Transmission Points), one or more TRPs (Transmission and Reception Points), and the like. For example, the multiple TPs and/or multiple TRPs described in the present disclosure may be included in a single BS or multiple BSs. Furthermore, the TP and/or TRP may include a panel, a transmission and reception unit, and the like of the BS.

Furthermore, the TRP described in the present disclosure may mean an antenna array having one or more antenna elements available in a network located in a specific geographical location of a specific area. The present disclosure is described based on "TRP" for the convenience of description, but it is understood/applied that the TRP may be substituted by a BS, a TP (transmission point), a cell (e.g., macro cell/small cell/pico cell, etc.), an antenna array, or a panel.

Furthermore, the CORESET group ID described in the present disclosure may mean index/identification information (e.g., ID)/indicator for distinguishing CORESET configured/associated (or for each TRP/panel) for each TRP/panel. In addition, the CORESET group may be a group/union of CORESET distinguished by index/identification information (e.g., ID)/the CORESET group ID to distinguish CORESET. For example, the CORESET group ID may be specific index information defined in a CORSET configuration. For example, the CORESET group may be configured/indicated/defined by an index defined in the CORESET configuration for each CORESET. The CORESET group ID may be configured/indicated through higher layer signaling (e.g., RRC signaling)/L2 signaling (e.g., MAC-CE)/L1 signaling (e.g., DCI).

For example, ControlResourceSet information element (IE) which is a higher layer parameter is used for configuring a time/frequency control resource set (CORESET). As an example, the control resource set may be related to detection and reception of downlink control information. The ControlResourceSet information i may include ID (e.g., controlResourceSetID) related to the CORESET, an index (e.g., CORESETPoolIndex) of a CORESET pool for the CORESET, a time/frequency resource configuration of the CORESET, TCI information related to the CORESET, etc. As an example, the index (e.g., CORESETPoolIndex) of the CORESET pool may be configured to 0 or 1.

As an example, PDCCH detection for each TRP/panel may be configured/indicated to be performed in units of corresponding CORESET group. And/or, uplink control information (e.g., CSI, HARQ-A/N, SR) and/or uplink physical channel resources (e.g., PUCCH/PRACH/SRS resources) may be configured/indicated to be separated, and managed/controlled for each TRP/panel in units of corresponding CORESET group. And/or, HARQ A/N (process/retransmission) for PDSCH/PUSCH scheduled for each TRP/panel may be managed in units of corresponding CORESET group.

Further, the UE may recognize PUSCH (or PUCCH) scheduled by DCI received by different CORESETs (or CORESETs which belong to different CORESET groups) as PUSCH (or PUCCH) transmitted to different TRPs or PUSCH (or PUCCH) of different TRPs. Further, a scheme for UL transmission (e.g., PUSCH/PUCCH) transmitted to different TRPs may be applied equally even to UL transmission (e.g., PUSCH/PUCCH) transmitted to different panels which belong to the same TRP.

M-TRP Transmission Technique

The M-TRP transmission technique for which a plurality of (e.g., M) TRPs transmits data to a single User Equipment (UE) may be classified into two types: eMBB M-TRP (or M-TRP eMMB) transmission, which is a scheme for increasing transmission rate significantly, and URLLC M-TRP (or M-TRP URLLC) transmission, which is a scheme for increasing reception success rate and decreasing latency.

The URLLC M-TRP may mean a scheme that an M-TRP transmits the same TB (Transport Block) using different resource (e.g., layer/time resource/frequency resource, etc.). The UE configured with the URLLC M-TRP transmission scheme may indicated with several TCI states using DCI and assume that data received using a QCL RS (reference signal) of each TCI state is the same TB. On the other hand, the eMBB M-TRP may mean a scheme that an M-TRP transmits different TB using different resource (e.g., layer/time resource/frequency resource, etc.). The UE configured with the eMBB M-TRP transmission scheme may indicated with several TCI states using DCI and assume that data received using a QCL RS (reference signal) of each TCI state is different TB.

For example, the UE may distinguish and use an RNTI configured for MTRP-URLLC and an RNTI configured for MTRP-eMBB separately and may determine/decide whether the corresponding M-TRP transmission is URLLC transmission or eMBB transmission. That is, in the case that CRC masking of DCI received by the UE is performed by using the RNTI configured with MTRP-URLLC usage, this may correspond to URLLC transmission, and in the case that CRC masking of DCI is performed by using the RNTI configured with MTRP-URLLC usage, this may correspond to eMBB transmission.

Table 6 represents various schemes which may be considered for URLLC M-TRP transmission. Referring to Table 8, various schemes of SDM/FDM/TDM schemes are existed.

TABLE 6

To facilitate further down-selection for one or more schemes in RAN1#96 bits, schemes for multi-TRP based URLLC, scheduled by single DCI at least, are clarified as following:
Scheme 1 (SDM): n (n<=$N_s$) TCI states within the single slot, with overlapped time and frequency resource allocation.
Scheme 1a:
Each transmission occasion is a layer or a set of layers of the same TB, with each layer or layer set is associated with one TCI and one set of DMRS port(s).
Single codeword with one RV is used across all spatial layers or layer sets. From the UE perspective, different coded bits are mapped to different layers or layer sets with the same mapping rule as in Rel-15.
Scheme 1b:
Each transmission occasion is a layer or a set of layers of the same TB, with each layer or layer set is associated with one TCI and one set of DMRS port(s).
Single codeword with one RV is used for each spatial layer or layer set. The RVs corresponding to each spatial layer or layer set can be the same or different.
Scheme 1c:
One transmission occasion is one layer of the same TB with one DMRS port associated with multiple TCI state indices, or one layer of the same TB with multiple DMRS ports associated with multiple TCI state indices one by one.
For Scheme 1a and 1c, the same MCS is applied for all layers or layer sets.
For scheme 1b, same or different MCS/modulation orders for different layers or layer sets can be discussed.
Scheme 2 (FDM): n (n<=$N_f$) TCI states within the single slot, with non-overlapped frequency resource allocation
Each non-overlapped frequency resource allocation is associated with one TCI state.
Same single/mulitple DMRS port(s) are associated with all non-overlapped frequency resource allocations.
Scheme 2a:
Single codeword with one RV is used across full resource allocation. From UE perspective, the common RB mapping (codeword to layer mapping) is applied across full resource allocation.
Scheme 2b:
Single codeword with one RV is used for each non-overlapped frequency resource allocation.
The RVs corresponding to each non-overlapped frequency resource allocation can be the same or different.
For scheme 2a, same MCS is applied for all non-overlapped frequency resource allocations
For scheme 2b, same or different MCS/modulation orders for different non-overlapped frequency resource allocations can be discussed.
Details of frequency resource alloaction mechanism for FDM 2a/2b with regarding to allocation granularity, time domain allocation can be discussed.
Scheme 3 (TDM): n (n<=$N_{t1}$) TCI states within the single slot, with non-overlapped time resource allocation
Each transmission occasion of the TB has one TCI and one RV with the time granularity of mini-slot.
All transmission occasion (s) within the slot use a common MCS with same single or multiple DMRS port(s).
RV/TCI state can be same or different among transmission occasions.
FFS channel estimation interpolation across mini-slots with the same TCI index
Scheme 4 (TDM): n (n<=$N_{t2}$) TCI states with K (n<=K) different slots.
Each transmission occasion of the TR has one TCI and one RV.
All transmission occasion (s) across K slots use a common MCS with same single or multiple DMRS port(s)
RV/TCI state can be same or different among transmission occasions.
FFS channel estimation interpolation across slots with the same TCI index Note that M-TRP/panel based URLLC schemes shall be compared in terms of improved reliability, efficiency, and specification impact.
Note:
Support of number of layers per TRP may be discussed For example, scheme 3/4 of Table 6 is a scheme considered in TDM based URLLC. Specifically, scheme 4 refers to a method in which one TRP transmits a TB in one slot, and has the effect of increasing the data reception probability through the same TB received from several TRPs in several slots. In contrast, Scheme 3 means a method in which one TRP transmits a TB through several consecutive OFDM symbols (that is, a symbol group), and multiple TRPs can be set to transmit the same TB through different symbol groups in one slot.

Reliability Improvement Method in Multi-TRP

FIG. 10 illustrates a transmission and reception method of reliability improvement supported by multiple TRPs, and the following two methods may be considered.

The example of FIG. 10 (a) shows the case that a layer group transmitting the same CW (codeword)/TB (transport block) corresponds to different TRPs. That is, the same CW may be transmitted through different layer/layer group. In this case, a layer group may mean a kind of layer set including one or more layers. As such, amount of transport resource increases as the number of layer increases, and through this, there is an advantage that robust channel coding of low coding rate may be used for a TB. In addition, since channels from multiple TRPs are different, reliability improvement of a reception signal may be expected based on diversity gain.

Meanwhile, the example of FIG. 10 (b) shows the case that different CWs are transmitted through a layer group corresponding to different TRPs. That is, different CW may be transmitted through different layer/layer group. In this case, it may be assumed that TBs corresponding to a first CW (CW #1) and a second CW (CW #2) are the same. Accordingly, this may be regarded as an example of a repeated transmission of the same TB. In the case of FIG. 10 (b), there is a disadvantage that coding rate corresponding to a TB may be higher than that of FIG. 10 (a) case. However, there is an advantage that coding rate may be adjusted by indicating different RV (redundancy version) values for encoding bits generated from the same TB depending on a channel environment, or a modulation order of each CW may be adjusted.

In FIG. 10 (a) or FIG. 10 (b), the same TB is repeatedly transmitted through different layer group and each layer group is transmitted by different TRP/panel, and data reception probability may be increased, which is referred to as URLLC M-TRP transmission scheme based on SDM (spatial division multiplexing). Layer(s) belonged to different layer group is respectively transmitted through DMRS ports belonged to different DMRS CDM groups.

Furthermore, the contents related to multiple TRPs described above may be extendedly applied to FDM (frequency division multiplexing) scheme based on different frequency domain resource (e.g., RB/PRB (set)) and/or TDM (time division multiplexing) scheme based on different time domain resource (e.g., slot, symbol, or sub-symbol) as well as the SDM (spatial division multiplexing) scheme that uses different layers.

Hereinafter, in the present disclosure, when cooperative transmission between multiple BSs (e.g., multiple TPs/TRPs of one or more BSs, etc.) and a UE (e.g., NCJT) is considered in a wireless communication system, the methods which may be proposed in the situation are described. Specifically, Proposal 1 proposes a method of configuring an eMBB operation or URLLC operation and a method of indicating/configuring a URLLC operation scheme. Proposal 2 proposes a method of configuring the number of repeated transmission times by considering the URLLC operation scheme. Proposal 3 proposes a method of configuring/indicating a transmission resource region in repeated transmission in the time domain. Proposal 4 proposes a method of defining/configuring a TCI state field in the DCI by considering the URLLC operation.

As described above, each TRP may be classified based on the index (e.g., CORESETPoolIndex) (alternatively, CORESET group ID) configured in the CORESET. The methods described in the present disclosure are described based on one or more TPs/TRPs of the BS(s), but the corresponding methods may be applied even to transmission based on one or more panels of the BS(s) in the same or similar scheme, of course.

<Proposal 1>

As described above, multi-TRP (hereinafter, M-TRP) based transmission may be classified into an eMBB operation (i.e., eMBB M-TRP) and a URLLC operation (i.e., URLLC M-TRP). The URLLC operation may be largely classified into operations of four schemes (e.g., schemes 1, 2, 3, and 4) as organized in Table 6. Since a resource configuration method and a mapping relationship between the TCI state and the resource should be defined differently for the eMBB operation and the URLLC operation, the BS needs to configure/indicate which operation is to be performed to the UE.

When a situation is considered in which transmission of data for URLLC is unexpectedly required due to occurrence of an urgent situation in a UE receiving data for eMBB, it may be preferred that the eMBB operation and the URLLC operation are dynamically indicated through the DCI rather than the eMBB operation and the URLLC operation are semi-statically configured through the higher layer signaling. In the present disclosure, the data for eMBB and the data for URLLC are described by assuming the multi-TRP transmission, but the method and/or the embodiment proposed in the present disclosure may be applied even to single TRP transmission. Further, a situation may be assumed in which the data for URLLC is transmitted in a transmission resource allocated to the UE based on scheduling of the BS. For example, the UE may receive the data for URLLC through the PDSCH scheduled through the DCI of the corresponding PDCCH after detecting the PDCCH in the CORESET.

Hereinafter, the method of configuring an eMBB operation or URLLC operation to the UE and the method of indicating/configuring a URLLC operation scheme proposed in the present disclosure will be described in detail.

The BS may configure, to the UE, in which scheme among multiple URLLC operations (e.g., scheme 1 to scheme 4) to perform URLLC M-TRP transmission through the higher layer signaling. For example, a higher layer parameter (e.g., RepSchemeEnabler) for indicating one of the schemes for the URLLC operation may be configured/defined. As an example, whether the corresponding scheme is an FDM based scheme (e.g., scheme 2a/2b) or a TDM based scheme (scheme 3/4) may be configured by using the higher layer parameter.

As described in Table 6, multiple schemes related to the URLLC operation are defined, and since the schemes have a similarity in terms of reliability and latency, a specific scheme may not be required to be dynamically selected. Accordingly, a specific operation (e.g., one of schemes 2a/2b, 3, and 4) among multiple URLLC operations may be semi-statically configured to the UE through the higher layer signaling, and whether the specific URLLC operation semi-statically configured is performed may be dynamically indicated through the DCI. For example, scheme 3 (i.e., TDM scheme) may be configured to the UE through the higher layer signaling, and the URLLC operation of scheme 3 may be enabled/disabled.

Since it may be assumed that operations included in scheme 1 among the URLLC operations have no difference in terms of the UE compared with the eMBB operation, it may be assumed that the operations included in scheme 1 may be excluded from a candidate of the specific operation semi-statically configured to the UE through the higher layer signaling in the above-described example, but the operations included in scheme 1 may also be included in the candidate and semi-statically configured to the UE.

A specific field in the DCI may be used for dynamically indicating whether to perform the URLLC operation.

For example, a specific bit of field 'Antenna port(s)' for indicating the DMRS port in DCI (e.g., DCI format 1_1) may be used for the dynamic indication. In the following description, the DMRS port indication field may mean the field 'Antenna port(s)'. In Proposal 1 of the present disclosure, "the specific bit of the DMRS port indication field in the DCI may be used" may mean that all or some bits constituting the corresponding field or codepoints corresponding to the corresponding bits may be used for the method and/or the embodiment of Proposal 1. Further, the interpretation may also be similarly applied even to the following other proposals (e.g., Proposals 2 to 4).

Multiple TCI states may be indicated to the UE, and in this case, the UE may implicitly know that the corresponding operation is a multi-TRP transmission operation, and optimize the DMRS port indication field by newly constituting a DMRS port combination for multi-TRP transmission. In the case of optimizing the DMRS port indication field, whether the corresponding operation is the eMBB operation or the URLLC operation may be indicated through most significant bit (MSB) or least significant bit (LSB) of the DMRS port indication field, and the DMRS port combination may be constituted by optimization to each operation by using the remaining bit(s) other than the corresponding bit among the bits constituting the DMRS port indication field.

The following proposal may be together considered as a method of dynamically indicating, by the BS, to the UE, different service types such as the eMBB operation or the URLLC operation.

In the Rel-15 standard, DCI format 1_1 is used for scheduling of the PDSCH in one cell. The DCI includes the antenna port(s) field (i.e., DMRS port indication field), and the corresponding field is defined in Table 7.3.1.2.2-1/2/3/4 of TS 38.212. Hereinafter, 'Rel-15 DMRS tables' may mean the DMRS tables. The numbers of DRMS ports and DMRS CDM group(s) without data may be determined according to a value of the antenna port(s) field.

Meanwhile, DMRS tables having an enhanced function capable of supporting a new DMRS port combination may be introduced by considering the multi-TRP transmission, and hereinafter, 'Rel-16 DMRS tables' may mean the DMRS tables.

Whether the URLLC operation is performed may be dynamically indicated through Rel-16 DMRS tables. More characteristically, in a state in which the UE is configured to use the Rel-16 DMRS tables, multiple TCI states may be indicated to the UE through the DCI, and when 2 CW transmission is indicated, whether the URLLC operation is performed may be dynamically indicated through a specific codepoint(s) of the DMRS port indication field. A specific embodiment for the operation will be described below.

'A state in which the UE is configured to use the Rel-16 DMRS tables' may be interpreted as being configured through the higher layer signaling (e.g., RRC/MAC CE) to apply the Rel-16 DMRS tables for interpreting the DMRS port indication field in the DCI. In other words, the state may mean a case where the DMRS port indication field in the DCI is configured/indicated to be interpreted based on a newly defined DMRS table (e.g., Rel-16 DMRS tables). For example, the operation may be configured through an explicit RRC/MAC CE parameter for the purpose. Alternatively, the operation may be configured by an implicit method. As an example of the implicit method, when there is a codepoint mapped to multiple TCI states among codepoints of the TCI state field in the DCI through the MAC CE operation, the Rel-16 DMRS tables may be configured to be used.

'A case of indicating 2-CW transmission' may mean a case where an MCS/NDI/RV value is indicated in each TB field for transport block (TB) 1 and TB 2 in a state in which the maximum number of codewords is configured to 2 (i.e., a state in which maxNrofCodeWordsScheduledByDCI=2 is configured). Here, the TB field may mean a DCI field for indicating the MCS/NDI/RV of each TB. That is, the TB field may be a concept including an MCS field, an NDI field, and an RV field. Meanwhile, when a specific TB field is indicated as MCS=26 and RV=1, it may be interpreted that the corresponding TB is disabled, and in the proposed operation, it may be assumed that such a situation does not occur. That is, a situation may be assumed in which both TB fields do not satisfy a combination of MCS=26 and RV=1.

'A case where whether the URLLC operation is performed is dynamically indicated through a specific codepoint(s) of the DMRS port indication field' may mean the following case.

Table 7 as an example of a DMRS table of Rel-15 shows Table 7.3.1.2.2-2 defined in TS38.212. Referring to Table 7, when both CWs 0 and 1 are enabled (i.e., when in the case of 2 codeword transmission), the value of the DMRS port indication field may be interpreted according to a right column of two codewords, and in this case, the value of the DMRS port indication field may be indicated only for layers of 5 layers or more. In the Rel-15 DMRS table, a combination of the DMRS ports is defined only for four codepoints (e.g., values 0 to 3) for two codewords. Accordingly, the URLLC operation may be dynamically indicated by using codepoints defined as reserved up to 4-31. To this end, a new Rel-16 DMRS table may be defined based on the Rel-15 DMRS table.

TABLE 7

| | One Codeword: Codeword 0 enabled, Codeword 1 disabled | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

Table 8 shows an example of the Rel-16 DMRS table defined based on the Rel-15 DMRS table of Table 7 described above. Table 8 is just an example for convenience of the description and does not limit the technical scope of the present disclosure. Accordingly, it is apparent that the Rel-16 DMRS table is not limited to an example of Table 8, and can be expanded to another combination of the DMRS ports in a form having the same feature.

TABLE 8

| | One Codeword: Codeword 0 enabled, Codeword 1 disabled | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4 | 1 | 0 | 1 |
| 5 | 2 | 2 | 1 | 5 | 1 | 1 | 1 |
| 6 | 2 | 3 | 1 | 6 | 1 | 0, 1 | 1 |
| 7 | 2 | 0, 1 | 1 | 7 | 2 | 0 | 1 |
| 8 | 2 | 2, 3 | 1 | 8 | 2 | 2 | 1 |
| 9 | 2 | 0-2 | 1 | 9 | 2 | 0, 1 | 1 |
| 10 | 2 | 0-3 | 1 | 10 | 2 | 2, 3 | 1 |
| 11 | 2 | 0, 2 | 1 | 11 | 2 | 0 | 2 |
| 12 | 2 | 0 | 2 | 12 | 2 | 2 | 2 |
| 13 | 2 | 1 | 2 | 13 | 2 | 0, 1 | 2 |
| 14 | 2 | 2 | 2 | 14 | 2 | 2, 3 | 2 |
| 15 | 2 | 3 | 2 | 15-31 | Reserved | Reserved | Reserved |
| 16 | 2 | 4 | 2 | | | | |
| 17 | 2 | 5 | 2 | | | | |
| 18 | 2 | 6 | 2 | | | | |

TABLE 8-continued

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

Referring to Table 8, when codepoints corresponding to values 4 to 14 are indicated to the UE upon transmission of two CWs, the UE may know that the corresponding operation is the URLLC operation.

Specifically, one operation of multiple URLLC operations may be configured to the UE through the higher layer signaling according to the method of Proposal 1 described above, and the UE may know which scheme should be performed. In this case, the Rel-16 DMRS table may be applied to the value indicted through the DMRS port indication field of the DCI, and a detailed operation may be assumed as below according to the scheme configured to the UE through the higher layer signaling (Meanwhile, when one value of values 0 to 3 is indicated to the UE, the operation may be performed similarly to the Rel-15 DMRS table. That is, the transmission may be interpreted as transmission of two CWs corresponding to different TBs.

For example, it may be assumed that when scheme 2a is configured through the higher layer signaling, if one value of values 4 to 14 is indicated, multiple TCI states indcted to the UE are mapped to different frequency domains. In this case, TB information for determining a TB size may be defined according to a fixed rule to be based on a specific value of TBs 1 and 2, or configured through signaling between the BS and the UE. In this case, a value of a TB field not applied to determination of the TB size may be fixed to a combination of specific MCS, RV, and NDI values. For example, upon receiving DCI in which MCS=0 and RV=0 are configured, the UE may know that the TB field of the corresponding DCI is not used for determining the TB size.

For example, it may be assumed that when Scheme 2b/3/4 is configured through the higher layer signaling, if one value of values 4 to 14 is indicated, different CWs transmitted to the UE are based on the same TB (i.e., different CWs are encoded from the same TB). That is, the UE may assume that two CWs are mutually repeatedly transmitted CWs. In this case, the TB information for determining the TB size may be defined according to a fixed rule to be based on a specific value of TBs 1 and 2, or configured through signal exchange between the BS and the UE.

In this case, a value of a TB field not applied to determination of the TB size may be fixed to a combination of specific MCS, RV, and NDI values. For example, the value of the TB field may be defined as MCS=0 and RV=0. Alternatively, the value of the TB field not applied to determination of the TB size may be used as a usage for indicating a modulation order of repeatedly transmitted CW and/or the RV value. In this case, a TB field for determining the TB size and a TB field for determining the modulation order/RV for a TB corresponding to a specific CW may be different. For example, the TB size is determined based on the MCS of field TB 1 for CW #2 (or CW #1), but the modulation order/RV may adopt a value indicated by field TB 2.

Each codepoint of Table 8 may have the following features.

First, the maximum number of UEs which are multi-user (MU) paired is limited to 2. The reason is that when the number of UEs which is MU paired increases, mutual interference may increase, and as a result, capability deterioration may occur. Accordingly, the mutual interference may be reduced by limiting the maximum number of UEs which are enabled to be MU paired.

Second, the UEs which are MU paired are indicated by DMRS ports of different CDM groups. The reason is that when the UEs which are MU paired are indicated by DMRS ports of the same CDM group, interference between the DMRS ports may increase. Accordingly, the DRMS ports of different CDM groups are allocated to different UEs to reduce mutual interference. Meanwhile, in the case of value 4/5, it is assumed that the DMRS ports of the same CDM group may be allocated to different UEs, and the reason is that it may be assumed that the PDSCH may be together multiplexed to the DMRS symbol, and more robust channel coding may be used.

In the example, it is assumed that one value of the URLLC schemes (e.g., schemes 2a, 2b, 3, and 4) is configured in advance through the higher layer signaling, but even otherwise, the method of dynamically indicating the URLLC operation may be supported based on the proposal. For example, in a state in which the UE is configured to use the Rel-16 DMRS tables, multiple TCI states may be indicated to the UE through the DCI, and when 2 CW transmission is indicated, whether a specific operation corresponding to one of the URLLC schemes (e.g., schemes 2a, 2b, 3, and 4) is performed may be dynamically indicated through a specific codepoint(s) of the DMRS port indication field. To this end, different codepoint(s) may be defined to correspond to different schemes. For example, in the example of Table 8, values 4 to 14 may correspond to scheme 2a, and values 15 to 31 may be utilized for defining the DMRS ports combination corresponding to scheme 2b/3/4.

As in the proposed method described above, the UE may be configured with the URLLC operation scheme based on the higher layer signaling. Further, the UE may be configured with a higher layer parameter related to the corresponding URLLC operation together with the URLLC operation scheme. For example, in addition to the operation scheme, additional parameters (e.g., the number of repetition times, a repetition period, etc.) required for performing the corresponding operation scheme may be together configured in the higher layer parameter. As such, it may be anticipated that the BS which intends to indicate the URLLC operation to the UE will configure the higher layer parameter related to the URLLC operation to the UE. On the contrary, in the case of a UE not requiring the URLLC operation, the higher layer parameter related to the URLLC operation may not be configured. Accordingly, the UE may differently interpret the DMRS port indication field based on whether to configure the higher layer parameter related to the URLLC operation.

For example, (i) when the UE is configured with the higher layer parameter related to the URLLC operation, a specific bit of the DMRS port indication field may be used as a usage for dynamically indicating the URLLC operation according to the proposal. On the contrary, (ii) when the UE is not configured with the higher layer parameter related to the URLLC operation, the specific bit of the DMRS port indication field may be used as a usage for indicating single TRP transmission or dynamic point selection from multi-TRP. As an example for the (ii) operation, when the UE indicated with multiple TCI states is indicated with a specific codepoint through the DMRS port indication field, the UE may assume the single TRP transmission or dynamic point selection from multi-TRP other than the multi-TRP transmission. As an example of the specific codepoint, there may be a codepoint indicating a case where the DMRS port combination indicated to the UE is included in a single CDM group.

Meanwhile, in respect to the URLLC operation, whether the URLLC operation is performed may be configured to the UE based on a higher layer configuration and/or RNTI and/or a specific field(s). In this case, when different TB fields (e.g., TB field 1/TB field 2) are defined in the DCI, the UE may also assume that a second CW is disabled regardless of an MCS/RV/NDI value indicated through the TB field for the specific TB field. When it may be assumed that a second C2 is disabled, since single CW transmission may be performed while using two different TB fields, there is an advantage in that different MCS/RV values may be indicated for different transmission occasions in the URLLC scheme.

An M-TRP URLLC operation or M-TRP eMBB operation may be configured based on the method of Proposal 1 described above, and a specific scheme among multiple schemes of the M-TRP URLLC operation may be additionally configured/enabled.

<Proposal 2>

In relation to the URLLC operation, scheme 3 and scheme 4 of Table 6 described above correspond to a repeated transmission scheme of the time domain. Proposal 2 of the present disclosure proposes a method of configuring/indicating the number of transmission times for repeated transmission for scheme 3 and scheme 4. As a method of configuring/indicating the total number of repeated transmission times, a method of configuring a specific value to the UE through the higher layer parameter or indicating the number of repeated transmission times based on the specific field in the DCI may be considered. Hereinafter, the method of configuring the number of repeated transmission times by considering the URLLC operation scheme will be described in detail.

Scheme 3 may mean repeated transmission achieved in units of mini-slot by a TDM based scheme. For scheme 3, 2, 4, and 7 symbols unit transmission occasions may be defined. In Scheme 3 (TDM), n (n<=Nt1) TCI states may be indicated together with non-overlapped time resource allocation. Each transmission occasion of the TB has one TCI and one RV together with the time granularity of the mini-slot. All transmission occasion(s) in the slot uses a common MCS together with the same single or multiple DMRS port(s). The RV/TCI state may be the same or different between the transmission occasions.

As the method of configuring the number of repeated transmission times, a method of determining the total number of repeated transmission times according to the configured/indicated number of TCI states is proposed. In other words, the total number of repeated transmission times may be determined according to the configured/indicate number of TCI states.

For example, multiple TCI states for repeated transmission may be indicated through 'Transmission configuration indication' field (hereinafter, may be referred to as a TCI state field) defined for indicating the TCI state in the DCI (e.g., DCI format 1_1). Each codepoint in the TCI state field may correspond to one or more TCI state values, and codepoints corresponding to multiple TCI states are indicated to the UE to configure/indicate multiple TCI states to the corresponding UE.

For example, when the number of TCI states is 4, each symbol granularity (i.e., transmission occasion) may be repeated four times. As an example, when the transmission occasion is a 2 symbol granularity, the 2 symbol granularity may be repeated four times (2+2+2+2). As an example, when the transmission occasion is a 4 symbol granularity, the 4 symbol granularity may be repeated four times (4+4+4+4). As an example, when the transmission occasion is a 7 symbol granularity, the 7 symbol granularity may be repeated four times (7+7++7++7).

As another example, when the number of TCI states is 2, each symbol granularity may be repeated two times. As an example, when the transmission occasion is the 2 symbol granularity, the 2 symbol granularity may be repeated two times (2+2). As an example, when the transmission occasion is the 4 symbol granularity, the 4 symbol granularity may be repeated two times (4+4). As an example, when the transmission occasion is the 7 symbol granularity, the 7 symbol granularity may be repeated two times (7+7).

A reason why the total number of repeated transmission times may be defined according to the configured/indicated number of TCI states as in the example is that repeated transmission exceeding the configured/indicated number of TCI states may be replaced with a mini-slot structure constituted by more symbol(s). In the above description, the 'mini-slot structure' may mean a scheduling structure having a granularity of 2, 4, 6, or 7 symbols which may be indicated by PDSCH mapping type B.

When the configured/indicated number of TCI states and the number of repeated transmission times are expressed as x and y, respectively, a case where x is larger than y may be regarded as a case of repeated transmission exceeding the configured/indicated number of TCI states.

For example, when the configured/indicated number of TCI states is 2 and a mini-slot having a structure of 2 symbols is repeated four times, a 2+2+2+2 structure is provided, and this may be replaced with repeating a mini-slot having a structure of four symbols two times. That is, (in terms of considering DMRS overhead), a scheme of repeating the mini-slot having the structure of fourth symbols two times may be more efficient than a scheme of repeating the mini-slot having the structure of two symbols four times. Since the configured/indicated number of TCI states is 2 in the example, when the TCI states are repeatedly transmitted four times, the same TCI states are repeatedly shown. However, when this is repeatedly transmitted two times by using a larger mini-slot structure, there is an advantage in that the same TCI states are not repeated, and the DMRS overhead may be reduced most of all. Similarly to the example, even with respect to a case where the configured/indicated number of TCI states is 4 and the mini-slot having the structure of 2 symbols is repeated eight times, a 2+2+2+2+2+2+2+2 structure may be similarly replaced with the 4+4+4+4 structure.

Accordingly, as described in the example, the number of repeated transmission times exceeding the configured/indicated number of TCI states may be replaced with a mini-slot structure having another number of symbols, and as a result, capability enhancement may be anticipated through an effect of reducing the DMRS overhead.

In conclusion, the number of repeated transmission times may be indicated through the number of TCI states indicated to the UE. That is, the number of repetition times of the transmission occasion may be determined based on the number of TCI states corresponding to the codepoints of the TCI field in the DCI. For example, when 2 TCI states are indicated to the UE, the total number of transmission occasions may be 2 and the repeated transmission may be made two times, and when 4 TCI states are indicated, the total number of transmission occasions may be 4 and the repeated transmission may be made four times. In addition, a QCL assumption for each transmission occasion may sequentially apply the TCI states indicated to the UE. For example, the transmission occasions may be sequentially mapped in such a manner that a 1st transmission occasion is mapped to a 1st TCI state and a 2nd transmission occasion is mapped to a 2nd TCI state.

Meanwhile, scheme 4 (TDM) may mean repeated transmission made in the slot granularity. In Scheme 4, n (n<=Nt2) TCI states may be indicated in K (n<=K) different slots. Each transmission occasion of the TB has one TCI and one RV. All transmission occasion(s) across K slots uses a common MCS together with the same single or multiple DMRS port(s). The RV/TCI state may be the same or different between the transmission occasion(s).

Latency of scheme 4 cannot but become longer due to a feature that the repeated transmission is made in the slot granularity, and as a result, it may be more preferable to use scheme 4 as a usage for increasing reliability than the latency. In this case, since the reliability may be enhanced by increasing a reception SNR through the repeated transmission, the number of repeated transmission times larger than the indicated number of TCI states may be considered.

Accordingly, in the case of scheme 4, the number of repeated transmission times may be configured through the higher layer signaling (e.g., RRC/MAC CE). For example, a higher layer parameter (e.g., repetitionnumber) for configuring the number of repeated transmission times may be defined, and the number of repeated transmission times may be configured through the corresponding parameter. As an example, the number of repeated transmission times may be configured to one of 2, 3, 4, 5, 6, 7, 8, or 16.

Alternatively, even in the case of scheme 4, a method of dynamically indicating, by the BS, the number of repeated transmission times to the UE may be considered. In this case, there are an advantage in that a signaling method defined for M-TRP based URLLC such as scheme 3 may be utilized as it is, and an advantage in that the repetition number is dynamically adjusted even for scheme 4 by considering various service types, and as a result, the latency may be adjusted according to a specific service type. As the signaling method of dynamically indicating the number of repeated transmission times for the case of scheme 4 to the UE, the following proposed may be adopted.

The BS may configure information related to the number of repeated transmission times applicable to scheme 4 to the UE through the higher layer signaling (e.g., RRC/MAC CE). For example, a candidate value(s) for the applicable number of repeated transmission times may be indicated. Alternatively, a candidate value(s) for the number of repeated transmission times fixed or predefined between the BS and the UE may be defined. The candidate value may mean some/all values which the BS configures to the UE through the higher layer signaling based on a pre-configured/defined promise/rule/condition among the numbers of repeated transmission times applicable to scheme 4 above.

The BS may explicitly or implicitly a specific value among the candidate value(s) for the number of repeated transmission times which may be indicated to the UE through a specific field in the DCI. The specific field in the DCI may be a field newly defined for the number of repeated transmission times or a conventional field (e.g., the TCI state field, the antenna port(s) field, the MCS field, the NDI field, the RV field, etc.).

For example, when the number of repeated transmission times applicable to scheme 4 above is configured to the UE through the higher layer signaling, it may be assumed that {2, 4, 8, 16} is defined as the applicable number of repeated transmission times. {2, 4, 8, 16} is just an example of the candidate values for the number of repeated transmission times, and does not limit the technical scope of the present disclosure. Accordingly, it may be possible that the number of repeated transmission times is configured to another value (e.g., 2, 3, 4, 5, 6, 7, 8, 16, etc.). Alternatively, the number of transmission times among the values, as an example, value such as {2, 8} may be configured to the UE through the higher layer signaling. In addition, a specific value of the candidate value(s) (e.g., {2, 8}) may be indicated through the specific field in the DCI.

Hereinafter, examples of the method of dynamically indicating the number of repeated transmission times through the specific field in the DCI will be described.

Example 1) The number of repeated transmission times may be indicated by using the TCI state field in the DCI.

For example, the number of repeated transmission times may be mapped to the codepoint of the TCI state field, and the BS may indicate the specific number of repeated transmission times to the UE through/using the codepoint value indicated to the UE through the TCI state field. As a specific example, a repetition number corresponding to {2} may be mapped to a value in which the codepoint of the TCI state field corresponds to 0 (i.e., 000) to 3 (i.e., 011), and a repetition number corresponding to {8} may be mapped to a value in which the codepoint corresponds to 4 (i.e., 100) to 7 (i.e., 111). For example, a mapping relationship between the codepoint and the repetition number may be pre-defined between the UE and the BS.

As another example, a method of indicating whether repeated transmission corresponding to a relevant specific repetition number is performed through the specific field in the DCI after the specific repetition number is configured to the UE through the higher layer signaling may also be considered. For example, the repetition number corresponding to {2} may be configured through the higher layer signaling, and whether the repeated transmission corresponding to the relevant repetition number is performed may be indicated through a codepoint of a specific TCI state field. For example, whether the repeated transmission corresponding to the relevant repetition number (e.g., 2) may be enabled through the codepoint of the specific TCI state field. Further, as in the following example, information on whether the repeated transmission being performed may also be indicated through the specific field in the DCI.

Example 2) Modulation and Coding Scheme (MCS)/New Data Indicator (NDI)/Redundancy Version (RV) fields for a second transport block (TB) of the DCI may be used. For example, different repeated transmission numbers may be mapped to a codepoints corresponding to the MCS, NDI, and RV fields for the second TB, and the BS may indicate, to the UE, a specific repeated transmission number through the relevant field.

Example 3) The antenna port(s) field of the DCI may be used. Even in Example 3, it is assumed that the values such as {2, 8} are configured to the UE through the higher layer signaling. For example, a specific repetition number may be indicated based on a rank value (e.g., DRMS port(s) number) or/and the number of CDM groups or/and an index of the CDM group indicated through the antenna port(s) field.

As an example, when the rank value is equal to or smaller than a specific value (and/or a pre-configured/defined value), a smaller value (e.g., {2}) of the repetition numbers (e.g., {2, 8}) configured through the higher layer signaling may be indicated. On the contrary, when the rank value is larger than the specific value, a larger value (e.g., {8}) of the repetition numbers (e.g., {2, 8}) configured through the higher layer signaling may be indicated.

As an example, when the indicated number of CDM groups is 2 or more, i.e., when the indicated DMRS port(s) are included in different CDM groups, the smaller repetition number of the repetition numbers (e.g., {2, 8}) configured through the higher layer signaling may be indicated, and when the indicated number of CDM groups is 1, i.e., when the indicated DMRS port(s) are included in the same CDM group, a larger repetition number may be indicated. Alternatively, when the indicated number of CDM groups is 2 or more, i.e., when the indicated DMRS port(s) are included in different CDM groups, the larger repetition number may be indicated, and when the indicated number of CDM groups is 1, i.e., when the indicated DMRS port(s) are included in the same CDM group, a smaller repetition number may be indicated.

As an example, when the indicated CDM group index is 0, i.e., when the indicated DMRS port(s) are included in CDM group 0, the smaller repetition number may be indicated, and when the indicated CDM group index is 1, i.e., when the indicated DMRS port(s) are included in CDM group 1, the larger repetition number may be indicated. Alternatively, when the indicated CDM group index is 0, i.e., when the indicated DMRS port(s) are included in CDM group 0, the larger repetition number may be indicated, and when the indicated CDM group index is 1, i.e., when the indicated DMRS port(s) are included in CDM group 1, the smaller repetition number may be indicated.

Example 4) Example 4 is another example using the antenna port(s) field. When the DMRS antenna port index is indicated to the UE through the antenna port(s) field, the repeated transmission number is jointly encoded to indicate the repeated transmission number to the UE jointly with the DMRS antenna port.

Table 9 shows an example in which a repeated transmission number corresponding to the DMRS antenna port is jointly encoded and indicated. Table 9 is just an example for convenience of description, and does not limit the technical scope of the present disclosure, and it is apparent that Table 9 may be extended to another form by applying a feature of the proposed method described in the present disclosure. For example, a DMRS port corresponding to each value of the codepoint which may be indicated through the antenna port field may be pre-defined and the repeated transmission number may be additionally pre-defined/configured to correspond to each codepoint jointly with the DMRS port.

TABLE 9

| One Codeword: Codeword 0 enabled, Codeword 1 disabled | | | One Codewords: Codeword 0 enabled, Codeword 1 enabled | | | |
|---|---|---|---|---|---|---|
| Value | Number of DMRS CDM group(s) without data | DMRS port(s) | Value | Number of DMRS CDM group(s) without data | DMRS port(s) | the number of repetition |
| 0 | 1 | 0 | 0 | 1 | 0 | k1 |
| 1 | 1 | 1 | 1 | 1 | 1 | k1 |
| 2 | 1 | 0, 1 | 2 | 1 | 0, 1 | k1 |
| 3 | 2 | 0 | 3 | 2 | 0 | k1 |
| 4 | 2 | 1 | 4 | 2 | 1 | k1 |
| 5 | 2 | 2 | 5 | 2 | 2 | k1 |
| 6 | 2 | 3 | 6 | 2 | 3 | k1 |
| 7 | 2 | 0, 1 | 7 | 2 | 0, 1 | k1 |
| 8 | 2 | 2, 3 | 8 | 2 | 2, 3 | k1 |
| 9 | 2 | 0-2 | 9 | 2 | 0 | k2 |
| 10 | 2 | 0-3 | 10 | 2 | 1 | k2 |
| 11 | 2 | 0, 2 | 11 | 2 | 0, 2 | k1 |
| 12-15 | Reserved | Reserved | 12 | 2 | 2 | k2 |
| | | | 13 | 2 | 3 | k2 |
| | | | 14 | 2 | 0, 1 | k2 |
| | | | 15 | 2 | 2, 3 | k2 |

In Table 9, a left side shows an example of the antenna port(s) field defined in the current standard (see TS38.212 table 7.3.1.2.2-1). A right side shows an example of an enhanced antenna port(s) field to which the proposed method of the present disclosure is applied. Referring to Table 9, in a right table, values 9, 10, and 12 to 15 are newly added parts, and an example of the enhanced DMRS table may have the following feature.

First, the total number of transmission layers may be limited. Since high throughput is not required in the URLLC operation, a large number of transmission layers may not be supported. Accordingly, it may be newly defined that the number of transmission layers is limited to a specific value or less and a codepoint indicating a value exceeding the relevant number of layers indicates another value. In the example of the DMRS table, values corresponding to values 9 and 10 originally define a DMRS port(s) combination capable of indicating 3 and 4 layers, but may be defined to correspond to another value by applying the number of transmission layers being limited to the specific value (e.g., 2) or less.

Second, a specific codepoint of a relevant field may be mapped to a specific repeated transmission number. In the example of the enhanced DMRS table, k1 and k2 may correspond to the specific repeated transmission number. k1 and k2 may become values configured through the higher layer signaling or defined by a fixed rule between the BS and the UE. In the example of the DMRS table, values 3, 4, 5, 6, 7, and 8 and values 9, 10, 12, 13, 14, and 15 indicate the same DMRS port index and CDM group number ('number of DMRS CDM group(s) without data'), but there is a feature that each repeated transmission number is different as k1 or k2.

Although not applied in the example of the DMRS table, the number of CDM groups may also be limited to a specific value in order to support new more combinations for the DMRS ports and the repeated transmission times. For example, when only 2 is limited to be supported as the number of CDM groups in Example 4 above, values corresponding to values 0, 1, and 2 may correspond to a new combination.

Example 5) Another example using the antenna port(s) field of the DCI is proposed. A specific repetition number may be indicated based on the index of the DMRS antenna port(s) indicated through the antenna port(s) field.

For example, a specific repeated transmission number may be mapped to a specific DRMS antenna port or DMRS antenna ports (i.e., DMRS antenna port group).

Table 10 shows an example of mapping and configuring the repeated transmission number for each DMRS antenna port. That is, Table 10 shows an example in which different repeated transmission numbers are mapped to different DMRS antenna ports. Table 11 shows an example of mapping and configuring the repeated transmission number for each DMRS antenna port group. That is, Table 11 shows an example in which different repeated transmission numbers are mapped by a group granularity constituted by multiple DMRS antenna ports.

TABLE 10

| Type 1 | | Type 2 | |
| --- | --- | --- | --- |
| DMRS port | the number of repetition | DMRS port | the number of repetition |
| 0 | k1 | 0 | k1 |
| 1 | k2 | 1 | k2 |
| 2 | k3 | 2 | k3 |
| 3 | k4 | 3 | k4 |

TABLE 10-continued

| Type 1 | | Type 2 | |
| --- | --- | --- | --- |
| DMRS port | the number of repetition | DMRS port | the number of repetition |
| 4 | k5 | 4 | k5 |
| 5 | k6 | 5 | k6 |
| 6 | k7 | 6 | k7 |
| 7 | k8 | 7 | k8 |
| | | 8 | k9 |
| | | 9 | k10 |
| | | 10 | k11 |
| | | 11 | k12 |

TABLE 11

| Type 1 | | Type 2 | |
| --- | --- | --- | --- |
| DMRS port | the number of repetition | DMRS port | the number of repetition |
| 0 | k1 | 0 | k1 |
| 1 | k1 | 1 | k1 |
| 2 | k2 | 2 | k2 |
| 3 | k2 | 3 | k2 |
| 4 | k3 | 4 | k3 |
| 5 | k3 | 5 | k3 |
| 6 | k4 | 6 | k4 |
| 7 | k4 | 7 | k4 |
| | | 8 | k5 |
| | | 9 | k5 |
| | | 10 | k6 |
| | | 11 | k6 |

In the examples of Tables 10 and 11, k1 to k12 mean different repeated transmission numbers. In this case, some of the values of k1 to k12 may correspond to the same value. The repeated transmission numbers (the values of k1 to k12) may be configured to the UE through the higher layer signaling or a specific value may be defined by a fixed rule between the BS and the UE.

Referring to Table 10, different repeated transmission numbers may be indicated according to the DMRS port index indicated to the UE. For example, when Table 10 is assumed, in a case where DMRS port 0 is indicated to the UE, the repeated transmission number corresponding to k1 may be indicated and in a case where DMRS port 1 is indicated, the repeated transmission number corresponding to k2 may be indicated.

Referring to Table 11, the repeated transmission number may be mapped and configured by the group granularity, and the same repeated transmission number may be mapped to DMRS antenna ports in the same group. As an example, in Table 11, DMRS ports 0 and 1 may be configured as one group, and the repeated transmission number k1 may be configured in the relevant group.

In the example of Table 11 above, each group is constituted by same DMRS port number (e.g., 2), but different DMRS port numbers may also be configured for each group. Even in this case, the same repeated transmission number may be configured in the DMRS ports in the same group.

Meanwhile, when multiple DMRS ports are indicated to the UE, the UE may assume a repeated transmission number corresponding to a specific DMRS port (if repeated transmission numbers corresponding to the DMRS ports are different). For example, a repeated transmission number corresponding to a higher or lower index may be defined to be followed. As an example, when DMRS ports 0 and 1 are indicated, and defined to correspond to the lower index, the repeated transmission number of k1 corresponding to DMRS port 0 may be indicated.

In addition to the proposal, a method of indicating different repeated transmission numbers according to the order of the DMRS port index in the same CDM group may also be considered. That is, different repeated transmission numbers may be configured for the DMRS ports in the same CDM group, respectively. This may also be interpreted as mapping a specific repeated transmission number to the DMRS antenna port group constituted by the DMRS antenna ports included in different CDM groups. In other words, DMRS ports in which the same repeated transmission number is configured may correspond to different CDM groups.

Table 12 shows an example in which different repeated transmission numbers are mapped according to the order of the DMRX port index in the same CDM group. Table 12 is just an example for convenience of the description and does not limit the technical scope of the present disclosure.

TABLE 12

| Type 1 | | | Type 2 | | |
|---|---|---|---|---|---|
| CDM group index | DMRS port | the number of repetition | CDM group index | DMRS port | the number of repetition |
| 0 | 0 | k1 | 0 | 0 | k1 |
|   | 1 | k2 |   | 1 | k2 |
|   | 4 | k3 |   | 6 | k3 |
|   | 5 | k4 |   | 7 | k4 |
| 1 | 2 | k1 | 1 | 2 | k1 |
|   | 3 | k2 |   | 3 | k2 |
|   | 6 | k3 |   | 8 | k3 |
|   | 7 | k4 |   | 9 | k4 |
|   |   |   | 2 | 4 | k1 |
|   |   |   |   | 5 | k2 |
|   |   |   |   | 10 | k3 |
|   |   |   |   | 11 | k4 |

In the example of Table 12, k1 to k4 mean different repeated transmission numbers. In this case, some of the values of k1 to k4 may correspond to the same value. The repeated transmission numbers (e.g., the values of k1 to k12) may be configured to the UE through the higher layer signaling or a specific value may be defined by a fixed rule between the BS and the UE.

Referring to Table 12, different repeated transmission numbers may be indicated according to the order in the CDM group including the relevant DMRS ports based on the DMRS port index indicated to the UE. In other words, the repeated transmission numbers of k1 to k4 may be configured/defined, and may sequentially correspond to k1 to k4, respectively sequentially based on an indication order of the DMRS port. For example, when DMRS configuration type 1 is assumed, as DMRS port 0 is indicated to the UE, the repeated transmission number corresponding to k1 may be indicated and as DMRS port 4 is indicated, the repeated transmission number corresponding to k3 may be indicated.

Meanwhile, when multiple DMRS ports are indicated to the UE, the UE may assume a repeated transmission number corresponding to a specific DMRS port (if repeated transmission numbers corresponding to the DMRS ports are different). For example, a repeated transmission number corresponding to a higher or lower index may be defined to be followed. As an example, when DMRS ports 0 and 1 are indicated, and defined to correspond to the lower index, the repeated transmission number of k1 corresponding to DMRS port 0 may be indicated.

When different repeated transmission numbers are indicated according to the order of the DMRX port index in the same CDM group as in the example described above, there may be the following advantage.

When a situation of multi-user (MU)-pairing assuming scheme 3 or scheme 4 is considered, it is more natural that a small number of UEs are MU-paired than a large number of UEs are MU-paired. The reason is that MU-pairing is primarily used for a purpose of increasing a data transmission rate by simultaneously transmitting data to multiple UEs, and to this end, precoding orthogonal to different UEs should be able to be applied so as to prevent interference between UEs. However, in the case of URLLC, it is preferable to minimize interference with another UE and further, in order to reduce a latency time, urgent data transmission may be performed, and in this case, it may be difficult and not preferred to find a UE having precoding orthogonal for a short time. Accordingly, when it is assumed that a small number of UEs are MU-paired, different UEs may be supported through the DMRS port(s) included in different CDM groups. The reason is that it is anticipated that interference between DMRS ports which are multiplexed based on FDM upon channel estimation is smaller than interference between DMRS ports which are multiplexed based on CDM.

When a situation is assumed in which different UEs are supported through DMRS port(s) included in different CDM groups, different repeated transmission numbers should be able to be indicated to the respective UEs through the DMRS port(s) in the same CDM group. For example, when the maximum number of symbols of the DMRS is 1 and DMRS type 1 is assumed, DMRS ports 0 and 1 and DMRS ports 2 and 3 are included in CDM groups 0 and 1, respectively. In this case, when DMRS ports 0 and 1 correspond to the same repeated transmission number and DMRS ports 2 and 3 correspond to the same repeated transmission number, there is no method capable of indicating different repeated transmission numbers to different respective UEs. Accordingly, it may be regarded that it is preferable that different repeated transmission numbers correspond to different DMRS port(s) in the same CDM group. Accordingly, according to the proposed method, different repeated transmission numbers may be mapped according to the order of the DMRS port index in the same CDM group, and a specific repeated transmission number may be indicated according to the DMRS port index indicated to the UE.

Table 13 shows another example in which different repeated transmission numbers are mapped according to the order of the DMRX port index in the same CDM group according to the method proposed in the present disclosure. Table 13 is just an example for convenience of the description and does not limit the technical scope of the present disclosure.

TABLE 13

| Type 1 | | | Type 2 | | |
|---|---|---|---|---|---|
| CDM group index | DMRS port | the number of repetition | CDM group index | DMRS port | the number of repetition |
| 0 | 0 | k1 | 0 | 0 | k1 |
|   | 1 | k2 |   | 1 | k2 |
|   | 4 | k3 |   | 6 | k3 |

TABLE 13-continued

| Type 1 | | | Type 2 | | |
|---|---|---|---|---|---|
| CDM group index | DMRS port | the number of repetition | CDM group index | DMRS port | the number of repetition |
| | 5 | k4 | | 7 | k4 |
| 1 | 2 | k2 | 1 | 2 | k2 |
| | 3 | k1 | | 3 | k1 |
| | 6 | k4 | | 8 | k4 |
| | 7 | k3 | | 9 | k3 |
| | | | 2 | 4 | k1 |
| | | | | 5 | k2 | is assumed, the repeated transmission number corresponding to k1 may be indicated for DMRS ports 0 and 1 and the repeated transmission number corresponding to k2 may be indicated for DMRS ports 2 and 3.

Meanwhile, in addition to matters presented in the examples of Tables 10, 11, 12, and 13, the repeated transmission number corresponding to each DMRS port may be defined differently according to the maximum symbol number ('maxLength') of the DMRS configured to the UE.

Table 14 shows an example of differently defining the repeated transmission number corresponding to each DMRS port according to the maximum symbol number of the DMRS by assuming Table 13 above. Table 14 is just an example for convenience of the description and does not limit the technical scope of the present disclosure.

TABLE 14

| maxLength = 1 | | | | | | | maxLength = 2 | | | | | |
|---|---|---|---|---|---|---|---|---|---|---|---|---|
| Type 1 | | | Type 2 | | | Type 1 | | | Type 2 | | | |
| CDM group index | DMRS ports | the number of repetition | CDM group index | DMRS ports | the number of repetition | CDM group index | DMRS ports | the number of repetition | CDM group index | DMRS ports | the number of repetition | |
| 0 | 0 | k1 | 0 | 0 | k1 | 0 | 0 | k1 | 0 | 0 | k1 | |
| | 1 | k2 | | 1 | k2 | | 1 | k3 | | 1 | k3 | |
| | | | | | | | 4 | k2 | | 6 | k2 | |
| | | | | | | | 5 | k4 | | 7 | k4 | |
| 1 | 2 | k2 | 1 | 2 | k2 | 1 | 2 | k1 | 1 | 2 | k1 | |
| | 3 | k1 | | 3 | k1 | | 3 | k3 | | 3 | k3 | |
| | | | | | | | 6 | k2 | | 8 | k2 | |
| | | | | | | | 7 | k4 | | 9 | k4 | |
| | | | 2 | 4 | k1 | | | | 2 | 4 | k1 | |
| | | | | 5 | k2 | | | | | 5 | k3 | |
| | | | | | | | | | | 10 | k2 | |
| | | | | | | | | | | 11 | k4 | |

TABLE 13-continued

| Type 1 | | | Type 2 | | |
|---|---|---|---|---|---|
| CDM group index | DMRS port | the number of repetition | CDM group index | DMRS port | the number of repetition |
| | | | | 10 | k3 |
| | | | | 11 | k4 |

When the example of Table 13 is compared with Table 12, there is a feature that repeated transmission numbers corresponding to DMRS ports included in CDM group 1 are different. This has a feature that when multiple DMRS ports are indicated to the UE, the UE may assume a repeated transmission number corresponding to a specific DMRS port (if the repeated transmission numbers corresponding to the DMRS ports are different), and indicate different repeated transmission numbers through a combination of DMRS ports included in different CDM groups. For example, when a repeated transmission number corresponding to a higher or lower index is defined to be followed, different repeated transmission numbers may be configured through the combination of the DMRS ports included in different CDM groups.

For example, when Table 12 and the repeated transmission number corresponding to the small DMRS port are defined to be followed, the repeated transmission number corresponding to k1 may be indicated for each of the combination of DMRS ports 0 and 1 and the combination of DMRS ports 2 and 3. On the contrary, when Table 13 above Referring to Table 14, the repeated transmission numbers corresponding to the DMRS ports may be differently defined for a case where the maximum symbol number is 1 (i.e., maxlength=1) and a case where the maximum symbol number is 2 (i.e., maxlength=2), respectively.

In the case where the maximum symbol number is 1, the repeated transmission numbers corresponding to k1 and k2 may be indicated by using DMRS ports in different CDM groups, respectively in the case of 1 layer transmission and k1 and k2 may be indicated by using a (0, 1) combination and a (2, 3) combination, respectively by assuming that the repeated transmission number corresponding to the small DMRS port is followed in the case of 2 layer transmission. On the contrary, in the case where the maximum symbol number is 2, the repeated transmission numbers corresponding to k1, k2, k3, and k4 may be indicated by using DMRS ports in different CDM groups, respectively in the case of 1 layer transmission, and k1 and k2 may be indicated by using the (0, 1) combination and a (4, 5) combination, respectively by assuming that the repeated transmission number corresponding to the small DMRS port is followed, and k1 and k2 may be indicated by using the (2, 3) combination and a (6, 7) combination, respectively.

That is, in the example, there is a feature that in the case where the maximum symbol number of the DMRS is 1, different repeated transmission numbers may be indicated through the DMRS port combination in different CDM groups upon the 2 layer transmission, and in the case where the maximum symbol number is 2, different repeated transmission numbers may be indicated through the DMRS port combination in the same CDM group upon the 2 layer transmission.

When Table 13 and Table 14 are compared, the repeated transmission numbers corresponding to k1, k2, k3, and k4 may be indicated upon the 2 layer transmission, and as a result, there may be an advantage in that more various repeated transmissions numbers may be indicated when assuming one UE. Meanwhile, in the case of Table 14, the repeated transmission numbers corresponding to k1 and k2 may be indicated upon the 2 layer transmission, but the same repeated transmission number may be indicated in each of different CDM groups, and as a result, there may be an advantage in that independent repeated transmission numbers may be indicated to different UEs when the MU-pairing is considered.

Since the method and/or embodiment (e.g., examples 1 to 5) may be applied to a case where the repeated transmission is intended to be performed in the time domain as described above, it is apparent that scheme 3 and/or scheme 4 are/is applicable. Further, the method and/or embodiment (e.g., examples 1 to 5) may become one example applicable to the methods of Proposal 2, and are/is not limited to the example(s). Further, it is apparent that another embodiment (s) may be applied based on the feature of the proposed method. Further, the method and/or embodiment (e.g., examples 1 to 5) may be independently applied or may also applied as a method of a form in which multiple proposed methods are combined.

The repeated transmission number of the transmission occasion may be configured based on the method and/or embodiment (e.g., examples 1 to 5). That is, the number of multiple transmission occasions received by the UE may be known.

<Proposal 2-1>

The method and/or embodiment (e.g., examples 1 to 5) may also be used as a method of indicating the number of shifting symbols between different transmission occasions in the case of scheme 3.

In the case of scheme 3, the shifting symbol between different transmission occasions may mean a degree at which different transmission occasions are separated from each other.

FIG. 11 illustrates an example of a configuration of a shifting symbol between transmission occasions.

Referring to FIG. 11, according to definition 1, the shifting symbol may mean the number of symbols from a last symbol of a first transmission occasion up to a first symbol of a second transmission occasion. In this case, the shifting symbol may also be replaced with a gap symbol and expressed. For example, the shifting symbol (gap symbol) may also be interpreted as a gap between the first transmission occasion and the second transmission occasion. According to definition 2, the shifting symbol may mean the number of symbols from the first symbol of the first transmission occasion up to the first symbol of the second transmission occasion. In the following description, the shifting symbol will be described according to definition 1. However, this is just for convenience of the description and does not limit the scope of the present disclosure. Accordingly, this is applicable even to the case according to definition 2.

In the case of scheme 3, a reason for requiring the shifting symbol is to support the repeated transmission to be performed in one slot even when a DL/UL symbol is changed in one slot.

Table 15 shows a partial example of a slot format for a normal CP (see Table 11.1.1-1 of TS 38.213). Referring to Table 15, symbols for DL (D) and UL (U) may be repeatedly configured in one slot.

TABLE 15

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |

FIG. 12 illustrates an example of a transmission occasion repeatedly transmitted in one slot. FIG. 12 is just for convenience of the description and does not limit the technical scope of the present disclosure.

FIG. 12 illustrates an example of applying the repeated transmission to a slot format corresponding to Value 49 in Table 15 above. In FIG. 12, Case 1 shows an example of the repeated transmission when the DL/UL symbol change is not considered in one slot. In this case, a problem occurs in that the second transmission occasion may not be transmitted while being overlapped with a symbol for actual UL transmission. On the contrary, Case 2 shows an example of performing the repeated transmission only in a symbol for DL transmission by considering the DL/UL symbol change in one slot. When the BS intends to perform the repeated transmission by considering the DL/UL symbol change in one slot as such, the BS need to announce, to the UE, the number of shifting symbols between different transmission occasions.

For example, the number of shifting symbols between different transmission occasions may be configured based on the method and/or embodiment (e.g., examples 1 to 5). As an example, the number of shifting symbols (gap symbols) may be configured through the higher layer signaling. As an example, the number of shifting symbols may also be configured by using a field newly defined for the configuring the number of shifting symbols in the DCI or a conventional field (e.g., the TCI state field, the antenna port(s) field, the MCS field, the NDI field, the RV field, etc.). As an example, the repeated transmission number may be replaced with the number of shifting symbols and interpreted in the method and/or embodiment (e.g., examples 1 to 5).

<Proposal 2-2>

The method and/or embodiment (e.g., examples 1 to 5) may also be used as a method of indicating different RV values of different transmission occasions in the case of scheme 2b/3.

In the case of scheme 2b/3, in respect to different RV values of different transmission occasions, a value of a first RV field indicated to the UE may indicate an RV value of the first transmission occasion, and in respect to the RV value of the second transmission occasion, a difference value and/or a value of actual RV and/or RV combination related indication information may be separately signaled based on the value indicated as the first RV field. The following method may become one example of a method of indicating the difference value of the RV value and/or the actual RV value and/or the RV combination related indication information.

Hereinafter, proposed is a method of indicating RV related information for each transmission occasion in time domain repetition transmission. For convenience of description, an example of the case where two TRPs (e.g., TRP 1 and TRP 2) perform coordinated transmission is primarily described, but does not limit the scope of the present disclosure. Accordingly, the method may be applied even to a case where three or more TRPs perform the coordinated transmission, of course. Further, a single DCI based M-TRP operation is assumed and described.

In the example of Proposal 2-2, it is assumed that the first transmission occasion corresponds to TRP 1 and the second transmission occasion corresponds to TRP 2. Here, the different transmission occasions may be interpreted as different (transmission) resource domains corresponding to different TRPs.

In respect to the method and/or embodiments (e.g., examples 1 to 5), different RV values may be indicated for the transmission resource regions corresponding to different TRPs. This is because independent encoded bits may correspond to respective transmission resource regions corresponding to different TRPs. When different RV values may be indicated to the independent encoded bits corresponding to different TRPs as such, there may be an advantage in that a most appropriate RV combination may be indicated according to a channel environment.

For example, when there is a path loss difference between different channels corresponding to different TRPs, more parity bits may be transmitted by indicating a combination of self decodable RV (e.g., 0 and/or 3) and non-self decodable RV (e.g., 1 and/or 2 and/or 3), and robust channel coding may be applied. On the contrary, when the path loss difference between different channels corresponding to different TRPs is large or a blockage environment is considered, the self decodable RV is mapped to all of the different TRPs to receive self decodable encoded bits even in one TRP among different TRPs, thereby enhancing a reception capability of the UE.

In the present disclosure, the 'self decodable RV' may mean a decodable RV value by receiving single encoded bits due to a low effective coding rate, and the 'non-self decodable RV' may mean an RV value which is difficult to decode by receiving the single encoded bits due to a high effective coding rate. In the present disclosure, the 'blockage environment' may mean a channel environment in which the reception SNR from the relevant TRP is very low because a channel from a specific TRP becomes weak. The 'encoded bits' mentioned in the present disclosure may also be referred to as codeword (CW).

The following method may be applied in order to indicate different RV values to respective encoded bits corresponding to the transmission resource regions corresponding to different TRPs. Hereinafter, a method of configuring the RV value corresponding to each transmission occasion will be described in detail.

Method 1: The RV value (e.g., a first RV value) may be indicated through the RV field of the DCI and a difference value from the RV value (e.g., the first RV value) may be indicated. Method 1 is a method of indicating an actual different value (e.g., alpha) compared with x when it is assumed that the RV value (e.g., the first RV value) indicated through the first RV field is x. For example, when X is indicated by the RV value based on the first RV field and the alpha is indicated, the RV value of the second transmission occasion may be determined as X+alpha. For example, when it is assumed that the x is 0, if the difference value indicates 3, the RV value of the first transmission occasion corresponds to 0 and the RV value of the second transmission occasion corresponds to 3.

Method 2: A method of indicating a difference value in the relevant order after defining a specific RV order may be considered. For Method 2, first, multiple RV values need to be defined in a specific order. To this end, the RV order used for retransmission may be used. For example, the order of the RV values may be defined in the order of 0, 2, 3, and 1. In addition, when the RV value indicated through the first RV field is x, the number of RV value, based on x, is may be cyclically indicated. For example, when 0 is indicated as the RV value of the first transmission occasion and 3 is indicated as the difference value, the RV value of the second transmission occasion corresponds to 1 positioned in an order behind 0 by three steps.

Method 3: Multiple RV values (e.g., the first RV value and the second RV value) may be indicated through the RV field of the DCI. That is, another RV value (e.g., the second RV value) to be actually applied may be indicated according to Method 3 in addition to the RV value (e.g., the first RV value) indicated through the first RV field.

Method 4: Method of Indicating RV Combination

A method of indicating different RV values to the transmission resource regions corresponding to different TRPs may be considered. That is, a method of indicating the RV combination for different transmissions occasions (e.g., the first transmission occasion/the second transmission occasion) may also be considered. Here, the different transmission occasions may be interpreted as different (transmission) resource domains corresponding to different TRPs.

An RV value for the encoded bits transmitted through a specific (transmission) resource region corresponding to a specific TRP among multiple TRPs, and an RV value for encoded bits transmitted through a specific resource region corresponding to other TRPs other than the specific TRP may be fixed/configured (e.g., RRC signaling and/or MAC-CE signaling) to a specific value (i.e., default value, e.g., 0).

For example, when two TRPs are configured, an RV value for one TRP (e.g., TRP 1) may be dynamically indicated through the RV field in the DCI, and an RV value for the other TRP (e.g., TRP 2) other than the relevant TRP may be fixed to a specific value or configured through the higher layer signaling. Further, for example, when three or more TRPs are configured, an RV value for one TRP among multiple TRPs may be dynamically indicated through the RV field in the DCI, and an RV value for a TRP(s) other than the one specific TRP may be fixed to a specific value(s) or configured through the higher layer signaling. In this case, the specific value(s) may be fixed/configured to the same value for all TRP(s), or fixed/configured to an individual value for each TRP(s).

As an example, in the proposal, the 'specific resource region corresponding to the specific TRP' may be a resource region corresponding a first TCI state (e.g., TCI state #0) and/or CW #0 and/or a first TB field. The 'first' may become one example, and may be replaced with another specific value such as second, etc. That is, the specific resource region corresponding to the specific TRP may be a resource region corresponding to a specific TCI state, a specific CW, and/or a specific TB field. The relevant specific value may be fixed as a (pre)-fixed value between the BS and the UE or the BS may also configure, to the UE, the relevant specific value through the higher layer signaling (e.g., RRC/MAC-CE) and/or DCI signaling. When the proposal is applied, an example of an RV combination which may be indicated to each of TRPs 1 and 2, i.e., corresponds to the encoded bits corresponding to the resource region corresponding to each TRP may be shown in Table 16.

Table 16 shows an example of an RV combination corresponding to each TRP. In the example of Table 16, the RV value of TRP 2 may be fixed/configured to 0 or another value (e.g., 1/2/3). As an example, another value may be configured through the higher layer signaling.

TABLE 16

| RV value indicated by RV field in DCI | TRP 1 (e.g., for the first TCI state) | TRP 2 (e.g., for the second TCI state) |
| --- | --- | --- |
| 0 | 0 | 0 or higher layer signaled value |
| 1 | 1 | 0 or higher layer signaled value |
| 2 | 2 | 0 or higher layer signaled value |
| 3 | 3 | 0 or higher layer signaled value |

When Method 4 described is applied, the following advantage may be obtained. First, different RV combinations for different TRPs may be indicated through a single specific RV field in the DCI. Second, a specific TRP among different TRPs may continuously transmit the encoded bits of the self decodable RV. As an example, when Method 4 above is applied, in the case of an environment in which the path loss difference between different channels corresponding to different TRPs is small, a combination of the self decodable RV and the non-self decodable RV may be indicated. On the contrary, in the case of an environment in which the path loss difference is large or blockage may occur, the combination of the self decodable RV and the self decodable RV may be indicated. Through this, there is a technical effect capable of dynamically indicating a robust (i.e., optimized) RV combination according to a channel environment.

Further, jointly with Method 4 described above, a method of indicating the RV combination constituted by multiple RV values through the RV field in the DCI may also be considered. When such a method is applied, there may be a feature that the RV field may correspond to multiple RV values differently from a case where the RV field corresponds to a specific RV value in a conventional standard.

Table 17 illustrates an example in which a combination of multiple RV values is indicated/configured. Table 17 is just an example for convenience of the description and does not limit the technical scope of the present disclosure.

TABLE 17

| RV value indicated by RV field in DCI | TRP 1 (e.g., for the first TCI state) | TRP 2 (e.g., for the second TCI state) |
| --- | --- | --- |
| 0 | 0 | 0 |
| 1 | 0 | 3 |
| 2 | 0 | 2 |
| 3 | 1 | 3 |

Referring to Table 17, the RV value (or index) may be indicted through the RV field in the DCI, and multiple RV values may be mapped for each RV value. In other words, a mapping relationship of multiple RV values may be pre-defined for each codepoint of the RV field of the DCI, and the RV value corresponding to each TRP may determine based on a value indicated by the DCI.

As in the example of Table 17, when the method of indicating the RV combination constituted by multiple RV values is applied, there may be a feature that the value indicted through the RV field is different from the RV value to be actually applied. The RV combination corresponding to each RV field may be defined as a fixed value between the BS and the UE, and a specific RV combination may be configured to the UE through the higher layer signaling and/or the DCI signaling.

Method 5: Method of Indicating Mapping Relationship Between RV Combination and TRP According to Method 4 described above, there may be an advantage in that different RV values may be indicated to different encoded bits corresponding to different TRPs. The 'different encoded bits corresponding to different TRPs' may be interpreted as different encoded bits corresponding to different TCI states. Meanwhile, Method 4 above has a feature that the RV combination indicated through the specific RV field is fixed in a specific order. For example, according to Method 4, 3 may be indicated to encoded bits corresponding to the first TRP through the RV field in the DCI and 0 may be indicated to encoded bits corresponding to the second TRP, but contrary to this, 0 and 3 may not be indicated.

The limitation may have a disadvantage in that when the BS indicates the RV order differently according to the channel state between the TRP and the UE, the combination of the TCI states is the same, but respective codepoints having a different order should be defined in the TCI state field, and as a result, efficiency of the TCI state field deteriorates. For example, when each of codepoint 0 corresponding to {TCI state A, TCI state B} of the TCI field and codepoint 1 corresponding to {TCI state B, TCI state A} is defined, combinations of {2, 0} and {0, 2} may be indicated to encoded bits corresponding to TCI state A and encoded bits corresponding to TCI state B through codepoint 0 and codepoint 1, respectively (in Method 4, it is assumed that 2 is indicated in the RV field).

A method capable of changing an order (or the order of the TCI state) of TRPs corresponding to different RVs may be considered in order to overcome the disadvantage.

Method 5-1) Specific mapping order related information may be indicated based on the index of the CDM group including the DMRS port(s) indicated through the antenna port(s) field in the DCI (e.g., see an antenna port related table of TS 38.212 DCI format 1-1). That is, different mapping orders may be indicated according to the index of the CDM group. As an example, when the indicated CDM group index is 0, i.e., when the indicated DMRS port(s) is included in CDM group 0, the first RV value in the RV combination (e.g., the RV combination configured by the BS as in Method 4) indicated to the UE may be applied to the encoded bits corresponding to the first TCI state and the second RV value may be applied to the encoded bits corresponding to the second TCI state. On the contrary, when the indicated CDM group index is 1, i.e., when the indicated DMRS port(s) is included in CDM group 1, the first RV value in the RV combination indicated to the UE may be applied to the encoded bits corresponding to the second TCI state and the second RV value may be applied to the encoded bits corresponding to the first TCI state. Alternatively, the opposite case is also possible.

Method 5-2) A Modulation and Coding Scheme (MCS)/ New Data Indicator (NDI) field for a second transport block (TB) of the DCI may be used. For example, different mapping orders may be indicated through 1 bit of the MCS/NDI field Method 5-3) Specific mapping order related information may be indicated based on the DMRS antenna port(s) index through the antenna port(s) field in the DCI.

For example, the specific mapping order related information may be mapped to a specific DRMS antenna port or DMRS antenna ports (DMRS antenna port group).

Table 18 shows an example of mapping specific mapping order related information to a specific DMRS antenna port and Table 19 shows an example of mapping the specific mapping order related information to a specific DMRS antenna port group. The DMRS antenna port group may be constituted by multiple DMRS antenna ports.

TABLE 18

| Type 1 | | Type 2 | |
| --- | --- | --- | --- |
| DMRS port | Mapping order between TCI states and RV values | DMRS port | Mapping order between TCI states and RV values |
| 0 | k1 | 0 | k1 |
| 1 | k2 | 1 | k2 |
| 2 | k3 | 2 | k3 |
| 3 | k4 | 3 | k4 |
| 4 | k5 | 4 | k5 |
| 5 | k6 | 5 | k6 |
| 6 | k7 | 6 | k7 |
| 7 | k8 | 7 | k8 |
| | | 8 | k9 |
| | | 9 | k10 |
| | | 10 | k11 |
| | | 11 | k12 |

TABLE 19

| Type 1 | | Type 2 | |
| --- | --- | --- | --- |
| DMRS port | Mapping order between TCI states and RV values | DMRS port | Mapping order between TCI states and RV values |
| 0 | k1 | 0 | k1 |
| 1 | k1 | 1 | k1 |
| 2 | k2 | 2 | k2 |
| 3 | k2 | 3 | k2 |
| 4 | k3 | 4 | k3 |
| 5 | k3 | 5 | k3 |
| 6 | k4 | 6 | k4 |
| 7 | k4 | 7 | k4 |
| | | 8 | k5 |
| | | 9 | k5 |
| | | 10 | k6 |
| | | 11 | k6 |

In the examples of Table 18 and Table 19, k1 to k12 may mean different mapping order related information. In this case, some of the values of k1 to k12 may correspond to the same mapping order. The mapping order corresponding to k1 to k12 above may be configured to the UE through the higher layer signaling or a specific mapping order may be defined by a fixed rule between the BS and the UE.

Referring to Table 18, different mapping order related information may be mapped to different DMRS antenna ports. Further, referring to Table 19, different mapping order related information may be mapped by a group granularity constituted by multiple DMRS antenna ports. In the examples of Table 18 and Table 19, different mapping order related information may be indicated according to the DMRS port index indicated to the UE. For example, when Table 19 is assumed, when DMRS port 0 is indicated to the UE, the mapping order related information (e.g., the first RV is mapped to the first TCI state and the second RV is mapped to the second TCI state) corresponding to k1 may be indicated and when DRMS port 2 is indicated, the mapping order related information (e.g., the second RV is mapped to the first TCI state and the first RV is mapped to the second TCI state) corresponding to k2 may be indicated.

Meanwhile, when multiple DMRS ports are indicated to the UE, the UE may assume mapping order related information corresponding to a specific DRMS port. For example, mapping order related information corresponding to a higher or lower index may be defined to be followed. As an example, when DMRS ports 0 and 1 are indicated, and defined to correspond to the lower index, the mapping order related information corresponding to k1 corresponding to DMRS port 0 may be indicated.

Further, different mapping order information may also be indicated according to the DMRS port index in the same CDM group. In other words, specific mapping order related information may be mapped to a DMRS antenna port group constituted by the DMRS antenna ports included in different CDM groups.

Table 20 shows an example of indicating different mapping order related information according to the order of the DMRS port index by a CDM group granularity.

TABLE 20

| Type 1 | | | Type 2 | | |
| --- | --- | --- | --- | --- | --- |
| CDM group index | DMRS port | Mapping order between TCI states and RV values | CDM group index | DMRS port | Mapping order between TCI states and RV values |
| 0 | 0 | k1 | 0 | 0 | k1 |
| | 1 | k2 | | 1 | k2 |
| 4 | k3 | | 6 | k3 |
| 5 | k4 | | 7 | k4 |

TABLE 20-continued

| Type 1 | | | Type 2 | | |
|---|---|---|---|---|---|
| CDM group index | DMRS port | Mapping order between TCI states and RV values | CDM group index | DMRS port | Mapping order between TCI states and RV values |
| 1 | 2 | k1 | 1 | 2 | k1 |
|  | 3 | k2 |  | 3 | k2 |
|  | 6 | k3 |  | 8 | k3 |
|  | 7 | k4 |  | 9 | k4 |
|  |  |  | 2 | 4 | k1 |
|  |  |  |  | 5 | k2 |
|  |  |  |  | 10 | k3 |
|  |  |  |  | 11 | k4 |

In the example of Table 20, k1 to k4 mean different mapping order related information. In this case, some of the values of k1 to k4 may correspond to the same mapping order. The mapping order related information may be configured to the UE through the higher layer signaling or a specific mapping order may be defined by a fixed rule between the BS and the UE.

Referring to Table 20, the different mapping order related information may be mapped according to the DMRS port index in the same CDM group. In other words, the different mapping order related information may be indicated according to the order in the CDM group including the relevant DMRS ports based on the DMRS port index indicated to the UE. For example, when DMRS configuration type 1 is assumed, in a case where DMRS port 0 is indicated to the UE, mapping order related information corresponding to k1 may be indicated and in a case where DMRS port 4 is indicated, mapping order related information corresponding to k3 may be indicated.

Meanwhile, when multiple DMRS ports are indicated to the UE, the UE may assume mapping order related information corresponding to a specific DRMS port. For example, mapping order related information corresponding to a higher or lower index may be defined to be followed. As an example, when DMRS ports 0 and 1 are indicated, and defined to correspond to the lower index, the mapping order related information corresponding to k1 corresponding to DMRS port 0 may be indicated.

Method 6:

In Method 5 and Method 5-1/5-2/5-3, proposed is a method capable of indicating different mapping orders for a TCI state combination constituted by multiple TCI states defined in a specific codepoint of the TCI state field in the DCI and an RV combination indicated through the RV field. For example, when {TCI state A, TCI state B} is indicated through the specific codepoint of the TCI state field and {RV0, RV2} is indicated through the RV field, a mapping relationship between {TCI state A-RV0, TCI state B-RV2} or {TCI state A-RV2, TCI state B-RV0} may be determined through the CDM group index. That is, in this case, in order to apply different mapping orders between TCI states and RV values, additional information (e.g., CDM group index, DMRS port index, etc.) may be required.

Unlike this, a method of defining an RV combination constituted by the same RC values and having different orders in the RV field may be applied in addition to the proposed scheme. That is, a combination autonomously having different mapping orders between the TCI states and the RV values in the RV field may be configured/defined. In addition, it is apparent that even when schemes of Method 5 and Method 5-1/5-2/5-3 described above are not applied, the relevant method may be applied as a method of indicating different RVs in resource regions corresponding to different TCI states.

Table 21 shows an example of a method of indicating the RV combination according to Method 6 of the present disclosure.

TABLE 21

| Value of the redundancy version field (order may be changed) | Value of $rv_{id}$ to be applied to transmission occasion with the first (or second) TCI state | Value of $rv_{id}$ to be applied to transmission occasion with the second (or first) TCI state |
|---|---|---|
| 00 | 0 | 0 |
| 01 | 0 | 2 |
| 10 | 2 | 0 |
| 11 | 1 | 3 |

In the example of the RV combination, RV combinations corresponding to 01 and 10 which are values of the RV field are {0, 2} and {2, 0}, respectively. As an example, an RV combination of {x, 0} and {0, x} (e.g., x=one value of {1, 2, 3}) in the RV field may be defined/configured. The combination has a feature that the combination is constituted by the same RV values and has different orders. When the RV combinations having the feature are jointly defined in the RV field, the BS has an advantage of being capable of indicating RV combinations of different orders through the RV field according to channel situations of different TRPs. That is, the BS has an advantage of being capable of configuring and/or indicating an optimized RV combination by determining and considering the channel situation of each TRP. For example, when TRP A has a better channel (e.g., higher CQI) in respect to TRP A/B (e.g., TRP A is mapped to the first TCI state and TRP 2 is mapped to the second TCI state), RV0 which is self-decodable RV may be indicated for TRP A and RV2 may be indicated for TRP B.

There may be an RV combination of Table 22 as another example having the same purpose.

TABLE 22

| Value of the redundancy version field (order may be changed) | Value of $rv_{id}$ to be applied to transmission occasion with the first (or second) TCI state | Value of $rv_{id}$ to be applied to transmission occasion with the second (or first) TCI state |
|---|---|---|
| 00 | 0 | 0 |
| 01 | 0 | 2 |
| 10 | 3 | 0 |
| 11 | 1 | 3 |

In the example of the RV combination, RV combinations corresponding to 01 and 10 which are values of the RV field are {0, 2} and {3, 0}, respectively. As an example, an RV combination of {x, 0} and {0, y} (e.g., x=one value of {1, 2, 3} and y=one value of [1, 2, 3] other than the x) in the RV field may be defined/configured. A difference from the previous RV combination is that an RV combination corresponding to 10 is not {2, 0} but {3, 0}. The example may have an advantage of being capable of changing the order of the TRP in which RV0 which is the self-decodable RV is mapped and an advantage of being capable of defining more various RV combinations.

Another example of the RV combination suitable for applying the schemes of Method 5 and Method 5-1/5-2/5-3 in addition to the proposal is shown in Table 23.

TABLE 23

| Value of the redundancy version field (order may be changed) | Value of rv$_{id}$ to be applied to transmission occasion with the first (or second) TCI state | Value of rv$_{id}$ to be applied to transmission occasion with the second (or first) TCI slate |
|---|---|---|
| 00 | 0 | 0 |
| 01 | 2 (or 1 or 3) | 2 (or 1 or 3) |
| 10 | 0 | 2 |
| 11 | 1 (or 3) | 3 (or 1) |

A reason why the RV combination is suitable is as follows. First, the RV combination may be defined by considering a blockage environment in which large path loss may occur radically and a non-blockage environment in which the blockage may not be considered. Accordingly, the (0, 0) combination should be defined to receive the self-decodable RV (e.g., RV0) from a TRP in which the blockage does not occur even when the blockage occurs by considering the blockage environment. Meanwhile, the (0, 2) combination should be defined by considering the non-blockage environment. The reason is that it is anticipated that the (0, 2) combination may have a lower effective channel coding rate due to increment redundancy to have an excellent capability in most environments. The reason why RV combinations (2, 2) and (1, 3) should be defined based on the RV combinations is that retransmission is considered. In the case of the (0, 0) combination, RV0 and RV2 are received through the TRP in which the blockage does not occur even though the blockage occurs in a specific TRP of two TRPs to reduce the effective channel coding rate through the (2, 2) combination upon retransmission Although it is assumed that (RV0, RV0) and (RV2, RV2) are defined by applying RV0 and RV2 in the example, RV2 may be replaced with RV1 or RV3 in the example, and even in this case, a similar feature and a similar effect may be obtained (e.g., (2, 2) may be (1, 1) or (3, 3) in Table 23 above).

Meanwhile, in the case of the (0, 2) combination considering the non-blockage environment, the UE may receive data for all RVs and lower the effective channel coding rate as possible through the (1, 3) combination upon retransmission. The order of RV1 and RV3 is applied in the example, and it is also possible to define an order of being mapped to different TCI state as an order of RV3 and RV1. Further, the (0, 2) combination considering the non-blockage environment may be replaced with a combination of (0, x) and defined, and in this case, the RV combination for retransmission in the non-blockage environment may be defined as (y, z) value other than the (0, x). In the example, x may become one value of 1, 2, and 3, and y and z may correspond to values which are not redundant, respectively among values other than 0 and x. For example, when a combination indicated by Value "10" is (0, 1), a combination indicated by Value "11" may be (2, 3) or (3, 2). Alternatively, for example, when the combination indicated by Value "10" is (0, 3), the combination indicated by Value "11" may be (1, 2) or (2, 1).

The example of the specific RV combination may be an example, and it is apparent that it is possible to apply the feature of the proposed scheme to RV combinations constituted by using other RV values.

Further, in the present disclosure an RV value, RV value information, or RV value related information or RV value indication information may be interpreted/used as an actual RV difference value/a difference value in the order/an actual RV value/RV combination related indication information.

<Proposal 2-3>

In Proposal 2-1 described above, the method of indicating the number of shifting symbols between different transmission occasions is described. Further, in Proposal 2-2 described above, the method of indicating different RV values of different transmission occasions is described. The method and/or embodiment (e.g., examples 1 to 5) of Proposal 2 described above may be used in order to indicate the number of shifting symbols and/or the RV value related information (e.g., the difference value of the RV value, the actual RV value, the RV combination related indication information, etc.).

The BS may configure values applicable to the number of shifting symbols and/or the RV value related information to the UE through the higher layer signaling (e.g., RRC/MAC CE). And/or, a candidate value(s) for the number of shifting symbols and/or the RV value related information which are fixed and/or (pre)-promised between the BS and the UE may be defined, and the BS may implicitly or explicitly indicate a specific value among the candidate value(s) for the number of shifting symbols and/or the RV value related information which may be indicated to the UE through a specific field in the DCI.

In the proposal, the candidate value may mean some/all values which the BS configures to the UE through the higher layer signaling based on a pre-configured/defined promise/rule/condition among the number of shifting symbols and/or the RV value related information. Further, the specific field in the DCI may be a field newly defined for indicating the number of shifting symbols and/or the RV value related information or a conventional field (e.g., the TCI state field, the antenna port(s) field, the MCS field, the NDI field, the RV field, etc.).

For example, when the number of shifting symbols and/or the RV value related information are/is configured to the UE through the higher layer signaling, it may be assumed that {1, 2, 3, 4} are defined as the number applicable of shifting symbols. Some (e.g., {1, 2}) of the values as the number of shifting symbols and/or the RV value related information may be configured to the UE through the higher layer signaling. For example, a specific value of the candidate value(s) (e.g., {1, 2}) may be indicated through the specific field in the DCI.

For example, as an example of the specific field in the DCI, the antenna port(s) field may be used. A specific shifting symbol number and/or RV value related information may be indicated based on the index of the CDM group indicated through the antenna port(s) field. As an example, when the indicated CDM group index is 0 (i.e., when the indicated DMRS port(s) is included in CDM group 0), a smaller shifting symbol number among the candidate values for the shifting symbol number and/or smaller RV value related information among the candidate values for the RV value related information may be indicated. When the indicated CDM group index is 1 (i.e., when the indicated DMRS port(s) is included in CDM group 1), a larger shifting symbol number among the candidate values for the shifting symbol number and/or larger RV value related information among the candidate values for the RV value related information may be indicated.

As a specific example, when the candidate value for the shifting symbol number such as {1, 2} is configured, 1 shift symbol may be indicated in the case of indicating CDM group index 0 and 2 shifting symbols may be indicated in the case of indicating CDM group index 1. Alternatively, the opposite case is also possible.

As another example, a Modulation and Coding Scheme (MCS)/New Data Indicator (NDI)/Redundancy Version (RV) field for a second transport block (TB) in the DCI may be used. For example, different shifting symbol numbers and/or RV value related information may be mapped to a codepoint corresponding to the MCS/NDI/RV field for the second TB, and the BS may indicate, to the UE, a specific shifting symbol number and/or RV value related information through the relevant field.

As another example, as an example of the specific field in the DCI, the antenna port(s) field may be used. For example, a specific shifting symbol number and/or RV value related information may be indicated based on the DMRS antenna port(s) index indicated through the antenna port(s) field.

As an example, the specific shifting symbol number and/or RV value related information may be mapped to specific DRMS antenna ports or DMRS antenna ports (DMRS antenna port group).

Table 24 shows an example in which different shifting symbol numbers and/or RV value related information are mapped to different DMRS antenna ports. Table 25 shows an example in which different shifting symbol numbers and/or RV value related information are mapped by a group granularity constituted by multiple DMRS antenna ports.

TABLE 24

| Type 1 | | Type 2 | |
| --- | --- | --- | --- |
| DMRS port | the number of shifting symbols and/or RV value | DMRS port | the number of shifting symbols and/or RV value |
| 0 | k1 | 0 | k1 |
| 1 | k2 | 1 | k2 |
| 2 | k3 | 2 | k3 |
| 3 | k4 | 3 | k4 |
| 4 | k5 | 4 | k5 |
| 5 | k6 | 5 | k6 |
| 6 | k7 | 6 | k7 |
| 7 | k8 | 7 | k8 |
| | | 8 | k9 |
| | | 9 | k10 |
| | | 10 | k11 |
| | | 11 | k12 |

TABLE 25

| Type 1 | | Type 2 | |
| --- | --- | --- | --- |
| DMRS port | the number of shifting symbols and/or RV value | DMRS port | the number of shifting symbols and/or RV value |
| 0 | k1 | 0 | k1 |
| 1 | k1 | 1 | k1 |
| 2 | k2 | 2 | k2 |
| 3 | k2 | 3 | k2 |
| 4 | k3 | 4 | k3 |
| 5 | k3 | 5 | k3 |
| 6 | k4 | 6 | k4 |
| 7 | k4 | 7 | k4 |
| | | 8 | k5 |
| | | 9 | k5 |
| | | 10 | k6 |
| | | 11 | k6 |

In Tables 24 and Table 25, k1 to k12 may mean different shifting symbol numbers and/or RV value related information. In this case, some of the values of k1 to k12 may correspond to the same value. The values corresponding to k1 to k12 above may be configured to the UE through the higher layer signaling or specific values may be defined by a fixed rule between the BS and the UE.

In the examples of Table 24 and Table 25, different shifting symbol numbers and/or RV value related information may be indicated according to the DMRS port index indicated to the UE. For example, referring to Table 25, when DMRS port 0 is indicated to the UE, the shifting symbol number and/or RV value related information corresponding to k1 may be indicated and when DMRS port 2 is indicated, the shifting symbol number and/or RV value related information corresponding to k2 may be indicated.

Meanwhile, when multiple DMRS ports are indicated to the UE, the UE may assume a shifting symbol number and/or RV value related information corresponding to a specific DRMS port. For example, a shifting symbol number and/or RV value related information corresponding to a higher or lower index may be defined to be followed. As an example, when DMRS ports 0 and 1 are indicated, and defined to correspond to the lower index, the shifting symbol number and/or RV value related information corresponding to k1 corresponding to DMRS port 0 may be indicated.

In addition to the proposal, a method of indicating different shifting symbol numbers and/or RV value related information may be indicated according to the order of the DMRX port index in the same CDM group. In other words, a specific shifting symbol number and/or RV value related information may be mapped to a DMRS antenna port group constituted by the DMRS antenna ports included in different CDM groups.

Table 26 shows an example of mapping different shifting symbol numbers and/or RV value related information according to the order of the DMRS port index in the same CDM group.

TABLE 26

| Type 1 | | | Type 2 | | |
| --- | --- | --- | --- | --- | --- |
| CDM group index | DMRS port | the number of shifting symbols and/or RV value | CDM group index | DMRS port | the number of shifting symbols and/or RV value |
| 0 | 0 | k1 | 0 | 0 | k1 |
|   | 1 | k2 |   | 1 | k2 |
|   | 4 | k3 |   | 6 | k3 |
|   | 5 | k4 |   | 7 | k4 |
| 1 | 2 | k1 | 1 | 2 | k1 |
|   | 3 | k2 |   | 3 | k2 |
|   | 6 | k3 |   | 8 | k3 |
|   | 7 | k4 |   | 9 | k4 |
|   |   |   | 2 | 4 | k1 |
|   |   |   |   | 5 | k2 |
|   |   |   |   | 10 | k3 |
|   |   |   |   | 11 | k4 |

In Table 26, k1 to k4 mean different shifting symbol numbers and/or RV value related information. In this case, some of the values of k1 to k4 may correspond to the same value. The shifting symbol number and/or RV value related information may be configured to the UE through the higher layer signaling or a specific value may be defined by a fixed rule between the BS and the UE.

Referring to Table 26, different shifting symbol numbers and/or RV value related information may be indicated according to the order in the CDM group including the relevant DMRS ports based on the DMRS port index indicated to the UE. For example, in the case of assuming DRMS configuration type 1, when DMRS port 0 is indicated to the UE, the shifting symbol number and/or RV value related information corresponding to k1 may be indicated and when DMRS port 4 is indicated, the shifting symbol number and/or RV value related information corresponding to may be indicated.

Meanwhile, when multiple DMRS ports are indicated to the UE, the UE may assume a shifting symbol number and/or RV value related information corresponding to a specific DRMS port. For example, a shifting symbol number and/or RV value related information corresponding to a higher or lower index may be defined to be followed. As an example, when DMRS ports 0 and 1 are indicated, and defined to follow the shifting symbol number and/or RV value related information corresponding to the lower index, the shifting symbol number and/or RV value related information corresponding to k1 corresponding to DMRS port 0 may be indicated.

As in the example of Table 26, when different shifting symbol numbers and/or RV value related information are indicated according to the order of the DMRX port index in the same CDM group, there may be the following advantage.

When a situation of multi-user (MU)-pairing assuming scheme 2b or scheme 3 is considered, it is more natural that a small number of UEs are MU-paired than a large number of UEs are MU-paired. The reason is that MU-pairing is primarily used for a purpose of increasing a data transmission rate by simultaneously transmitting data to multiple UEs, and to this end, precoding orthogonal to different UEs should be able to be applied so as to prevent interference between UEs. However, in the case of URLLC, it is preferable to minimize interference with another UE and further, in order to reduce a latency time, urgent data transmission may be performed, and in this case, it may be difficult and not preferred to find a UE having precoding orthogonal for a short time. Accordingly, when it is assumed that a small number of UEs are MU-paired, different UEs may be supported through the DMRS port(s) included in different CDM groups. The reason is that it is anticipated that interference between DMRS ports which are multiplexed based on FDM upon channel estimation is smaller than interference between DMRS ports which are multiplexed based on CDM.

When a situation is assumed in which different UEs are supported through DMRS port(s) included in different CDM groups, different shifting symbol numbers and/or RV value related information should be able to be indicated to the respective UEs through the DMRS port(s) in the same CDM group.

For example, when the maximum number of symbols of the DMRS is 1 and DMRS type 1 is assumed, DMRS ports 0 and 1 and DMRS ports 2 and 3 are included in CDM groups 0 and 1, respectively. In this case, when DMRS ports 0 and 1 correspond to the same shifting symbol number and/or RV value related information and DRMS ports 2 and 3 correspond to the same shifting symbol number and/or RV value related information, there is no method capable of indicating different shifting symbol numbers and/or RV value related information to different respective UEs. Accordingly, it may be regarded that it is preferable that different shifting symbol numbers and/or RV value related information correspond to different DMRS port(s) in the same CDM group.

To this end, according to the proposed method, different shifting symbol numbers and/or RV value related information may be mapped according to the order of the DMRS port index in the same CDM group, and a specific shifting symbol number and/or RV value related information may be indicated according to the DMRS port index indicated to the UE.

Table 27 shows another example of mapping different shifting symbol numbers and/or RV value related information according to the order of the DMRS port index.

TABLE 27

| | Type 1 | | | Type 2 | |
|---|---|---|---|---|---|
| CDM group index | DMRS port | the number of shifting symbols and/or RV value | CDM group index | DMRS port | the number of shifting symbols and/or RV value |
| 0 | 0 | k1 | 0 | 0 | k1 |
| | 1 | k2 | | 1 | k2 |
| | 4 | k3 | | 6 | k3 |
| | 5 | k4 | | 7 | k4 |
| 1 | 2 | k2 | 1 | 2 | k2 |
| | 3 | k1 | | 3 | k1 |
| | 6 | k4 | | 8 | k4 |
| | 7 | k3 | | 9 | k3 |
| | | | 2 | 4 | k1 |
| | | | | 5 | k2 |
| | | | | 10 | k3 |
| | | | | 11 | k4 |

Table 27 has a feature in that Table 27 is different from Table 26 in terms of shifting symbol numbers and/or RV value related information corresponding to DMRS ports included in CDM group 1. This has a feature in that when multiple DMRS ports are indicated to the UE, in a case where a shifting symbol number and/or RV value related information corresponding a small or large DRMS port is defined to be followed, different shifting symbol numbers and/or RV value related information may be indicated through DMRS port combinations included in different CDM groups.

As an example, when Table 26 and the shifting symbol number and/or RV value related information corresponding to the small DMRS port, the shifting symbol number and/or RV value related information corresponding to k1 may be indicted for each of the combination of DMRS ports 0 and 1 and the combination of DMRS ports 2 and 3. On the contrary, when Table 27 is assumed, the shifting symbol number and/or RV value related information corresponding to k1 for DRMS ports 0 and 1 and k2 for DMRS ports 2 and 3 may be indicated.

Meanwhile, in addition to matters presented in the examples of Tables 24, 25, 26, and 27, the shifting symbol number and/or RV value related information corresponding to each DMRS port may be defined differently according to the maximum symbol number (e.g., 'maxLength') of the DMRS configured to the UE.

Table 28 shows an example of differently defining the shifting symbol number and/or RV value related information corresponding to each DMRS port according to the maximum symbol number of the DMRS based on Table 27.

TABLE 28

| maxLength = 1 | | | | | |
|---|---|---|---|---|---|
| Type 1 | | | Type 2 | | |
| CDM group index | DMRS port | the number of shifting symbols and/or RV value | CDM group index | DMRS port | the number of shifting symbols and/or RV value |
| 0 | 0 | k1 | 0 | 0 | k1 |
|   | 1 | k2 |   | 1 | k2 |
| 1 | 2 | k2 | 1 | 2 | k2 |
|   | 3 | k1 |   | 3 | k1 |
|   |   |   | 2 | 4 | k1 |
|   |   |   |   | 5 | k2 |

| maxLength = 2 | | | | | |
|---|---|---|---|---|---|
| Type 1 | | | Type 2 | | |
| CDM group index | DMRS port | the number of shifting symbols and/or RV value | CDM group index | DMRS port | the number of shifting symbols and/or RV value |
| 0 | 0 | k1 | 0 | 0 | k1 |
|   | 1 | k3 |   | 1 | k3 |
|   | 4 | k2 |   | 6 | k2 |
|   | 5 | k4 |   | 7 | k4 |
| 1 | 2 | k1 | 1 | 2 | k1 |
|   | 3 | k3 |   | 3 | k3 |
|   | 6 | k2 |   | 8 | k2 |
|   | 7 | k4 |   | 9 | k4 |
|   |   |   | 2 | 4 | k1 |
|   |   |   |   | 5 | k3 |
|   |   |   |   | 10 | k2 |
|   |   |   |   | 11 | k4 |

Referring to Table 28, the shifting symbol number and/or RV value related information corresponding to the DMRS port may be differently defined according to the maximum symbol number of the DMRS. For example, when the maximum symbol number is 1 (i.e., maxLength=1), the shifting symbol numbers and/or RV value related information corresponding to k1 and k2, respectively may be indicated by using DMRS ports within different CDM group in the case of 1 layer transmission. Further, in the case of 2 layer transmission, when it is assumed that a repeated transmission number corresponding to the small DMRS port is followed, k1 and k2 may be indicated by using the (0, 1) combination and the (2, 3) combination, respectively. On the contrary, in the case where the maximum symbol number is 2 (i.e., maxLength=2), the shifting symbol numbers and/or RV value related information corresponding to k1, k2, k3, and k4 may be indicated by using DMRS ports in different CDM groups, respectively in the case of the 1 layer transmission, and k1 and k2 may be indicated by using the (0, 1) combination and the (4, 5) combination, respectively by assuming that the repeated transmission number corresponding to the small DMRS port is followed, and k1 and k2 may be indicated by using the (2, 3) combination and the (6, 7) combination, respectively in the case of the 2 layer transmission.

That is, in the example, there is a feature that in the case where the maximum symbol number of the DMRS is 1, different shifting symbols numbers and/or RV value related information may be indicated through the DMRS port combination in different CDM groups upon the 2 layer transmission, and in the case where the maximum symbol number is 2, different shifting symbols numbers and/or RV value related information may be indicated through the DMRS port combination in the same CDM group upon the 2 layer transmission.

Table 27 may have an advantage in that since the shifting symbols numbers and/or RV value related information corresponding to k1, k2, k3, and k4 may be indicated upon the 2 layer transmission, more various shifting symbol numbers and/or RV value related information may be indicated by assuming one UE.

Table 28 may have an advantage in that since the shifting symbol numbers and/or RV value related information corresponding to k1 and k2 may be indicated, but the same shifting symbol number and/or RV value related information may be indicated within each of different CDM groups, upon the 2 layer transmission, independent shifting symbol numbers and/or RV value related information may be indicated to different UEs when considering the MU-pairing.

<Proposal 3>

Proposal 3 in the present disclosure proposes a method of configuring/indicating a transmission resource region in repeated transmission in the time domain.

DCI (e.g., DCI format 1_1, etc.) includes one field, i.e., a 'Time domain resource assignment' for time domain resource scheduling. Accordingly, when the repeated transmission is intended to be performed in the time domain, a method capable of configuring a time resource for each transmission occasion is required. To this end, a new field may also be defined in the DCI, but in this case, a size of a DCI format is diversified, and as a result, complexity of the UE for decoding the PDCCH may increase. In order to configure/indicate a time domain resource for time domain repeated transmission while maintaining a conventional DCI format as it is, a specific rule may be defined between the BS and the UE.

When mini-slot granularity repeated transmission is configured/indicated to the UE, the time domain resource indicated through the DCI may correspond to the first transmission occasion and a time domain resource for the other transmission occasion may have the same size as the resource indicated by the DCI and may be configured in concatenation with the relevant resource. In other words, the time domain resource indicated based on the 'time domain resource assignment' field of the DCI may correspond to the first transmissions occasion. The time domain resource for the second transmission occasion may have the same size as the time domain resource of the first transmission occasion, and may be configured in concatenation therewith. As an example, the first transmission occasion and the second transmission occasion may have the same symbol number.

In the above description, the 'mini-slot' may mean a scheduling structure having a granularity of 2, 4, 6, and 7 symbols which may be indicated by PDSCH mapping type B.

FIG. 13 illustrates an example of resource allocation for repeated transmission in a time domain proposed in the present disclosure. FIG. 13 is just one example for convenience of the description and does not limit the technical scope of the present disclosure.

Referring to FIG. 13, four symbols of #3 to #6 are indicated through the DCI, and this assumes that the symbols are assigned for the first transmission occasion. In addition, the time domain resources (i.e., four symbols) having the same size may be concatenated and assigned for the second transmission occasion according to the proposed method. In the example of FIG. 13, only up to the second transmission occasion is illustrated, but the proposed may be applied even when there is an additional transmission occasion. For example, a third transmission occasion may be defined according to the rule after the second transmission occasion, and the proposal is applied transmission occasions which may be additionally defined based on the above transmission occasion to assign the time domain resource.

In the case of assigning the time domain resource for the repeated transmission as in the method of Proposal 3, since a separate DCI field is not required, there is an advantage in that the conventional DCI format may be maintained. Further, since additional signaling for resource configuration is not required for each transmissions occasion, it is advantageous even in terms of the signaling overhead.

In Proposal 3, when different transmission occasions are concatenated, application of the gap symbol(s) may be considered. When different transmission occasions are concatenated according to a specific subcarrier spacing (SCS) value or a UE capability related to whether the UE being capable of shifting an FFT window, whether to apply the gap symbol(s) may be determined.

For example, when the SCS is large, different transmission occasions may be concatenated with N symbol gaps. In other words, the resource of the second transmission occasion may be assigned from a symbol separated from (after) the first transmission occasion by N symbol gaps. The reason is that a case where the SCS is large may mean FR2 meaning a higher frequency band, and in this case, an influence of inter-symbol interference may increase due to a difference in transmission time from different TRPs, and a situation may occur in which a switching delay for transmission and reception beams of the BS/UE should be considered.

Accordingly, the BS may configure/indicate, to the UE, whether to apply the gap symbol(s) and/or the number of gap symbols when concatenating different transmission occasions. For example, whether to apply the gap symbol(s) and/or the number of gap symbols may be forwarded through the higher layer signaling (e.g., RRC/MAC-CE). For example, whether to apply the gap symbol(s) or/and the number of gap symbols may be configured/indicated to the UE while mapping to a specific subcarrier spacing (SCS) value. The SCS may mean an SCS value configured to the UE for downlink data reception. The mapping relationship may be fixedly defined between the BS and the UE or configured to the UE through the higher layer signaling.

As another example, a UE that may dynamically move according to a UE capability for dynamically shifting the FFT window which may mean a granularity by which the UE acquires a sample value for a symbol subjected to OFDM may concatenate different transmission occasions without the gap symbol, and otherwise, concatenate different transmission occasions with the gap symbol(s).

In the example of FIG. 13 above, two transmission occasions are assumed, but two or more multiple transmission occasions may be indicated/configured. When the method of Proposal 3 described above is applied, there may be a case where the repeated transmission should be performed by exceeding one slot in some cases. In order to prevent such a case, when the repeated transmission is made by exceeding one slot, a transmission occasion which may be defined in a first slot may be repeatedly transmitted by a slot granularity.

FIG. 14 illustrates an example of slot unit repeated transmission based on a transmission occasion structure defined in a first slot in order to prevent repeated transmission by exceeding one slot. Referring to FIG. 14, four symbols of #3 to #6 are indicated through the DCI, and this assumes that the symbols are assigned for the first transmission occasion. In addition, FIG. 14 shows that the time domain resources (i.e., four symbols) having the same size may be concatenated and assigned for the second transmission occasion according to the proposal. Since up to the second transmissions occasion may be transmitted in one slot, the second transmission occasion may be configured to be concatenated. In order to concatenate and configure the third transmission occasion, four symbols are required, but a remaining symbol exceeds one slot subsequent to three (11, 12, and 13). In this case, as proposed in the present disclosure, the transmission occasion structure which may be defined in the first slot may be repeatedly transmitted by the slot granularity.

In addition to Proposal 3 described above, a method of configuring the time domain resource for the transmission occasion for the repeated transmission even when time domain resources for different transmission occasions may not be assigned to the same slot may be required. Hereinafter, a method of solving such a problem will be described in detail.

As a first method, the BS may configure/indicate mini-slot granularity repeated transmission only in one slot so as to prevent such a problem from occurring. As described above, the 'mini-slot granularity repeated transmission' may mean a scheduling structure having repeated transmission by a granularity of 2, 4, 6, and 7 symbols which may be indicated by PDSCH mapping type B. In this case, time resources for all transmission occasions may be assigned in one slot, and the UE may not expect that the repeated transmission exceeding one slot is indicated.

As a second method, when the time domain resource for each transmission occasion is defined according to Proposal 3 above, if a transmission occasion exceeding a boundary of the slot is generated, the relevant transmission occasion may be defined to be assigned with a resource of the same form as the previous transmission occasion in a next slot.

FIG. 15 illustrates an example of resource allocation to a transmission occasion exceeding a slot boundary according to a method proposed in the present disclosure. FIG. 15 is just for convenience of the description and does not limit the technical scope of the present disclosure.

In the example of FIG. 15, it is assumed that the time domain resource indicated through the DCI is from symbol #8 to symbol #11, and the relevant resource is assigned to the first transmission occasion. When the method of Proposal 3 described above is considered, in the subsequent transmitted second transmission occasion, resources having the same size should be assigned in concatenation with each other after the first transmission occasion, but exceed the boundary of the slot in the example of FIG. 15. Accordingly, in this case, it may be assumed that in respect to the time domain resource for the second transmission occasion, a resource at the same location as the first transmission occasion is assigned in the next slot. That is, the resource for the second transmission occasion may be assigned from symbol #8 to symbol #11 of a second slot. Further, the same rule is applied even to the case of the third transmission occasion to assign resources of symbols #8 to #11 of a third slot.

When the resource is configured as such for the transmission occasion for the repeated transmission, the repeated transmission exceeding the slot boundary may be supported, but there may be a disadvantage in that the latency increases. As a method capable of supplementing such latency, a third method is proposed.

As a third method, when the time domain resource for each transmission occasion is defined according to Proposal 3 above, if a transmission occasion exceeding a boundary of the slot is generated, the relevant transmission occasion may be configured/defined to be transmitted from a specific symbol location of the next slot. For example, the specific symbol location may follow a front-load DMRS location for PDSCH mapping type A configured to the UE. The front-load DMRS location for PDSCH mapping type A may be configured to the UE through a higher layer parameter 'dmrs-TypeA-Position'.

FIG. 16 illustrates an example of a time domain resource allocation method when a transmission occasion exceeding a slot boundary occurs to which the method proposed in the present disclosure may be applied. FIG. 16 is just one example for convenience of the description and does not limit the technical scope of the present disclosure.

Referring to FIG. 16, it is assumed that the time domain resource indicated through the DCI is from symbol #8 to symbol #11, and the relevant resource is assigned to the first transmission occasion. When the method of Proposal 3 described above is considered, in the subsequent transmitted second transmission occasion, resources having the same size should be assigned in concatenation with each other after the first transmission occasion, but exceed the boundary of the slot in the example of FIG. 16. Accordingly, in this case, it may be assumed that in respect to the time domain resource for the second transmission occasion, the resource is assigned from the front-load DMRS location for PDSCH mapping type A configured to the UE in the next slot. In FIG. 15, a case where 'dmrs-TypeA-Position' is configured to 2 is assumed.

In the example of FIG. 16, the third transmission occasion may be defined in the same slot according to Proposal 3 after the second transmission occasion, and resources having the same size may be assigned in concatenation with each other. In the proposal, there may be an advantage in that the latency may be reduced by removing an unnecessary delay.

In the proposal, it is proposed that 'specific symbol location' may more characteristically follow 'front-load DMRS location for PDSCH mapping type A configured to UE, and when it is considered that PDCCH transmission from the BS may be achieved in a symbol duration earlier than the front-load DMRS location for PDSCH mapping type A configured to the UE, there may be an advantage in that a collision between the PDCCH and PDSCH which is repeatedly transmitted may be avoided through the proposed method.

As a fourth method, when the BS intends to perform the mini-slot granularity repeated transmission, the BS may configure/indicate a time resource assignment candidate for performing the mini-slot granularity repeated transmission. The BS may configure/indicate, to the UE, a specific time resource assignment scheme among the time resource assignment candidates while configuring/indicating the mini-slot granularity repeated transmission to the UE. The 'mini-slot' may mean a scheduling structure having a granularity of 2, 4, 6, and 7 symbols which may be indicated by PDSCH mapping type B.

The time resource assignment may be indicated to the UE through the 'time domain resource assignment' field in the DCI. According to the current standard, one time domain resource in one slot may be indicated through the field value.

A method of enhancing a function of the 'time domain resource assignment' field in order to perform the mini-slot granularity repeated transmission may be considered as follows.

For example, in a case where the UE is configured/indicated with the mini-slot granularity repeated transmission and a case where the UE is not configured/indicated with the mini-slot granularity repeated transmission, an interpretation method of the field may be different.

Specifically, when the BS intends to perform the mini-slot granularity repeated transmission, the BS may configure/indicate a time resource assignment candidate corresponding to the field. For convenience of description, the candidate is referred to as a first candidate. Alternatively, when the relevant operation is not the mini-slot granularity repeated transmission, the BS may configure/indicate the time resource assignment candidate corresponding to the field. For convenience of description, the candidate is referred to as a second candidate.

When the UE is configured/indicated with the mini-slot granularity repeated transmission, the UE may expect that one of value of the first candidates will be indicated through the 'time domain resource assignment' field. On the contrary, when the operation is not the mini-slot granularity repeated transmission, the UE may expect that one value of the second candidates will be indicated. Additionally, time resource assignment candidates included in the first candidate may include time domain resource information for multiple transmission occasions. Further, the respective candidates may correspond to different transmission occasion numbers and a specific value is indicated to indicate a specific transmission occasion number.

In the proposed method, the BS may apply the method and/or embodiment of Proposal 1 described above in order to configure/indicate the mini-slot granularity repeated transmission to the UE. For example, the mini-slot granularity repeated transmission among multiple repeated transmission methods may be configured through the higher layer signaling, and whether the mini-slot granularity repeated transmission is actually performed may be indicated through the DCI. Accordingly, when it is indicated that the mini-slot granularity repeated transmission is actually performed through the DCI, one value of the first candidates may be indicated for the time resource assignment according to the proposed scheme, and when the mini-slot granularity repeated transmission is not indicated, one value of the second candidates may be indicated for the time resource assignment.

The example of the signaling may become one example for applying the proposed scheme, and it is apparent that other examples to which the proposed scheme is applied may also be included in the proposal, and a method to which a relevant proposed matter may be applied is not limited to the example.

Table 29 shows an example of first candidates which may be indicated through the 'time domain resource assignment' field when the mini-slot granularity repeated transmission is performed. Table 29 is just an example for helping to appreciate the present disclosure and does not limit the technical scope of the present disclosure.

TABLE 29

| Row index | PDSCH mapping type | K0 | S1 | L1 | S2 | L2 | S3 | L3 | S4 | L4 |
|---|---|---|---|---|---|---|---|---|---|---|
| 1 | Type B | 0 | 5 | 2 | 7 | 2 | | | | |
| 2 | Type B | 0 | 5 | 2 | 7 | 2 | 9 | 2 | 11 | 2 |
| 3 | Type B | 0 | 9 | 2 | 11 | 2 | | | | |
| 4 | Type B | 0 | 4 | 4 | 8 | 4 | | | | |
| 5 | Type B | 0 | 6 | 4 | 10 | 4 | | | | |
| 6 | Type B | 0 | 0 | 7 | 7 | 7 | | | | |
| 7 | Type B | 0 | 5 | 2 | 7 | 4 | 11 | 2 | | |
| 8 | Type B | 0 | 4 | 2 | 6 | 2 | 8 | 4 | 12 | 2 |
| 9 | Type B | 0 | 5 | 2 | 8 | 2 | | | | |
| 10 | Type B | 0 | 4 | 4 | 9 | 4 | | | | |
| 11 | Type B | 0 | 4 | 4 | 10 | 4 | | | | |

In Table 29, K0, Sx (x=1, 2, 3, 4), and Lx (x=1, 2, 3, 4) may mean a slot granularity distance from a slot receiving the DCI to a slot in which the PDSCH is actually scheduled, a start symbol location of a scheduling resource based on a start time point of the slot for an x-th transmission occasion, and the number of symbols continuously scheduled from Sx for the x-th transmission occasion, respectively.

The proposed scheme like the example of Table 29 has the following feature.

First, the number of different transmission occasions may be indicated. Referring to Table 29, row index 1/3/4/5 indicates a transmission occasion number corresponding to 2, row index 7 indicates a transmission occasion number corresponding to 3, and row index 2/8 indicates a transmission occasion number corresponding to 4.

Second, mini-slots having different symbol lengths may be assigned to different transmission occasions. Referring to Table 29, row index 7/8 may be indicated for a transmission occasion in which a mini-slot having a symbol length of 2 and a mini-slot having a symbol length of 4 are different.

Third, whether there is the gap symbol between different transmission occasions or/and a length of the gap symbol may be indicated. Referring to Table 29, when resource assignments of row indexes 1 and 9 are compared, the resource assignments are the same in that two transmission occasions are indicated, and the start symbol of the first transmission occasion is the same and two symbols are assigned to each transmission occasion, but different in that whether there is the gap symbol between the first transmission occasion and the second transmission occasion. That is, in row index 1, there is no gap symbol and in row index 9, there is the gap symbol. It may be confirmed that there is a difference for whether there is one gap symbol between different transmission occasions even in row indexes #4 and #10. Meanwhile, when row indexes 10 and 11 are compared, it may be confirmed that the length of the gap symbol may be indicated. It may be confirmed that in the case of row index 10, there is one gap symbol between different transmission occasions, while in the case of row index 11, there are two gap symbols.

In the proposal, the 'time domain resource assignment' field is assumed as the DCI field for indicating one value of the time resource assignment candidates, but it is apparent that a method of applying the proposal by using another field in the DCI is also possible. For example, a new DCI field may be introduced in order to perform the proposed scheme or the proposed method may be applied by differing interpretation of a specific field among the fields in the DCI defined in the current standard. For example, the proposed method may be applied by differing the antenna port(s) field defined in TS 38.212 or/and the MCS/RV/NDI field corresponding to each of TB 1/2.

Further, as in the method and/or embodiments of Proposal 3 described above, when the repeated transmission is performed in the time domain, a DMRS pattern for transmission occasions which are repeatedly transmitted may be determined as follows. A DMRS pattern for the first transmission occasion may be indicated through the DCI, and a DMRS pattern for the other transmission occasion may adopt a pattern which is the same as the DMRS pattern for the first transmission occasion indicated through the DCI.

FIG. 17 illustrates an example of application of a DMRS pattern to repeatedly transmitted transmission occasions.

<Proposal 4>

A TCI state field (i.e., a transmission configuration indication field) in the current DCI may indicate up to two TCI states through a specific codepoint. In this case, the eMBB operation is assumed. In other words, the specific codepoint configured through the TCI field in the DCI may correspond to multiple (e.g., two) TCI states, and the eMBB operation is defined in such a manner that up to two TCI states may be indicated by the specific codepoint. In this case, when the URLLC operation is considered, improvement for some operations may be considered. The reason is that it may be preferable to indicate more TCI states in the case of the URLLC operation.

For example, it may be considered that a diversity gain is increased by increasing the repeated transmission number in the URLLC operation and the reception SNR is enhanced. Accordingly, multiple TCI states need to be considered, and a limitation for up to two TCI states defined by assuming eMBB may be alleviated. In this case, codepoints mapped to the TCI state field for the eMBB operation and codepoints mapped to the TCI state field for the URLLC operation may be differently/separately configured.

For example, the codepoints mapped to the TCI state field for the eMBB operation may indicate up to two TCI states, while the codepoints mapped to the TCI state field for the URLLC operation may be configured to indicate up to four TCI states. In the example, the number of up to four TCI states is just an example for convenience of description, and does not limit the technical scope of the present disclosure, and four or more TCI states may also be indicated.

To this end, the BS may configure/indicate whether the relevant operation is the eMBB operation or the URLLC operation, and it may be determined which codepoints configuration the UE is to follow based on the configured operation. In the proposal, as the method of configuring/indicating the eMBB operation or the URLLC operation to the UE, the method of Proposal 1 described above may be applied. For example, a specific repeated transmission method (scheme) among multiple repeated transmission methods may be configured through the higher layer signaling, and whether the URLLC operation (repeated transmission) is to be performed or the eMBB operation is to be performed actually may be indicated through the DCI. Alternatively, one of the eMBB and URLLC operations may be configured directly through a specific higher layer parameter.

Alternatively, a specific operation of the eMBB operation and the URLLC operation may be indicated according to an RNTI value to succeed in decoding the PDCCH by mapping a specific RNTI value and a specific operation. For example, when CRC masking of the DCI received by the UE is performed by using the RNTI configured as a usage of the MTRP-URLLC, the UE may recognize that the URLLC operation is configured and when the CRC masking of the DCI is performed by using the RNTI configured as a usage of the MTRP-eMBB, the UE may recognize that the eMBB operation is configured.

The example of the signaling may become one example for applying the proposed scheme, and it is apparent that other examples to which the proposed scheme is applied may also be included in the proposal, and a method to which a relevant proposed matter may be applied is not limited to the example.

The TCI state corresponding to each codepoint of the TCI field may be pre-defined, and defined differently for each of the URLLC operation and the eMBB operation. For example, the BS configures the TCI field value to the UE separately for Tables 30 and 31, and uses Table 30 in the case of the eMBB operation and Table 31 in the case of the URLLC operation. In the example, the mapping relationship between the codepoint of the DCI and the TCI state is represented by the table, but a mapping rule of another form may also be configured.

The TCI field value may be configured by using the MAC CE in a pool of up to 64 TCI states which are RRC-configured, and MAC CE for configuring the TCI field value for eMBB and MAC CE for configuring the URLLC TCI field value may be defined and signaled divisively/separately. Furthermore, the TCI states pools for the eMBB and the URLLC may also be configured separately.

TABLE 30

| TCI field codepoint | TCI state |
|---|---|
| 000 | 0 |
| 001 | 1 |
| 010 | 2 |
| 011 | 0, 1 |
| 100 | 0, 2 |
| 101 | 1, 2 |
| 110 | 3 |
| 111 | 4 |

TABLE 31

| TCI field codepoint | TCI state |
|---|---|
| 000 | 0, 1 |
| 001 | 2, 5 |
| 010 | 4, 5, 6, 7 |
| 011 | 8, 9, 10, 11 |
| 100 | 0, 1, 2, 3 |
| 101 | 0, 2, 4, 6 |
| 110 | 1, 3, 5, 7 |
| 111 | 10, 20 |

FIG. 18 illustrates signaling when the UE receives a single DCI (i.e., when representative TRP transmits the DCI to the UE) in a situation of M-TRP (alternatively, M-cells, hereinafter, all TRPs may be replaced with the cells or even when multiple CORERSETs (/CORESET groups) are configured from one TRP, the corresponding TRP may be assumed as M-TRP). FIG. 18 is just one example for convenience of the description and does not limit the technical scope of the present disclosure.

In the following description, the network side is described based on "TRP", but as described above, "TRP" may be replaced with expressions including a panel, an antenna array, a cell (e.g., macro cell/small cell/pico cell), a transmission point (TP), a base station (gNB, etc.), etc., and applied. Further, as described above, the TRP may be distinguished according to information (e.g., an index or ID) on a CORESET group (or CORESET pool). As an example, when one UE is configured to perform transmission/reception with multiple TRPs (or cells), this may mean that multiple CORESET groups (or CORESET pools) are configured for one UE. The configuration for the CORESET group (or CORESET pool) may be performed through the higher layer signaling (e.g., RRC signaling).

Referring to FIG. 18, for convenience of the description, signaling between two TRPs and the UE is considered, but the corresponding signaling scheme may be extensively applied even to signaling between multiple TRPs and multiple UEs. In the following description, the network side may be one base station including a plurality of TRPs, and may be one cell including the plurality of TRPs. As an example, ideal/non-ideal backhaul may also be configured between TRP 1 and TRP 2 constituting the network side. Further, the following description is made based on multiple TRPs, but this may be extensively applied even to transmission through multiple panels in the same manner. In addition, in the present disclosure, an operation of the UE receiving a signal TRP1/TRP2 may be construed/described even as an operation of the UE receiving the signal from the network side (through/using TRP1/2) (or may be an operation), and an operation of the UE transmitting the signal to TRP1/TRP2 may be construed/described even as an operation of the UE transmitting the signal to the network side (through/using TRP1/TRP2) (or may be an operation), and reversely construed/described.

The UE may receive configuration information for multiple TRP based transmission and reception from the network side through/using TRP1 (and/or TRP2) (S1805). That is, the network side may transmit configuration information related to multiple TRP based transmission and reception to the UE through/using TRP1 (and/or TRP2) (S1805). The configuration information may include resource information related to a configuration (i.e., TRP configuration) of the network side, resource information (resource allocation) related to the multiple TRP based transmission and reception, etc. The configuration information may be delivered through higher layer signaling (e.g., RRC signaling, MAC- CE, etc.). Further, when the configuration information is previously defined or configured, the corresponding step may also be skipped.

For example, the configuration information may include CORESET related configuration information (e.g., ControlResourceSet IE) as described in the methods (e.g., Proposal 1/Proposal 2/Proposal 3/Proposal 4, etc.). The CORESET related configuration information may include ID (e.g., controlResourceSetID) related to the CORESET, an index (e.g., CORESETPoolIndex) of a CORESET pool for the CORESET, a time/frequency resource configuration of the CORESET, TCI information related to the CORESET, etc. The index (e.g., CORESETPoolIndex) of the CORESET pool may mean a specific index (e.g., CORESET group Index, HARQ Codebook index) mapped/configured to each CORESET.

For example, the configuration information may also include configurations related to PDCCH/PDSCH/PUCCH/PUSCH, etc., as described in the methods (e.g., Proposal 1/Proposal 2/Proposal 3/Proposal 4, etc.).

For example, the configuration information may include information representing which operation is to be performed among multiple URLLC operations according to the method and/or embodiment (e.g., Proposal 1/Proposal 2/Proposal 3/Proposal 4, etc.). As an example, the configuration information may include information for configuring one of the URLLC schemes (e.g., scheme 2a/2b/3/4).

For example, the configuration information may include configuration information for a TCI state configuration related to the operation of the method and/or embodiment (e.g., Proposal 1/Proposal 2/Proposal 3/Proposal 4, etc.)/configuration information related to specific repeated transmission related to the URLLC/information on a value(s) for the repeated transmission number of the transmission occasion and/or a candidate value(s)/the number of shifting symbols between different transmission occasions/information related to RV values, etc.

For example, the operation of the UE (reference numeral 100/200 in FIGS. 21 to 25) which receives the multiple TRP based transmission and reception related configuration information from the network side (reference numeral 100/200 in FIGS. 21 to 25) in step S1805 described above may be implemented by devices in FIGS. 21 to 25 to be described below. For example, referring to FIG. 22, one or more processors 102 may control one or more transceivers 106 and/or one or more memories 104 so as to receive the multiple TRP based transmission and reception related configuration information, and one or more transceivers 106 may receive configuration information and one or more transceivers 106 may receive the multiple TRP based transmission and reception related configuration information from the network side.

Likewise, the operation of the network side (reference numeral 100/200 in FIGS. 21 to 25) which transmits the multiple TRP based transmission and reception related configuration information to the UE (reference numeral 100/200 in FIGS. 21 to 25) in step S1805 described above may be implemented by the devices in FIGS. 21 to 25 to be described below. For example, referring to FIG. 22, one or more processors 102 may control one or more transceivers 106 and/or one or more memories 104 so as to transmit the multiple TRP based transmission and reception related configuration information, and one or more transceivers 106 may receive configuration information and one or more transceivers 106 may transmit the multiple TRP based transmission and reception related configuration information from the network side.

The UE may receive, from the network side, DCI and Data 1 scheduled by corresponding DCI through/using TRP 1 (S1810-1). Further, the UE may receive Data 2 from the network side through/using TRP 2 (S1810-2). That is, the network side may transmit, to the UE, DCI 1 and Data 1 scheduled by corresponding DCI through/using TRP 1 (S1810-1). Further, the network side may transmit Data 2 to the UE through/using TRP 2 (S1810-2). For example, DCI and Data (e.g., Data 1, Data 2) may be transferred through a control channel (e.g., PDCCH, etc.) and a data channel (e.g., PDSCH, etc.), respectively. Further, steps S1810- and S1810-2 may be simultaneously performed or any one may be performed earlier than the other one.

For example, the DCI may include a TCI field, an antenna port(s) field, a time domain resource assignment field, an MCS field, and an RV field.

For example, the DCI may include information representing whether the URLLC operation configured to the UE through the higher layer signaling is performed which operation is to be performed as described in the method and/or embodiment (e.g., Proposal 1/Proposal 2/Proposal 3/Proposal 4, etc.). In this case, a specific bit of a DMRS port indication field in the DCI may be used. For example, the DCI may include information representing a total repeated transmission number. In this case, the relevant repeated transmission number may be determined according to the number of TCI states indicated through the DCI. For example, the DCI may also include the number of shifting symbols between different transmission occasions/information related to RV values (e.g., the actual RV difference value/the difference value in the order/the actual RV value/the RV combination related indication information). For example, the DCI may include information representing a time domain resource of repeatedly transmitted data. As an example, the DCI may include information indicating the mini-slot granularity repeated transmission/information representing whether the mini-slot granularity repeated transmission is performed. For example, the interpretation of the TCI state field in the DCI may be determined according to whether the eMBB operation being configured or the URLLC operation being configured.

For example, the DCI may be configured to be used for scheduling for both Data 1 and Data 2, and may indicate that Data 1 and Data 2 are the same data having the same systematic bits, as described in the method and/or embodiment (e.g., Proposal 1/Proposal 2/Proposal 3/Proposal 4, etc.). In other words, Data 1 and Data 2 may correspond to the same TB.

For example, the operation of the UE (reference numeral 100/200 in FIGS. 21 to 25) which receives the DCI and/or Data 1 and/or Data 2 from the network side (reference numeral 100/200 in FIGS. 21 to 25) in step S1810-1/S1810-2 described above may be implemented by the devices in FIGS. 21 to 25 to be described below. For example, referring to FIG. 22, one or more processor 102 may control one or more transceivers 106 and/or one or more memories 104 to receive the DCI and/or Data 1 and/or Data 2, and one or more transceivers 106 may receive, from the network side, the DCI and/or Data 1 and/or Data 2.

Likewise, the operation of the network side (reference numeral 100/200 in FIGS. 21 to 25) which transmits the DCI and/or Data 1 and/or Data 2 to the UE (reference numeral 100/200 in FIGS. 21 to 25) in step S1810-1/S1810-2 described above may be implemented by the devices in FIGS. 21 to 25 to be described below. For example, referring to FIG. 22, one or more processor 102 may control one or more transceivers 106 and/or one or more memories 104 to transmit the DCI and/or Data 1 and/or Data 2, and one or more transceivers 106 may transmit, to the UE, the DCI and/or Data 1 and/or Data 2.

The UE may decode Data 1 and Data 2 received from TRP 1 and TRP 2 (S1815). For example, the UE may perform channel estimation and/or decoding for data based on the method (e.g., Proposal 1/Proposal 2/Proposal 3/Proposal 4, etc.).

For example, the UE may know that the BS transmits the same data according to a specific URLLC operation, and decode Data 1 and Data 2 by assuming that Data 1 and Data 2 are the same data and systematic bits are the same data, as described in the proposed method and/or embodiment (e.g., Proposal 1/Proposal 2/Proposal 3/Proposal 4, etc.). For example, the UE may decode Data 1 and Data 2 by considering a repeated transmission number indicated by the BS through the higher layer signaling/DCI. As an example, the UE may decode Data 1 and Data 2 by assuming that the BS repeatedly transmits the same data as large as the number of TCI states indicated through the DCI. For example, the UE may decode Data 1 and Data 2 (repeatedly transmitted in one slot) based on the number of shifting symbols between different transmission occasions/the information related to RV values (e.g., the actual RV difference value/the difference value in the order/the actual RV value/the RV combination related indication information). For example, the UE may decode Data 1 and Data 2 by assuming that the BS repeatedly transmits the same data in a time domain indicated through the DCI. For example, the UE may decode Data 1 and Data 2 by using the TCI state value which the BS indicates through the DCI.

For example, the operation of the UE (reference numeral 100/200 of FIGS. 21 to 25) which decodes Data 1 and Data 2 in step S1815 described above may be implemented by the devices of FIGS. 21 to 25 to be described below. For example, referring to FIG. 22, one or more processor 102 may control one or more memories 104 to perform the operation of decoding Data 1 and Data 2.

The UE may transmit HARQ-ACK information (e.g., ACK information, NACK information, etc.) for the DCI and/or Data 1 and/or Data 2 above to the network side through/using TRP 1 and/or TRP 2 through one or more PUCCH(s) based on the proposed method (e.g., Proposal 1/Proposal 2/Proposal 3/Proposal 4, etc.) (S1820-1 and S1820-2). That is, the network side may receive, from the UE, HARQ-ACK information (e.g., ACK information, NACK information, etc.) for the DCI and/or Data 1 and/or Data 2 above through/using TRP 1 and/or TRP 2 through one or more PUCCH(s) based on the proposed method (e.g., Proposal 1/Proposal 2/Proposal 3/Proposal 4, etc.) (S1820-1 and S1820-2).

For example, the HARQ-ACK information for Data 1 and/or Data 2 may be combined into one or separated. Further, the UE may be configured to transmit only HARQ-ACK information to representative TRP (e.g., TRP 1), and transmission of the HARQ-ACK information to the other TRP (e.g., TRP 2) may also be omitted. For example, the HARQ-ACK information may be transmitted through the PUCCH and/or the PUSCH.

For example, the operation of the UE (reference numeral 100/200 in FIGS. 21 to 21) which transmits the HARQ-ACK information for Data 1 and/or Data 2 to the network side (reference numeral 100/200 in FIGS. 21 to 25) through one or more PUCCHs in step S1820-1/S1820-2 described above may be implemented by the devices in FIGS. 21 to 25 to be described below. For example, referring to FIG. 22, one or more processors 102 may control one or more transceivers 106 and/or one or more memories 104 to transmit the HARQ-ACK information for Data 1 and/or Data 2 through one or more PUCCHs, and one or more transceivers 106 may transmit, to the network side, the HARQ-ACK information for Data 1 and/or Data 2.

Likewise, the operation of the network side (reference numeral 100/200 in FIGS. 21 to 25) which receives the HARQ-ACK information for Data 1 and/or Data 2 from the UE (reference numeral 100/200 in FIGS. 21 to 25) through one or more PUCCHs in step S1820-1/S1820-2 described above may be implemented by the devices in FIGS. 21 to 25 to be described below. For example, referring to FIG. 22, one or more processors 102 may control one or more transceivers 106 and/or one or more memories 104 to receive the HARQ-ACK information for Data 1 and/or Data 2, and one or more transceivers 106 may receive, from the UE, the HARQ-ACK information for Data 1 and/or Data 2.

In FIG. 18 described above, the methods are described based on a single DCI based M-TRP operation is primarily described, but in some cases, the methods may be applied even to a multi-DCI based M-TRP operation.

FIG. 19 illustrates an example of an operation flowchart of downlink data reception of a UE to which methods (e.g., Proposal 1/Proposal 2/Proposal 3/Proposal 4, etc.) proposed in the present disclosure may be applied. The UE may be supported by a plurality of TRPs, and ideal/non-ideal backhaul may be configured among the plurality of TRPs. FIG. 19 is just for convenience of the description and does not limit the scope of the present disclosure. Further, some step(s) illustrated in FIG. 19 may be omitted according to a situation and/or a configuration.

In the following description, the network side is described based on "TRP", but as described above, "TRP" may be replaced with expressions including a panel, an antenna array, a cell (e.g., macro cell/small cell/pico cell), a transmission point (TP), a base station (gNB, etc.), etc., and applied. Further, as described above, the TRP may be distinguished according to information (e.g., an index or ID) on a CORESET group (or CORESET pool). As an example, when one UE is configured to perform transmission/reception with multiple TRPs (or cells), this may mean that multiple CORESET groups (or CORESET pools) are configured for one UE. The configuration for the CORESET group (or CORESET pool) may be performed through the higher layer signaling (e.g., RRC signaling).

The UE may receive configuration information (S1910). The configuration information may be received through a higher layer signaling (e.g., RRC or MAC-CE). The configuration information may include information related to a method and/or embodiments described in the methods (e.g., Proposal 1/Proposal 2/Proposal 3/Proposal 4, etc.).

For example, the configuration information may include CORESET related configuration information (e.g., ControlResourceSet IE). The CORESET related configuration information may include ID (e.g., controlResourceSetID) related to the CORESET, an index (e.g., CORESETPoolIndex) of a CORESET pool for the CORESET, a time/frequency resource configuration of the CORESET, TCI information related to the CORESET, etc.

For example, the configuration information may include a downlink channel related configuration (e.g., PDCCH-Config, PDSCH-Config). The downlink channel related configuration may include DMRS maxLength, a configuration type, a mapping type, etc.

For example, the configuration information may include information on a transmission scheme of downlink data. Based on the information on the downlink data transmission scheme, an eMBB operation or a URLLC operation may be configured or one of multiple schemes (e.g., an SDM scheme, a TDM scheme, or an FDM scheme) related to the URLLC operation may be indicted/configured. As an example, the configuration information may include a higher layer parameter (e.g., RepSchemeEnabler) for indicating one of the schemes for the URLLC operation, and whether the relevant scheme is an FDM based scheme (e.g., scheme 2a/2b) or a TDM based scheme (scheme 3/4) may be configured by using the higher layer parameter.

For example, the configuration information may include information related to the number of transmission occasions. As an example, the configuration information may include a parameter (e.g., repetitionnumber) for configuring a repeated transmission number of the transmission occasions, and a specific repetition number (e.g., 2, 3, 4, 5, 6, 7, 8, or 16) may be indicated by the parameter. As another example, candidate values of the number of plurality of transmission occasions may be indicated based on the configuration information.

For example, the configuration information may include information on the number of shifting symbols between transmission occasions. The shifting symbol may be replaced with an expression such as a gap symbol or a symbol offset. As an example, the shifting symbol may mean a gap between a last symbol of a first transmission occasion and a first symbol of a second transmission occasion.

For example, an operation of the UE (reference numeral 100/200 in FIGS. 21 to 25) which receives the configuration information in step S1910 described above may be implemented by devices of FIGS. 21 to 25 to be described below. For example, referring to FIG. 22, one or more processors 102 may control one or more transceivers 106 and/or one or more memories 104 so as to transmit the configuration information and one or more transceivers 106 may receive the configuration information.

The UE may receive downlink control information (DCI) S1920. The DCI may be transmitted through a downlink control channel (for example, PDCCH).

As described in the methods above (for example, Proposal 1/Proposal 2/Proposal 3/Proposal 4), the DCI may include at least one of a DMRS port-related field (for example, antenna port(s) field), a transport block-related field (for example, MCS/New data indicator/RV field), a transmission configuration indication (TCI) field, a time domain resource assignment field, or a redundancy version (RV) field.

For example, a plurality of TCI states may be indicated based on the TCI field included in the DCI. When a plurality of TCI states are indicated, the UE may know that it is an M-TRP operation. For example, two or more TCI states may be indicated concerning the URLLC M-TRP operation.

For example, a first time domain resource of the first transmission occasion may be indicated based on a time domain resource assignment field included in the DCI. The size of the second time domain resource of the second transmission occasion may be the same as the size of the first time domain resource. In other words, even if DCI does not separately indicate the time domain resource of the second transmission occasion, the time domain resource information of the second transmission occasion may be inferred from the time domain resource configuration of the first transmission occasion. For example, the number of symbols for the first transmission occasion may be the same as that for the second transmission occasion.

For example, the operation of receiving DCI by the UE (100/200 of FIGS. 21 to 25) in the S1920 step may be implemented by the devices of FIGS. 21 to 25 to be described later. For example, referring to FIG. 22, one or more processors 102 may control one or more transceivers 106 and/or one or more memories 104 to receive the DCI. And one or more transceivers 106 may receive the DCI.

The UE may receive a plurality of transmission occasions S1930. The plurality of transmission occasions may be received based on the DCI. For example, the operation of receiving a transmission occasion may be interpreted/understood as an operation of receiving data or an operation of receiving a data channel (for example, PDSCH).

For example, as described in the methods above (for example, Proposal 1/Proposal 2/Proposal 3/Proposal 4), the plurality of transmission occasions may be configured by repeatedly transmitting/receiving the same transmission occasion. In other words, the plurality of transmission occasions may correspond to the same transport block.

For example, the number of the plurality of transmission occasions may be determined based on the number of TCI states indicated through the TCI field of DCI. As described above, since the plurality of transmission occasions may be configured by repeatedly transmitting a transmission occasion corresponding to the same transport block, the number of the plurality of transmission occasions may mean the number of times a transmission occasion is repeatedly transmitted. For example, when a plurality of TCI states are indicated through the TCI field of the DCI (for example, 2 TCI states), the number of transmitted/received transmission occasions may also be the same as the number of the plurality of TCI states (for example, 2 transmission occasions).

As a specific example, when a first TCI state and a second TCI state are indicated through the TCI field of DCI, the UE may receive two transmission occasions, namely, a first transmission occasion and a second transmission occasion. In this case, the first TCI state may correspond to the first transmission occasion, and the second TCI state may correspond to the second transmission occasion. Also, the RV value of the first transmission occasion may be set differently from the RV value of the second transmission occasion based on the RV field of the DCI.

As another example, the number of a plurality of transmission occasions may be determined based on the configuration information and the DCI. For example, candidate values for the number of a plurality of transmission occasions may be indicated based on the configuration information, and one of the candidate values may be indicated/configured based on the DCI.

For example, the plurality of transmission occasions (for example, a first transmission occasion and a second transmission occasion) may be received in a time domain resource based on time division multiplexing (TDM). In other words, the plurality of transmission occasions may be repeatedly received/transmitted in non-overlapping time domain resources based on TDM.

For example, each transmission occasion may consist of 2, 4, or 7 OFDM symbols. This configuration may correspond to the mini-slot structure of the PDSCH mapping type B described in the proposed methods (for example, Proposal 1/Proposal 2/Proposal 3/Proposal 4). The plurality of transmission occasions (for example, the first and second transmission occasions) may be TDMed and received in one slot. Alternatively, each transmission occasion may be received by being TDMed in units of slots.

For example, a plurality of transmission occasions may be received on a time domain resource determined based on the DCI. In one example, the first transmission occasion may be received on a first time domain resource, and the second transmission occasion may be received on a second time domain resource. The first time domain resource and the second time domain resource may be located adjacent to each other. Alternatively, the second time domain resource may be located apart from the first time domain resource by a specific number of symbols. The specific number of symbols may be expressed by being replaced with a gap symbol/shifting symbol/symbol offset. The specific number of symbols may be received through higher layer signaling.

For example, the number of transmission layers may be limited to be smaller than or equal to a specific number of layers (for example, two layers) for each transmission occasion.

For example, the operation of receiving a plurality of transmission occasions by the UE (100/200 of FIGS. 21 to 25) in the S1930 step described above may be implemented by the devices of FIGS. 21 to 25 to be described later. For example, referring to FIG. 22, one or more processors 102 may control one or more transceivers 106 and/or one or more memories 104 to receive the plurality of transmission occasions. And one or more transceivers 106 may receive the plurality of transmission occasions.

FIG. 20 illustrates an example of an operation flowchart of a base station (BS) performing data transmission and reception to which the methods (e.g., Proposal 1/Proposal 2/Proposal 3/Proposal 4, etc.) may be applied. FIG. 20 is just for convenience of the description and does not limit the scope of the present disclosure. Further, some step(s) illustrated in FIG. 20 may be omitted according to a situation and/or a configuration.

The BS may be a mean collecting naming an object performing transmission and reception of data with the UE. For example, the base station may be a concept including one or more transmission points (TPs), one or more transmission and reception points (TRPs), and the like. Further, the TP and/or the TRP may include a panel, transmission and reception units, and the like of the BS. Further, as described above, the TRP may be distinguished according to information (e.g., an index or ID) on a CORESET group (or CORESET pool). As an example, when one UE is configured to perform transmission/reception with multiple TRPs (or cells), this may mean that multiple CORESET groups (or CORESET pools) are configured for one UE. The configuration for the CORESET group (or CORESET pool) may be performed through the higher layer signaling (e.g., RRC signaling).

The BS may transmit, to the UE, configuration information (S2010). The configuration information may be transmitted through a higher layer signaling (e.g., RRC or MAC-CE). The configuration information may include information related to a method and/or embodiments described in the methods (e.g., Proposal 1/Proposal 2/Proposal 3/Proposal 4, etc.).

For example, the configuration information may include CORESET related configuration information (e.g., ControlResourceSet IE). The CORESET related configuration information may include ID (e.g., controlResourceSetID) related to the CORESET, an index (e.g., CORESETPoolIndex) of a CORESET pool for the CORESET, a time/frequency resource configuration of the CORESET, TCI information related to the CORESET, etc.

For example, the configuration information may include a downlink channel related configuration (e.g., PDCCH-Config, PDSCH-Config). The downlink channel related configuration may include DMRS maxLength, a configuration type, a mapping type, etc.

For example, the configuration information may include information on a transmission scheme of downlink data. Based on the information on the downlink data transmission scheme, an eMBB operation or a URLLC operation may be configured or one of multiple schemes (e.g., an SDM scheme, a TDM scheme, or an FDM scheme) related to the URLLC operation may be indicted/configured. As an example, the configuration information may include a higher layer parameter (e.g., RepSchemeEnabler) for indicating one of the schemes for the URLLC operation, and whether the relevant scheme is an FDM based scheme (e.g., scheme 2a/2b) or a TDM based scheme (scheme 3/4) may be configured by using the higher layer parameter.

For example, the configuration information may include information related to the number of transmission occasions. As an example, the configuration information may include a parameter (e.g., repetitionnumber) for configuring a repeated transmission number of the transmission occasions, and a specific repetition number (e.g., 2, 3, 4, 5, 6, 7, 8, or 16) may be indicated by the parameter. As another example, candidate values of the number of plurality of transmission occasions may be indicated based on the configuration information.

For example, the configuration information may include information on the number of shifting symbols between transmission occasions. The shifting symbol may be replaced with an expression such as a gap symbol or a symbol offset. As an example, the shifting symbol may mean a gap between a last symbol of a first transmission occasion and a first symbol of a second transmission occasion.

For example, an operation of the base station (reference numeral 100 and/or 200 of FIGS. 21 to 25) which transmits the configuration information in step S2010 described above may be implemented by devices of FIGS. 21 to 25 to be described below. For example, referring to FIG. 22, one or more processors 102 may control one or more transceivers 106 and/or one or more memories 104 so as to transmit the configuration information and one or more transceivers 106 may transmit the configuration information.

The BS may transmit downlink control information (DCI) to the UE S2020. The DCI may be transmitted through a downlink control channel (for example, PDCCH).

As described in the methods above (for example, Proposal 1/Proposal 2/Proposal 3/Proposal 4), the DCI may include at least one of a DMRS port-related field (for example, antenna port(s) field), a transport block-related field (for example, MCS/New data indicator/RV field), a transmission configuration indication (TCI) field, a time domain resource assignment field, or a redundancy version (RV) field.

For example, a plurality of TCI states may be indicated based on the TCI field included in the DCI. When a plurality of TCI states are indicated, the UE may know that it is an M-TRP operation. For example, two or more TCI states may be indicated concerning the URLLC M-TRP operation.

For example, a first time domain resource of the first transmission occasion may be indicated based on a time domain resource assignment field included in the DCI. The size of the second time domain resource of the second transmission occasion may be the same as the size of the first time domain resource. In other words, even if DCI does not separately indicate the time domain resource of the second transmission occasion, the time domain resource information of the second transmission occasion may be inferred from the time domain resource configuration of the first transmission occasion.

For example, the operation of transmitting DCI by the BS (100/200 of FIGS. 21 to 25) in the S2020 step may be implemented by the devices of FIGS. 21 to 25 to be described later. For example, referring to FIG. 22, one or more processors 102 may control one or more transceivers 106 and/or one or more memories 104 to transmit the DCI. And one or more transceivers 106 may transmit the DCI.

The BS may transmit a plurality of transmission occasions to the UE S2030. The plurality of transmission occasions may be transmitted based on the DCI.

For example, as described in the methods above (for example, Proposal 1/Proposal 2/Proposal 3/Proposal 4), the plurality of transmission occasions may be configured by repeatedly transmitting/receiving the same transmission occasion. In other words, the plurality of transmission occasions may correspond to the same transport block.

For example, the number of the plurality of transmission occasions may be determined based on the number of TCI states indicated through the TCI field of DCI. As described above, since the plurality of transmission occasions may be configured by repeatedly transmitting a transmission occasion corresponding to the same transport block, the number of the plurality of transmission occasions may mean the number of times a transmission occasion is repeatedly transmitted. For example, when a plurality of TCI states are indicated through the TCI field of the DCI (for example, 2 TCI states), the number of transmitted/received transmission occasions may also be the same as the number of the plurality of TCI states (for example, 2 transmission occasions).

As a specific example, when a first TCI state and a second TCI state are indicated through the TCI field of DCI, the UE may receive two transmission occasions, namely, a first transmission occasion and a second transmission occasion. In this case, the first TCI state may correspond to the first transmission occasion, and the second TCI state may correspond to the second transmission occasion. Also, the RV value of the first transmission occasion may be set differently from the RV value of the second transmission occasion based on the RV field of the DCI.

As another example, the number of a plurality of transmission occasions may be determined based on the configuration information and the DCI. For example, candidate values for the number of a plurality of transmission occasions may be indicated based on the configuration information, and one of the candidate values may be indicated/configured based on the DCI.

For example, the plurality of transmission occasions (for example, a first transmission occasion and a second transmission occasion) may be received in a time domain resource based on time division multiplexing (TDM). In other words, the plurality of transmission occasions may be repeatedly received/transmitted in non-overlapping time domain resources based on TDM.

For example, each transmission occasion may consist of 2, 4, or 7 OFDM symbols. This configuration may correspond to the mini-slot structure of the PDSCH mapping type B described in the proposed methods (for example, Proposal 1/Proposal 2/Proposal 3/Proposal 4). The plurality of transmission occasions (for example, the first and second transmission occasions) may be TDMed and received in one slot. Alternatively, each transmission occasion may be received by being TDMed in units of slots.

For example, a plurality of transmission occasions may be received on a time domain resource determined based on the DCI. In one example, the first transmission occasion may be received on a first time domain resource, and the second transmission occasion may be received on a second time domain resource. The first time domain resource and the second time domain resource may be located adjacent to each other. Alternatively, the second time domain resource may be located apart from the first time domain resource by a specific number of symbols. The specific number of symbols may be expressed by being replaced with a gap symbol/shifting symbol/symbol offset. The specific number of symbols may be received through higher layer signaling.

For example, the operation of transmitting a plurality of transmission occasions by the BS (100/200 of FIGS. 21 to 25) in the S2030 step described above may be implemented by the devices of FIGS. 21 to 25 to be described later. For example, referring to FIG. 22, one or more processors 102 may control one or more transceivers 106 and/or one or more memories 104 to transmit the plurality of transmission occasions. And one or more transceivers 106 may transmit the plurality of transmission occasions.

As mentioned above, the network side/UE signaling and operation (e.g., Proposal 1/2/3/4, FIG. 18/19/20, etc.) may be implemented by devices (e.g., FIGS. 21 to 25) to be described below. For example, the network side (e.g., TRP 1/TRP 2) may correspond to a first wireless device and the UE may correspond to a second wireless device and in some cases, an opposite case thereto may also be considered. For example, the first device (e.g., TRP 1)/the second device (e.g., TRP 2) may correspond to the first wireless device and the UE may correspond to the second wireless device and in some cases, an opposite case thereto may also be considered.

For example, the network side/UE signaling/operation (e.g., Proposal 1/2/3/4/FIG. 18/19/20, etc.) may be processed by one or more processors (e.g., 102 and 202) in FIGS. 21 to 25 and the network side/UE signaling and operation (e.g., Proposal 1/2/3/4/FIG. 18/19/20, etc.) may be stored in one or more (e.g., 104 and 204) of FIG. 21) in the form of a command/program (e.g., instruction and executable code) for driving at least one processor (e.g., 102 and 202) in FIGS. 21 to 25.

For example, in an apparatus comprising one or more memories and one or more processors operatively coupled to the one or more memories, the one or more processors control the apparatus to receive configuration information; receive downlink control information (DCI), wherein the DCI includes a transmission configuration indication (TCI) field, and a plurality of TCI states are indicated based on the TCI field; and receive a plurality of transmission occasions of an identical transport block based on the DCI, wherein the plurality of transmission occasions are received in a time domain resource based on time division multiplexing (TDM), and the number of the plurality of transmission occasions is determined based on a number of the plurality of TCI states.

For example, in one or more non-transitory computer-readable media storing one or more instructions, the one or more instructions executable by one or more processors comprise an instruction instructing a user equipment (UE) to receive configuration information; receive downlink control information (DCI), wherein the DCI includes a transmission configuration indication (TCI) field, and a plurality of TCI states are indicated based on the TCI field; and receive a plurality of transmission occasions of an identical transport block based on the DCI, wherein the plurality of transmission occasions are received in a time domain resource based on time division multiplexing (TDM), and the number of the plurality of transmission occasions is determined based on a number of the plurality of TCI states.

Example of Communication System to which Present Disclosure is Applied

Although not limited thereto, but various descriptions, functions, procedures, proposals, methods, and/or operation flowcharts of the present disclosure, which are disclosed in this document may be applied to various fields requiring wireless communications/connections (e.g., 5G) between devices.

Hereinafter, the communication system will be described in more detail with reference to drawings. In the following drawings/descriptions, the same reference numerals will refer to the same or corresponding hardware blocks, software blocks, or functional blocks if not differently described.

FIG. 21 illustrates a communication system applied to the present disclosure.

Referring to FIG. 21, a communication system 1 applied to the present disclosure includes a wireless device, a BS, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 100a, vehicles 100b-1 and 100b-2, an extended Reality (XR) device 100c, a hand-held device 100d, a home appliance 100e, an Internet of Thing (IT) device 100f, and an AI device/server 400. For example, the vehicle may include a vehicle with a wireless communication function, an autonomous driving vehicle, a vehicle capable of performing inter-vehicle communication, and the like. Here, the vehicle may include an Unmanned Aerial Vehicle (UAV) (e.g., drone). The XR device may include an Augmented Reality (AR)/Virtual Reality (VR)/Mixed Reality (MR) device and may be implemented as a form such as a head-mounted device (HMD), a head-up display (HUD) provided in the vehicle, a television, a smart phone, a computer, a wearable device, a home appliance device, digital signage, a vehicle, a robot, etc. The hand-held device may include the smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the BS and the network may be implemented even the wireless device and a specific wireless device 200a may operate an eNB/network node for another wireless device.

The wireless devices 100a to 100f may be connected to a network 300 through a BS 200. An artificial intelligence (AI) technology may be applied to the wireless devices 100a to 100f and the wireless devices 100a to 100f may be connected to an AI server 400 through the network 300. The network 300 may be configured by using a 3G network, a 4G (e.g., LTE) network, or a 5G (e.g., NR) network. The wireless devices 100a to 100f may communicate with each other through the BS 200/network 300, but may directly communicate with each other without going through the BS/network (sidelink communication). For example, the vehicles 100b-1 and 100b-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 100a to 100f.

Wireless communications/connections 150a, 150b, and 150c may be made between the wireless devices 100a to 100f and the BS 200 and between the BS 200 and the BS 200. Here, the wireless communication/connection may be made through various wireless access technologies (e.g., 5G NR) such as uplink/downlink communication 150a, sidelink communication 150b (or D2D communication), and inter-BS communication 150c (e.g., relay, Integrated Access Backhaul (IAB). The wireless device and the BS/the wireless device and the BS and the BS may transmit/receive radio signals to/from each other through wireless communications/connections 150a, 150b, and 150c. For example, the wireless communications/connections 150a, 150b, and 150c may transmit/receive signals through various physical channels. To this end, based on various proposals of the present disclosure, at least some of various configuration information setting processes, various signal processing processes (e.g., channel encoding/decoding, modulation/demodulation, resource mapping/demapping, etc.), a resource allocation process, and the like for transmission/reception of the radio signal may be performed.

Example of Wireless Device to which Present Disclosure is Applied

FIG. 22 illustrates a wireless device which may be applied to the present disclosure.

Referring to FIG. 22, a first wireless device 100 and a second wireless device 200 may transmit/receive radio signals through various wireless access technologies (e.g., LTE and NR). Here, the first wireless device 100 and the second wireless device 200 may correspond to a wireless device 100x and a BS 200 and/or a wireless device 100x and a wireless device 100x of FIG. 21.

The first wireless device 100 may include one or more processors 102 and one or more memories 104 and additionally further include one or more transceivers 106 and/or one or more antennas 108. The processor 102 may control the memory 104 and/or the transceiver 106 and may be configured to implement descriptions, functions, procedures, proposals, methods, and/or operation flows disclosed in the present disclosure. For example, the processor 102 may process information in the memory 104 and generate a first information/signal and then transmit a radio signal including the first information/signal through the transceiver 106. Further, the processor 102 may receive a radio signal including a second information/signal through the transceiver 106 and then store in the memory 104 information obtained from signal processing of the second information/signal. The memory 104 may connected to the processor 102 and store various information related to an operation of the processor 102. For example, the memory 104 may store a software code including instructions for performing some or all of processes controlled by the processor 102 or performing the descriptions, functions, procedures, proposals, methods, and/or operation flowcharts disclosed in the present disclosure. Here, the processor 102 and the memory 104 may be a part of a communication modem/circuit/chip designated to implement the wireless communication technology (e.g., LTE and NR). The transceiver 106 may be connected to the processor 102 and may transmit and/or receive the radio signals through one or more antennas 108. The transceiver 106 may include a transmitter and/or a receiver. The transceiver 106 may be used mixedly with a radio frequency (RF) unit. In the present disclosure, the wireless device may mean the communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement descriptions, functions, procedures, proposals, methods, and/or operation flows disclosed in the present disclosure. For example, the processor 202 may process information in the memory 204 and generate a third information/signal and then transmit a radio signal including the third information/signal through the transceiver 206. Further, the processor 202 may receive a radio signal including a fourth information/signal through the transceiver 206 and then store in the memory 204 information obtained from signal processing of the fourth information/signal. The memory 204 may connected to the processor 202 and store various information related to an operation of the processor 202. For example, the memory 204 may store a software code including instructions for performing some or all of processes controlled by the processor 202 or performing the descriptions, functions, procedures, proposals, methods, and/or operation flowcharts disclosed in the present disclosure. Here, the processor 202 and the memory 204 may be a part of a communication modem/circuit/chip designated to implement the wireless communication technology (e.g., LTE and NR). The transceiver 206 may be connected to the processor 202 and may transmit and/or receive the radio signals through one or more antennas 208. The transceiver 206 may include a transmitter and/or a receiver and the transceiver 206 may be mixed with the RF unit. In the present disclosure, the wireless device may mean the communication modem/circuit/chip.

Hereinafter, hardware elements of the wireless devices 100 and 200 will be described in more detail. Although not limited thereto, one or more protocol layers may be implemented by one or more processors 102 and 202. For example, one or more processors 102 and 202 may implement one or more layers (e.g., functional layers such as PHY, MAC, RLC, PDCP, RRC, and SDAP). One or more processors 102 and 202 may generate one or more protocol data units (PDUs) and/or one or more service data units (SDUs) according to the descriptions, functions, procedures, proposals, methods, and/or operation flowcharts disclosed in the present disclosure. One or more processors 102 and 202 may generate a message, control information, data, or information according to the descriptions, functions, procedures, proposals, methods, and/or operation flowcharts disclosed in the present disclosure. One or more processors 102 and 202 may generate a signal (e.g., a baseband signal) including the PDU, the SDU, the message, the control information, the data, or the information according to the function, the procedure, the proposal, and/or the method disclosed in the present disclosure and provide the generated signal to one or more transceivers 106 and 206. One or more processors 102 and 202 may receive the signal (e.g., baseband signal) from one or more transceivers 106 and 206 and acquire the PDU, the SDU, the message, the control information, the data, or the information according to the descriptions, functions, procedures, proposals, methods, and/or operation flowcharts disclosed in the present disclosure.

One or more processors 102 and 202 may be referred to as a controller, a microcontroller, a microprocessor, or a microcomputer. One or more processors 102 and 202 may be implemented by hardware, firmware, software, or a combination thereof. As one example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 102 and 202. The descriptions, functions, procedures, proposals, and/or operation flowcharts disclosed in the present disclosure may be implemented by using firmware or software and the firmware or software may be implemented to include modules, procedures, functions, and the like. Firmware or software configured to perform the descriptions, functions, procedures, proposals, and/or operation flowcharts disclosed in the present disclosure may be included in one or more processors 102 and 202 or stored in one or more memories 104 and 204 and driven by one or more processors 102 and 202. The descriptions, functions, procedures, proposals, and/or operation flowcharts disclosed in the present disclosure may be implemented by using firmware or software in the form of a code, the instruction and/or a set form of the instruction.

One or more memories 104 and 204 may be connected to one or more processors 102 and 202 and may store various types of data, signals, messages, information, programs, codes, instructions, and/or commands. One or more memories 104 and 204 may be configured by a ROM, a RAM, an EPROM, a flash memory, a hard drive, a register, a cache memory, a computer reading storage medium, and/or a combination thereof. One or more memories 104 and 204 may be positioned inside and/or outside one or more processors 102 and 202. Further, one or more memories 104 and 204 may be connected to one or more processors 102 and 202 through various technologies such as wired or wireless connection.

One or more transceivers 106 and 206 may transmit to one or more other devices user data, control information, a wireless signal/channel, etc., mentioned in the methods and/or operation flowcharts of the present disclosure. One or more transceivers 106 and 206 may receive from one or more other devices user data, control information, a wireless signal/channel, etc., mentioned in the descriptions, functions, procedures, proposals, methods, and/or operation flowcharts disclosed in the present disclosure. For example, one or more transceivers 106 and 206 may be connected to one or more processors 102 and 202 and transmit and receive the radio signals. For example, one or more processors 102 and 202 may control one or more transceivers 106 and 206 to transmit the user data, the control information, or the radio signal to one or more other devices. Further, one or more processors 102 and 202 may control one or more transceivers 106 and 206 to receive the user data, the control information, or the radio signal from one or more other devices. Further, one or more transceivers 106 and 206 may be connected to one or more antennas 108 and 208 and one or more transceivers 106 and 206 may be configured to transmit and receive the user data, control information, wireless signal/channel, etc., mentioned in the descriptions, functions, procedures, proposals, methods, and/or operation flowcharts disclosed in the present disclosure through one or more antennas 108 and 208. In the present disclosure one or more antennas may be a plurality of physical antennas or a plurality of logical antennas (e.g., antenna ports). One or more transceivers 106 and 206 may convert the received radio signal/channel from an RF band signal to a baseband signal in order to process the received user data, control information, radio signal/channel, etc., by using one or more processors 102 and 202. One or more transceivers 106 and 206 may convert the user data, control information, radio signal/channel, etc., processed by using one or more processors 102 and 202, from the baseband signal into the RF band signal. To this end, one or more transceivers 106 and 206 may include an (analog) oscillator and/or filter.

Example of Signal Processing Circuit to which Present Disclosure is Applied

FIG. 23 illustrates a signal processing circuit for a transmit signal.

Referring to FIG. 23 a signal processing circuit 1000 may include a scrambler 1010, a modulator 1020, a layer mapper 1030, a precoder 1040, a resource mapper 1050, and a signal generator 1060. Although not limited thereto, an operation/function of FIG. 23 may be performed by the processors 102 and 202 and/or the transceivers 106 and 206 of FIG. 22. Hardware elements of FIG. 23 may be implemented in the processors 102 and 202 and/or the transceivers 106 and 206 of FIG. 22. For example, blocks 1010 to 1060 may be implemented in the processors 102 and 202 of FIG. 22. Further, blocks 1010 to 1050 may be implemented in the processors 102 and 202 of FIG. 22 and the block 1060 may be implemented in the transceivers 106 and 206 of FIG. 22.

A codeword may be transformed into a radio signal via the signal processing circuit 1000 of FIG. 23. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-Binary Phase Shift Keying (pi/2-BPSK), m-Phase Shift Keying (m-PSK), m-Quadrature Amplitude Modulation (m-QAM), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) insertor, a Digital-to-Analog Converter (DAC), a frequency uplink converter, and the like.

A signal processing process for a receive signal in the wireless device may be configured in the reverse of the signal processing process (1010 to 1060) of FIG. 23. For example, the wireless device (e.g., 100 or 200 of FIG. 22) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource de-mapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Utilization Example of Wireless Device to which Present Disclosure is Applied

FIG. 24 illustrates another example of a wireless device applied to the present disclosure. The wireless device may be implemented as various types according to a use example/service (see FIG. 21).

Referring to FIG. 24, wireless devices 100 and 200 may correspond to the wireless devices 100 and 200 of FIG. 22 and may be constituted by various elements, components, units, and/or modules. For example, the wireless devices 100 and 200 may include a communication unit 110, a control unit 120, and a memory unit 130, and an additional element 140. The communication unit may include a communication circuit 112 and a transceiver(s) 114. For example, the communication circuit 112 may include one or more processors 102 and 202 and/or one or more memories 104 and 204 of FIG. 22. For example, the transceiver(s) 114 may include one or more transceivers 106 and 206 and/or one or more antennas 108 and 208 of FIG. 22. The control unit 120 is electrically connected to the communication unit 110, the memory unit 130, and the additional element 140 and controls an overall operation of the wireless device. For example, the control unit 120 may an electrical/mechanical operation of the wireless device based on a program/code/instruction/information stored in the memory unit 130. Further, the control unit 120 may transmit the information stored in the memory unit 130 to the outside (e.g., other communication devices) through the communication unit 110 via a wireless/wired interface or store information received from the outside (e.g., other communication devices) through the wireless/wired interface through the communication unit 110.

The additional element 140 may be variously configured according to the type of wireless device. For example, the additional element 140 may include at least one of a power unit/battery, an input/output (I/O) unit, a driving unit, and a computing unit. Although not limited thereto, the wireless device may be implemented as a form such as the robot 100*a* of FIG. 21, the vehicles 100*b*-1 and 100*b*-2 of FIG. 21, the XR device 100*c* of FIG. 21, the portable device 100*d* of FIG. 21, the home appliance 100*e* of FIG. 21, the IoT device 100*f* of FIG. 21, a digital broadcasting terminal, a hologram device, a public safety device, an MTC device, a medical device, a fintech device (or financial device), a security device, a climate/environment device, an AI server/device 400 of FIG. 21, the BS 200 of FIG. 21, a network node, etc. The wireless device may be movable or may be used at a fixed place according to a use example/service.

In FIG. 24, all of various elements, components, units, and/or modules in the wireless devices 100 and 200 may be interconnected through the wired interface or at least may be wirelessly connected through the communication unit 110. For example, the control unit 120 and the communication 110 in the wireless devices 100 and 200 may be wiredly connected and the control unit 120 and the first unit (e.g., 130 or 140) may be wirelessly connected through the communication unit 110. Further, each element, component, unit, and/or module in the wireless devices 100 and 200 may further include one or more elements. For example, the control unit 120 may be constituted by one or more processor sets. For example, the control unit 120 may be configured a set of a communication control processor, an application processor, an electronic control unit (ECU), a graphic processing processor, a memory control processor, etc. As another example, the memory 130 may be configured as a random access memory (RAM), a dynamic RAM (DRAM), a read only memory (ROM), a flash memory, a volatile memory, a non-volatile memory, and/or combinations thereof.

Example of Hand-Held Device to which Present Disclosure is Applied

FIG. 25 illustrates a hand-held device applied to the present disclosure. The hand-held device may include a smart phone, a smart pad, a wearable device (e.g., a smart watch, a smart glass), and a hand-held computer (e.g., a notebook, etc.). The hand-held device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 25, a hand-held device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 24, respectively.

The communication unit 110 may transmit/receive a signal (e.g., data, a control signal, etc.) to/from another wireless device and BSs. The control unit 120 may perform various operations by controlling components of the hand-held device 100. The control unit 120 may include an Application Processor (AP). The memory unit 130 may store data/parameters/programs/codes/instructions required for driving the hand-held device 100. Further, the memory unit 130 may store input/output data/information, etc. The power supply unit 140a may supply power to the hand-held device 100 and include a wired/wireless charging circuit, a battery, and the like. The interface unit 140b may support a connection between the hand-held device 100 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

Here, the wireless communication technology implemented in the wireless devices 100 and 200 of the present specification may include a narrowband Internet of Things for low-power communication as well as LTE, NR, and 6G. At this time, for example, NB-IoT technology may be an example of LPWAN (Low Power Wide Area Network) technology, and may be implemented in standards such as LTE Cat NB1 and/or LTE Cat NB2, and is not limited to the above-mentioned names. Additionally or alternatively, the wireless communication technology implemented in the wireless devices 100 and 200 of the present specification may perform communication based on the LTE-M technology. In this case, as an example, the LTE-M technology may be an example of an LPWAN technology, and may be called by various names such as enhanced machine type communication (eMTC). For example, LTE-M technology is 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) may be implemented in at least one of various standards such as LTE M, and is not limited to the above-described name. Additionally or alternatively, the wireless communication technology implemented in the wireless devices 100 and 200 of the present specification is at least one of ZigBee, Bluetooth, and Low Power Wide Area Network (LPWAN) in consideration of low power communication. It may include any one, and is not limited to the above-mentioned names. For example, the ZigBee technology can create PAN (personal area networks) related to small/low-power digital communication based on various standards such as IEEE 802.15.4, and can be called by various names.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although a method of transmitting and receiving PDSCH in a wireless communication system of the present disclosure has been described with reference to an example applied to a 3GPP LTE/LTE-A system or a 5G system (New RAT system), the scheme may be applied to various wireless communication systems in addition to the 3GPP LTE/LTE-A system or 5G system.

What is claimed is:

1. A method comprising:
receiving, from a base station, configuration information;
receiving, from the base station, downlink control information (DCI) that includes a transmission configuration indication (TCI) field;
wherein a plurality of TCI states are indicated based on the TCI field; and
receiving, from the base station, a plurality of transmission occasions of a same transport block based on the plurality of TCI states,
wherein the plurality of transmission occasions are received in a time domain resource,
wherein a repetition scheme is determined based on a higher layer parameter,
wherein, based on a first higher layer parameter being configured for the repetition scheme, the plurality of transmission occasions are received within a slot, and a number of the plurality of transmission occasions is determined based on a number of the plurality of TCI states, and
wherein, based on a second higher layer parameter being configured for the repetition scheme, the plurality of transmission occasions are transmitted within consecutive slots, and the number of the plurality of transmission occasions is determined based on a repetition number related to the plurality of transmission occasions.

2. The method of claim 1,
wherein a first TCI state relates to a first transmission occasion, and
wherein a second TCI state relates to a second transmission occasion.

3. The method of claim 2,
wherein each of the first transmission occasion and the second transmission occasion includes 2, 4 or 7 ODFM symbols.

4. The method of claim 2,
wherein the DCI further includes a RV field, and
wherein a RV value of the first transmission occasion and a RV value of the second transmission occasion are differently configured based on the RV field.

5. The method of claim 2,
wherein the DCI further includes a time domain resource assignment field, and
wherein a first time domain resource of the first transmission occasion is indicated based on the time domain resource assignment field.

6. The method of claim 5,
wherein a size of a second time domain resource of the second transmission occasion is same as a size of the first time domain resource.

7. The method of claim 6,
wherein the first time domain resource and the second time domain resource are contiguously located.

8. The method of claim 6,
wherein the second time domain resource is located apart from the first time domain resource by a specific symbol number.

9. The method of claim 8,
wherein the specific symbol number is configured based on a higher layer signaling.

10. The method of claim 1,
wherein, based on the repetition number related to the plurality of transmission occasions being configured based on the configuration information, the plurality of transmission occasions are received in the consecutive slots.

11. The method of claim 1,
wherein the configuration information further includes information on a transmission scheme.

12. The method of claim 1, wherein the second higher layer parameter represents the repetition number.

13. The method of claim 12, wherein the repetition number is one of a plurality of values, and the plurality of values include a value greater than the number of the plurality of TCI states.

14. A user equipment (UE) comprising:
one or more transceivers;
one or more processors; and
one or more memories for storing instructions for operations executed by the one or more processors and coupled to the one or more processors;
wherein the operations comprise:
receiving, from a base station, configuration information;
receiving, from the base station, downlink control information (DCI) including a transmission configuration indication (TCI) field, wherein a plurality of TCI states are indicated based on the TCI field; and
receiving, from the base station, a plurality of transmission occasions of a same transport block based on the plurality of TCI states,
wherein the plurality of transmission occasions are received in a time domain resource,
wherein a repetition scheme is determined based on a higher layer parameter,
wherein, based on a first higher layer parameter being configured for the repetition scheme, the plurality of transmission occasions are received within a slot, and a number of the plurality of transmission occasions is determined based on a number of the plurality of TCI states, and
wherein, based on a second higher layer parameter being configured for the repetition scheme, the plurality of transmission occasions are received within consecutive slots, and the number of the plurality of transmission occasions is determined based on a repetition number related to the plurality of transmission occasions.

15. A base station comprising:
one or more transceivers;
one or more processors; and
one or more memories for storing instructions for operations executed by the one or more processors and coupled to the one or more processors;
wherein the operations comprise:
transmitting, to a user equipment (UE), configuration information;
transmitting, to the UE, downlink control information (DCI) including a transmission configuration indication (TCI) field, wherein a plurality of TCI states are indicated based on the TCI field; and
transmitting, to the UE, a plurality of transmission occasions of a same transport block based on the plurality of TCI states,
wherein the plurality of transmission occasions are transmitted in a time domain resource,
wherein a repetition scheme is determined based on a higher layer parameter,
wherein, based on a first higher layer parameter being configured for the repetition scheme, the plurality of transmission occasions are transmitted within a slot, and a number of the plurality of transmission occasions is determined based on a number of the plurality of TCI states, and
wherein, based on a second higher layer parameter being configured for the repetition scheme, the plurality of transmission occasions are transmitted within consecutive slots, and the number of the plurality of transmission occasions is determined based on a repetition number related to the plurality of transmission occasions.

* * * * *